(12) United States Patent
Zhang et al.

(10) Patent No.: US 11,962,799 B2
(45) Date of Patent: Apr. 16, 2024

(54) MOTION CANDIDATES DERIVATION

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 305 days.

(21) Appl. No.: 17/374,208

(22) Filed: Jul. 13, 2021

(65) Prior Publication Data

US 2021/0344947 A1     Nov. 4, 2021

Related U.S. Application Data

(63) Continuation of application No. PCT/CN2020/072387, filed on Jan. 16, 2020.

(30) Foreign Application Priority Data

Jan. 16, 2019    (WO) ................ PCT/CN2019/072058

(51) Int. Cl.
     *H04N 19/52*        (2014.01)
     *H04N 19/105*      (2014.01)
                 (Continued)

(52) U.S. Cl.
     CPC ........... *H04N 19/52* (2014.11); *H04N 19/105* (2014.11); *H04N 19/139* (2014.11);
                 (Continued)

(58) Field of Classification Search
CPC .... H04N 19/52; H04N 19/105; H04N 19/139; H04N 19/159; H04N 19/176; H04N 19/184; H04N 19/88
(Continued)

(56) References Cited

U.S. PATENT DOCUMENTS 7,023,922 B1    4/2006   Xu et al.
7,653,134 B2    1/2010   Xu et al.
(Continued)

FOREIGN PATENT DOCUMENTS

AU         2019293670 B2     1/2021
CA           3020265 A1     11/2017
(Continued)

OTHER PUBLICATIONS

US 11,089,321 B2, 08/2021, Zhang et al. (withdrawn)
(Continued)

*Primary Examiner* — Marnie A Matt
(74) *Attorney, Agent, or Firm* — Perkins Coie LLP

(57) ABSTRACT

Devices, systems and methods for encoding and decoding digital video using a look-up tables (LUTs) containing motion candidates are described. In a representative aspect, a method of video processing includes maintaining one or more tables, wherein at least one table of the one or more tables is associated with one or more entries, deriving, based on a first set of motion candidates in the at least one table, a second set of motion candidates, and performing, based on the second set of motion candidates, a conversion between a current block of a video and a bitstream representation of the video.

20 Claims, 37 Drawing Sheets

(51) Int. Cl.
    *H04N 19/139*        (2014.01)
    *H04N 19/159*        (2014.01)
    *H04N 19/176*        (2014.01)
    *H04N 19/184*        (2014.01)
    *H04N 19/88*         (2014.01)

(52) U.S. Cl.
    CPC ......... *H04N 19/159* (2014.11); *H04N 19/176*
        (2014.11); *H04N 19/184* (2014.11); *H04N*
                                     *19/88* (2014.11)

(58) Field of Classification Search
    USPC .................................................. 375/240.16
    See application file for complete search history.

(56) References Cited

U.S. PATENT DOCUMENTS

| | | |
|---|---|---|
| 7,675,976 B2 | 3/2010 | Xu et al. |
| 7,680,189 B2 | 3/2010 | Xu et al. |
| 7,680,190 B2 | 3/2010 | Xu et al. |
| 7,801,220 B2 | 9/2010 | Zhang et al. |
| 8,804,816 B2 | 8/2014 | Li et al. |
| 9,350,970 B2 | 5/2016 | Kang et al. |
| 9,445,076 B2 | 9/2016 | Zhang et al. |
| 9,485,503 B2 | 11/2016 | Zhang et al. |
| 9,503,702 B2 | 11/2016 | Chen et al. |
| 9,621,888 B2 | 4/2017 | Jeon et al. |
| 9,667,996 B2 | 5/2017 | Chen et al. |
| 9,699,450 B2 | 7/2017 | Zhang et al. |
| 9,762,882 B2 | 9/2017 | Zhang et al. |
| 9,762,900 B2 | 9/2017 | Park et al. |
| 9,807,431 B2 | 10/2017 | Hannuksela et al. |
| 9,872,016 B2 | 1/2018 | Chuang et al. |
| 9,900,615 B2 | 2/2018 | Li et al. |
| 9,918,102 B1 | 3/2018 | Kohn et al. |
| 9,967,592 B2 | 5/2018 | Zhang et al. |
| 9,998,727 B2 | 6/2018 | Zhang et al. |
| 10,021,414 B2 | 7/2018 | Seregin et al. |
| 10,085,041 B2 | 9/2018 | Zhang et al. |
| 10,116,934 B2 | 10/2018 | Zan et al. |
| 10,154,286 B2 | 12/2018 | He et al. |
| 10,158,876 B2 | 12/2018 | Chen et al. |
| 10,200,709 B2 | 2/2019 | Chen et al. |
| 10,200,711 B2 | 2/2019 | Li et al. |
| 10,230,980 B2 | 3/2019 | Liu et al. |
| 10,271,064 B2 | 4/2019 | Chien et al. |
| 10,277,909 B2 | 4/2019 | Ye et al. |
| 10,284,869 B2 | 5/2019 | Han et al. |
| 10,306,225 B2 | 5/2019 | Zhang et al. |
| 10,349,083 B2 | 7/2019 | Chen et al. |
| 10,362,330 B1 | 7/2019 | Li et al. |
| 10,368,072 B2 | 7/2019 | Zhang et al. |
| 10,390,029 B2 | 8/2019 | Ye et al. |
| 10,440,378 B1 | 10/2019 | Xu et al. |
| 10,448,010 B2 | 10/2019 | Chen et al. |
| 10,462,439 B2 | 10/2019 | He et al. |
| 10,491,902 B1 | 11/2019 | Xu et al. |
| 10,491,917 B2 | 11/2019 | Chen et al. |
| 10,531,118 B2 | 1/2020 | Li et al. |
| 10,560,718 B2 | 2/2020 | Lee et al. |
| 10,595,035 B2 | 3/2020 | Karczewicz et al. |
| 10,681,383 B2 | 6/2020 | Ye et al. |
| 10,687,077 B2 | 6/2020 | Zhang et al. |
| 10,694,204 B2 | 6/2020 | Chen et al. |
| 10,701,366 B2 | 6/2020 | Chen et al. |
| 10,771,811 B2 | 9/2020 | Liu et al. |
| 10,778,997 B2 | 9/2020 | Zhang et al. |
| 10,778,999 B2 | 9/2020 | Li et al. |
| 10,805,650 B2 | 10/2020 | Wang et al. |
| 10,812,791 B2 | 10/2020 | Chien et al. |
| 10,841,615 B2 | 11/2020 | He et al. |
| 10,873,756 B2 | 11/2020 | Zhang et al. |
| 10,911,769 B2 | 2/2021 | Zhang et al. |
| 11,134,243 B2 | 9/2021 | Zhang et al. |
| 11,134,244 B2 | 9/2021 | Zhang et al. |
| 11,134,267 B2 | 9/2021 | Zhang et al. |
| 11,140,383 B2 | 10/2021 | Zhang et al. |
| 11,140,385 B2 | 10/2021 | Zhang et al. |
| 11,146,785 B2 | 10/2021 | Zhang et al. |
| 11,146,786 B2 | 10/2021 | Zhang et al. |
| 11,153,557 B2 | 10/2021 | Zhang et al. |
| 11,153,558 B2 | 10/2021 | Zhang et al. |
| 11,153,559 B2 | 10/2021 | Zhang et al. |
| 11,159,787 B2 | 10/2021 | Zhang et al. |
| 11,159,807 B2 | 10/2021 | Zhang et al. |
| 11,159,817 B2 | 10/2021 | Zhang et al. |
| 11,245,892 B2 | 2/2022 | Zhang et al. |
| 11,412,211 B2 | 8/2022 | Lee |
| 11,463,685 B2 | 10/2022 | Zhang et al. |
| 11,528,500 B2 | 12/2022 | Zhang et al. |
| 11,528,501 B2 | 12/2022 | Zhang et al. |
| 11,589,071 B2 | 2/2023 | Zhang et al. |
| 11,641,483 B2 | 5/2023 | Zhang et al. |
| 11,695,921 B2 | 7/2023 | Zhang et al. |
| 11,706,406 B2 | 7/2023 | Zhang et al. |
| 2005/0105812 A1 | 5/2005 | Molino et al. |
| 2006/0233243 A1 | 10/2006 | Ridge et al. |
| 2007/0025444 A1 | 2/2007 | Okada et al. |
| 2009/0180538 A1 | 7/2009 | Visharam et al. |
| 2010/0080296 A1 | 4/2010 | Lee et al. |
| 2011/0109964 A1 | 5/2011 | Kim et al. |
| 2011/0116546 A1 | 5/2011 | Guo et al. |
| 2011/0170600 A1 | 7/2011 | Ishikawa |
| 2011/0194608 A1 | 8/2011 | Rusert et al. |
| 2011/0194609 A1 | 8/2011 | Rusert et al. |
| 2011/0200107 A1 | 8/2011 | Ryu |
| 2012/0082229 A1 | 4/2012 | Su et al. |
| 2012/0134415 A1 | 5/2012 | Lin et al. |
| 2012/0195366 A1 | 8/2012 | Liu et al. |
| 2012/0195368 A1 | 8/2012 | Chien et al. |
| 2012/0257678 A1 | 10/2012 | Zhou et al. |
| 2012/0263231 A1 | 10/2012 | Zhou |
| 2012/0287999 A1 | 11/2012 | Li et al. |
| 2012/0300846 A1 | 11/2012 | Sugio et al. |
| 2012/0307903 A1 | 12/2012 | Sugio et al. |
| 2012/0320984 A1 | 12/2012 | Zhou |
| 2013/0064301 A1 | 3/2013 | Guo et al. |
| 2013/0070855 A1 | 3/2013 | Zheng et al. |
| 2013/0094580 A1 | 4/2013 | Zhou et al. |
| 2013/0101041 A1 | 4/2013 | Fishwick et al. |
| 2013/0114717 A1 | 5/2013 | Zheng et al. |
| 2013/0114723 A1 | 5/2013 | Bici et al. |
| 2013/0128982 A1 | 5/2013 | Kim et al. |
| 2013/0163668 A1 | 6/2013 | Chen et al. |
| 2013/0188013 A1 | 7/2013 | Chen et al. |
| 2013/0188715 A1 | 7/2013 | Seregin et al. |
| 2013/0208799 A1 | 8/2013 | Srinivasamurthy et al. |
| 2013/0243093 A1 | 9/2013 | Chen et al. |
| 2013/0265388 A1 | 10/2013 | Zhang et al. |
| 2013/0272377 A1 | 10/2013 | Karczewicz et al. |
| 2013/0272410 A1 | 10/2013 | Seregin et al. |
| 2013/0272412 A1 | 10/2013 | Seregin et al. |
| 2013/0272413 A1 | 10/2013 | Seregin et al. |
| 2013/0294513 A1 | 11/2013 | Seregin et al. |
| 2013/0301734 A1 | 11/2013 | Gisquet et al. |
| 2013/0336406 A1 | 12/2013 | Zhang et al. |
| 2014/0064372 A1 | 3/2014 | Laroche et al. |
| 2014/0078251 A1 | 3/2014 | Kang et al. |
| 2014/0086327 A1 | 3/2014 | Ugur et al. |
| 2014/0105295 A1 | 4/2014 | Shiodera et al. |
| 2014/0105302 A1 | 4/2014 | Takehara et al. |
| 2014/0126629 A1 | 5/2014 | Park et al. |
| 2014/0133558 A1 | 5/2014 | Seregin et al. |
| 2014/0161186 A1 | 6/2014 | Zhang et al. |
| 2014/0185685 A1 | 7/2014 | Asaka et al. |
| 2014/0219356 A1 | 8/2014 | Nishitani et al. |
| 2014/0241434 A1 | 8/2014 | Lin et al. |
| 2014/0286427 A1 | 9/2014 | Fukushima et al. |
| 2014/0286433 A1 | 9/2014 | He et al. |
| 2014/0334557 A1 | 11/2014 | Schierl et al. |
| 2014/0341289 A1 | 11/2014 | Scharz et al. |
| 2014/0355685 A1 | 12/2014 | Chen et al. |
| 2014/0376614 A1 | 12/2014 | Fukushima et al. |
| 2014/0376626 A1 | 12/2014 | Lee |

(56) References Cited

U.S. PATENT DOCUMENTS

| | | |
|---|---|---|
| 2014/0376638 A1 | 12/2014 | Nakamura et al. |
| 2015/0085932 A1 | 3/2015 | Lin et al. |
| 2015/0110197 A1 | 4/2015 | Kim et al. |
| 2015/0189313 A1 | 7/2015 | Shimada et al. |
| 2015/0195558 A1 | 7/2015 | Kim |
| 2015/0237370 A1 | 8/2015 | Zhou et al. |
| 2015/0256853 A1 | 9/2015 | Li et al. |
| 2015/0264386 A1 | 9/2015 | Pang et al. |
| 2015/0281733 A1 | 10/2015 | Fu et al. |
| 2015/0312588 A1 | 10/2015 | Yamamoto et al. |
| 2015/0326880 A1 | 11/2015 | He et al. |
| 2015/0341635 A1 | 11/2015 | Seregin et al. |
| 2015/0358635 A1 | 12/2015 | Xiu et al. |
| 2016/0044332 A1 | 2/2016 | Maaninen |
| 2016/0050430 A1 | 2/2016 | Xiu et al. |
| 2016/0219278 A1 | 7/2016 | Chen et al. |
| 2016/0227214 A1 | 8/2016 | Rapaka et al. |
| 2016/0234492 A1 | 8/2016 | Li et al. |
| 2016/0241867 A1 | 8/2016 | Sugio et al. |
| 2016/0277761 A1 | 9/2016 | Li et al. |
| 2016/0286230 A1 | 9/2016 | Li et al. |
| 2016/0286232 A1 | 9/2016 | Li et al. |
| 2016/0295240 A1 | 10/2016 | Kim et al. |
| 2016/0301936 A1 | 10/2016 | Chen et al. |
| 2016/0330471 A1 | 11/2016 | Zhu et al. |
| 2016/0337661 A1 | 11/2016 | Pang et al. |
| 2016/0366416 A1 | 12/2016 | Liu et al. |
| 2016/0366442 A1 | 12/2016 | Liu et al. |
| 2016/0373784 A1 | 12/2016 | Bang et al. |
| 2017/0006302 A1 | 1/2017 | Lee et al. |
| 2017/0013269 A1 | 1/2017 | Kim et al. |
| 2017/0048550 A1 | 2/2017 | Hannuksela |
| 2017/0054996 A1 | 2/2017 | Xu et al. |
| 2017/0078699 A1 | 3/2017 | Park et al. |
| 2017/0099495 A1 | 4/2017 | Rapaka et al. |
| 2017/0127082 A1 | 5/2017 | Chen et al. |
| 2017/0127086 A1 | 5/2017 | Lai et al. |
| 2017/0150168 A1 | 5/2017 | Nakamura et al. |
| 2017/0163999 A1 | 6/2017 | Li et al. |
| 2017/0188045 A1 | 6/2017 | Zhou et al. |
| 2017/0214932 A1 | 7/2017 | Huang et al. |
| 2017/0223352 A1 | 8/2017 | Kim et al. |
| 2017/0238005 A1 | 8/2017 | Chien et al. |
| 2017/0238011 A1 | 8/2017 | Pettersson et al. |
| 2017/0264895 A1 | 9/2017 | Takehara et al. |
| 2017/0272746 A1 | 9/2017 | Sugio et al. |
| 2017/0280159 A1 | 9/2017 | Xu et al. |
| 2017/0289570 A1 | 10/2017 | Zhou et al. |
| 2017/0332084 A1 | 11/2017 | Seregin et al. |
| 2017/0332095 A1 | 11/2017 | Zou et al. |
| 2017/0332099 A1 | 11/2017 | Lee et al. |
| 2017/0339425 A1 | 11/2017 | Jeong et al. |
| 2018/0014017 A1 | 1/2018 | Li et al. |
| 2018/0041769 A1 | 2/2018 | Chuang et al. |
| 2018/0070100 A1 | 3/2018 | Chen et al. |
| 2018/0077417 A1 | 3/2018 | Huang |
| 2018/0084260 A1* | 3/2018 | Chien .................. H04N 19/52 |
| 2018/0098063 A1 | 4/2018 | Chen et al. |
| 2018/0184085 A1 | 6/2018 | Yang et al. |
| 2018/0192069 A1 | 7/2018 | Chen et al. |
| 2018/0192071 A1 | 7/2018 | Chuang et al. |
| 2018/0242024 A1 | 8/2018 | Chen et al. |
| 2018/0262753 A1 | 9/2018 | Sugio et al. |
| 2018/0270500 A1 | 9/2018 | Li et al. |
| 2018/0278949 A1 | 9/2018 | Karczewicz et al. |
| 2018/0310018 A1 | 10/2018 | Guo et al. |
| 2018/0332284 A1 | 11/2018 | Liu et al. |
| 2018/0332312 A1 | 11/2018 | Liu et al. |
| 2018/0343467 A1 | 11/2018 | Lin |
| 2018/0352223 A1 | 12/2018 | Chen et al. |
| 2018/0352256 A1* | 12/2018 | Bang .................. H04N 19/597 |
| 2018/0359483 A1 | 12/2018 | Chen et al. |
| 2018/0376149 A1 | 12/2018 | Zhang et al. |
| 2018/0376160 A1 | 12/2018 | Zhang et al. |
| 2018/0376164 A1 | 12/2018 | Zhang et al. |
| 2019/0098329 A1 | 3/2019 | Han et al. |
| 2019/0116374 A1 | 4/2019 | Zhang et al. |
| 2019/0116381 A1 | 4/2019 | Lee et al. |
| 2019/0141334 A1 | 5/2019 | Lim et al. |
| 2019/0158827 A1 | 5/2019 | Sim et al. |
| 2019/0158866 A1 | 5/2019 | Kim |
| 2019/0200040 A1 | 6/2019 | Lim et al. |
| 2019/0215529 A1 | 7/2019 | Laroche |
| 2019/0222848 A1 | 7/2019 | Chen et al. |
| 2019/0222865 A1 | 7/2019 | Zhang et al. |
| 2019/0230362 A1 | 7/2019 | Chen |
| 2019/0230376 A1 | 7/2019 | Hu et al. |
| 2019/0297325 A1 | 9/2019 | Lim et al. |
| 2019/0297343 A1 | 9/2019 | Seo et al. |
| 2019/0320180 A1 | 10/2019 | Yu et al. |
| 2019/0342557 A1* | 11/2019 | Robert .................. H04N 19/52 |
| 2019/0356925 A1 | 11/2019 | Ye et al. |
| 2020/0014948 A1 | 1/2020 | Lai et al. |
| 2020/0021839 A1 | 1/2020 | Pham Van et al. |
| 2020/0021845 A1 | 1/2020 | Lin et al. |
| 2020/0029088 A1 | 1/2020 | Xu et al. |
| 2020/0036997 A1 | 1/2020 | Li et al. |
| 2020/0077106 A1 | 3/2020 | Jhu et al. |
| 2020/0077116 A1 | 3/2020 | Lee et al. |
| 2020/0099951 A1 | 3/2020 | Hung et al. |
| 2020/0112715 A1 | 4/2020 | Hung et al. |
| 2020/0112741 A1 | 4/2020 | Han et al. |
| 2020/0120334 A1 | 4/2020 | Xu et al. |
| 2020/0128238 A1 | 4/2020 | Lee et al. |
| 2020/0128266 A1 | 4/2020 | Xu et al. |
| 2020/0145690 A1 | 5/2020 | Li et al. |
| 2020/0154124 A1* | 5/2020 | Lee .................. H04N 19/105 |
| 2020/0169726 A1 | 5/2020 | Kim et al. |
| 2020/0169745 A1 | 5/2020 | Han et al. |
| 2020/0169748 A1 | 5/2020 | Chen et al. |
| 2020/0186793 A1 | 6/2020 | Racape et al. |
| 2020/0186820 A1 | 6/2020 | Park et al. |
| 2020/0195920 A1 | 6/2020 | Racape et al. |
| 2020/0195959 A1 | 6/2020 | Zhang et al. |
| 2020/0195960 A1 | 6/2020 | Zhang et al. |
| 2020/0204820 A1 | 6/2020 | Zhang et al. |
| 2020/0396466 A1 | 6/2020 | Zhang et al. |
| 2020/0221108 A1 | 7/2020 | Xu et al. |
| 2020/0228825 A1 | 7/2020 | Lim et al. |
| 2020/0236353 A1 | 7/2020 | Zhang et al. |
| 2020/0244954 A1 | 7/2020 | Heo et al. |
| 2020/0267408 A1 | 8/2020 | Lee et al. |
| 2020/0275124 A1 | 8/2020 | Ko et al. |
| 2020/0280735 A1 | 9/2020 | Lim et al. |
| 2020/0288150 A1 | 9/2020 | Jun et al. |
| 2020/0288168 A1 | 9/2020 | Zhang et al. |
| 2020/0296414 A1 | 9/2020 | Park et al. |
| 2020/0322628 A1 | 10/2020 | Lee et al. |
| 2020/0336726 A1 | 10/2020 | Wang et al. |
| 2020/0366923 A1 | 11/2020 | Zhang et al. |
| 2020/0374542 A1 | 11/2020 | Zhang et al. |
| 2020/0374543 A1 | 11/2020 | Liu et al. |
| 2020/0374544 A1 | 11/2020 | Liu et al. |
| 2020/0382770 A1 | 12/2020 | Zhang et al. |
| 2020/0396446 A1 | 12/2020 | Zhang et al. |
| 2020/0396447 A1 | 12/2020 | Zhang et al. |
| 2020/0396462 A1 | 12/2020 | Zhang et al. |
| 2020/0404254 A1 | 12/2020 | Zhao et al. |
| 2020/0404285 A1 | 12/2020 | Zhang et al. |
| 2020/0404316 A1 | 12/2020 | Zhang et al. |
| 2020/0404319 A1 | 12/2020 | Zhang et al. |
| 2020/0404320 A1 | 12/2020 | Zhang et al. |
| 2020/0413038 A1 | 12/2020 | Zhang et al. |
| 2020/0413044 A1 | 12/2020 | Zhang et al. |
| 2020/0413045 A1 | 12/2020 | Zhang et al. |
| 2021/0006787 A1 | 1/2021 | Zhang et al. |
| 2021/0006788 A1 | 1/2021 | Zhang et al. |
| 2021/0006790 A1 | 1/2021 | Zhang et al. |
| 2021/0006819 A1 | 1/2021 | Zhang et al. |
| 2021/0006823 A1 | 1/2021 | Zhang et al. |
| 2021/0014520 A1 | 1/2021 | Zhang et al. |
| 2021/0014525 A1 | 1/2021 | Zhang et al. |
| 2021/0029351 A1 | 1/2021 | Zhang et al. |
| 2021/0029352 A1 | 1/2021 | Zhang et al. |

(56) References Cited

U.S. PATENT DOCUMENTS

| | | | |
|---|---|---|---|
| 2021/0029362 A1 | 1/2021 | Liu et al. |
| 2021/0029366 A1 | 1/2021 | Zhang et al. |
| 2021/0029372 A1 | 1/2021 | Zhang et al. |
| 2021/0029374 A1 | 1/2021 | Zhang et al. |
| 2021/0051324 A1 | 2/2021 | Zhang et al. |
| 2021/0051339 A1 | 2/2021 | Liu et al. |
| 2021/0067783 A1 | 3/2021 | Liu et al. |
| 2021/0076063 A1 | 3/2021 | Liu et al. |
| 2021/0092379 A1 | 3/2021 | Zhang et al. |
| 2021/0092436 A1 | 3/2021 | Zhang et al. |
| 2021/0105482 A1 | 4/2021 | Zhang et al. |
| 2021/0120234 A1 | 4/2021 | Zhang et al. |
| 2021/0185326 A1 | 6/2021 | Wang et al. |
| 2021/0203984 A1 | 7/2021 | Salehifar et al. |
| 2021/0235108 A1 | 7/2021 | Zhang et al. |
| 2021/0258569 A1 | 8/2021 | Chen et al. |
| 2021/0297659 A1 | 8/2021 | Zhang et al. |
| 2021/0321089 A1 | 10/2021 | Lin et al. |
| 2021/0337216 A1 | 10/2021 | Zhang et al. |
| 2021/0352312 A1 | 11/2021 | Zhang et al. |
| 2021/0360230 A1 | 11/2021 | Zhang et al. |
| 2021/0360278 A1 | 11/2021 | Zhang et al. |
| 2021/0377518 A1 | 12/2021 | Zhang et al. |
| 2021/0377545 A1 | 12/2021 | Zhang et al. |
| 2021/0400298 A1 | 12/2021 | Zhao et al. |
| 2022/0007047 A1 | 1/2022 | Zhang et al. |
| 2022/0094915 A1 | 3/2022 | Zhang et al. |
| 2022/0094967 A1 | 3/2022 | Zhang et al. |
| 2022/0417551 A1 | 12/2022 | Lim et al. |

FOREIGN PATENT DOCUMENTS

| | | |
|---|---|---|
| CN | 1898715 A | 1/2007 |
| CN | 1925614 A | 3/2007 |
| CN | 101193302 A | 6/2008 |
| CN | 101933328 A | 12/2010 |
| CN | 102474619 A | 5/2012 |
| CN | 102860006 A | 1/2013 |
| CN | 102907098 A | 1/2013 |
| CN | 103004204 A | 3/2013 |
| CN | 103096071 A | 5/2013 |
| CN | 103096073 A | 5/2013 |
| CN | 103339938 A | 10/2013 |
| CN | 103370937 A | 10/2013 |
| CN | 103404143 A | 11/2013 |
| CN | 103444182 A | 12/2013 |
| CN | 103518374 A | 1/2014 |
| CN | 103535039 A | 1/2014 |
| CN | 103535040 A | 1/2014 |
| CN | 103609123 A | 2/2014 |
| CN | 103828364 A | 5/2014 |
| CN | 103858428 A | 6/2014 |
| CN | 103891281 A | 6/2014 |
| CN | 103931192 A | 7/2014 |
| CN | 104041042 A | 9/2014 |
| CN | 104054350 A | 9/2014 |
| CN | 104079944 A | 10/2014 |
| CN | 104126302 A | 10/2014 |
| CN | 104247434 A | 12/2014 |
| CN | 102946536 A | 1/2015 |
| CN | 104272743 A | 1/2015 |
| CN | 104350749 A | 2/2015 |
| CN | 104365102 A | 2/2015 |
| CN | 104396248 A | 3/2015 |
| CN | 104539950 A | 4/2015 |
| CN | 104584549 A | 4/2015 |
| CN | 104662909 A | 5/2015 |
| CN | 104756499 A | 7/2015 |
| CN | 104915966 A | 9/2015 |
| CN | 105245900 A | 1/2016 |
| CN | 105324996 A | 2/2016 |
| CN | 105556971 A | 5/2016 |
| CN | 105681807 A | 6/2016 |
| CN | 105917650 A | 8/2016 |
| CN | 106464864 A | 2/2017 |
| CN | 106471806 A | 3/2017 |
| CN | 106716997 A | 5/2017 |
| CN | 106797477 A | 5/2017 |
| CN | 106851046 A | 6/2017 |
| CN | 106851267 A | 6/2017 |
| CN | 106851269 A | 6/2017 |
| CN | 107071458 A | 8/2017 |
| CN | 107079161 A | 8/2017 |
| CN | 107079162 A | 8/2017 |
| CN | 107087165 A | 8/2017 |
| CN | 107113424 A | 8/2017 |
| CN | 107113442 A | 8/2017 |
| CN | 107113446 A | 8/2017 |
| CN | 107197301 A | 9/2017 |
| CN | 107211156 A | 9/2017 |
| CN | 107295348 A | 10/2017 |
| CN | 107347159 A | 11/2017 |
| CN | 107493473 A | 12/2017 |
| CN | 107592529 A | 1/2018 |
| CN | 107690809 A | 2/2018 |
| CN | 107690810 A | 2/2018 |
| CN | 107710764 A | 2/2018 |
| CN | 107959853 A | 4/2018 |
| CN | 108134934 A | 6/2018 |
| CN | 108200437 A | 6/2018 |
| CN | 108235009 A | 6/2018 |
| CN | 108293127 A | 7/2018 |
| CN | 108353184 A | 7/2018 |
| CN | 109076218 A | 12/2018 |
| CN | 109089119 A | 12/2018 |
| CN | 110169073 A | 8/2019 |
| EP | 2532160 A1 | 12/2012 |
| EP | 2668784 A1 | 12/2013 |
| EP | 2741499 A1 | 6/2014 |
| EP | 2983365 A1 | 2/2016 |
| EP | 3791585 A1 | 3/2021 |
| EP | 3791588 A1 | 3/2021 |
| EP | 3794825 A1 | 3/2021 |
| GB | 201111867 | 8/2011 |
| GB | 2488815 | 9/2012 |
| GB | 2492778 | 1/2013 |
| GB | 2588006 A | 4/2021 |
| JP | 2013110766 A | 6/2013 |
| JP | 2013537772 A | 10/2013 |
| JP | 2014501091 A | 1/2014 |
| JP | 2014509480 A | 4/2014 |
| JP | 2014197883 A | 10/2014 |
| JP | 2016059066 A | 4/2016 |
| JP | 2017123542 A | 7/2017 |
| JP | 2017028712 A | 1/2019 |
| JP | 2020523853 A | 8/2020 |
| JP | 2021052373 A | 4/2021 |
| JP | 2021510265 A | 4/2021 |
| JP | 2021513795 A | 5/2021 |
| JP | 2022504073 A | 1/2022 |
| JP | 2022507682 A | 1/2022 |
| JP | 2022507683 A | 1/2022 |
| KR | 20170058871 A | 5/2017 |
| KR | 20170115969 A | 10/2017 |
| RU | 2550554 C2 | 5/2015 |
| RU | 2571572 C2 | 12/2015 |
| RU | 2632158 C2 | 10/2017 |
| RU | 2669005 C2 | 10/2018 |
| TW | 201444349 A | 11/2014 |
| TW | 201832556 A | 9/2018 |
| WO | 2011095259 A1 | 8/2011 |
| WO | 2011095260 A1 | 8/2011 |
| WO | 2012074344 A2 | 6/2012 |
| WO | 2012095467 A1 | 7/2012 |
| WO | 2012172668 A1 | 12/2012 |
| WO | 2013081365 A1 | 6/2013 |
| WO | 2013157251 A1 | 10/2013 |
| WO | 2014007058 A1 | 1/2014 |
| WO | 2014054267 A1 | 4/2014 |
| WO | 2015006920 A1 | 1/2015 |
| WO | 2015010226 A1 | 1/2015 |
| WO | 2015042432 A1 | 3/2015 |
| WO | 2015052273 A1 | 4/2015 |
| WO | 2015100726 A1 | 7/2015 |

(56) References Cited

FOREIGN PATENT DOCUMENTS

| WO | 2015180014 A1 | 12/2015 |
|---|---|---|
| WO | 2016008409 A1 | 1/2016 |
| WO | 2016054979 A1 | 4/2016 |
| WO | 2016091161 A1 | 6/2016 |
| WO | 2017043734 A1 | 3/2017 |
| WO | 2017058633 A1 | 4/2017 |
| WO | 2017076221 A1 | 5/2017 |
| WO | 2017084512 A1 | 5/2017 |
| WO | 2017147765 A1 | 9/2017 |
| WO | 2017197126 A1 | 11/2017 |
| WO | 2017222237 A1 | 12/2017 |
| WO | 2018012886 A1 | 1/2018 |
| WO | 2018026148 A1 | 2/2018 |
| WO | 2018045944 A1 | 3/2018 |
| WO | 2018048904 A1 | 3/2018 |
| WO | 2018058526 A1 | 4/2018 |
| WO | 2018061522 A1 | 4/2018 |
| WO | 2018065397 A2 | 4/2018 |
| WO | 2018070107 A1 | 4/2018 |
| WO | 2018127119 A1 | 7/2018 |
| WO | 2018231700 A1 | 12/2018 |
| WO | 2018237299 A1 | 12/2018 |
| WO | 2019223746 A1 | 11/2019 |
| WO | 2020003275 A1 | 1/2020 |
| WO | 2020003279 A1 | 1/2020 |
| WO | 2020003284 A1 | 1/2020 |
| WO | 2020113051 A2 | 6/2020 |

OTHER PUBLICATIONS

Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0104 (Year: 2018).*

Chen et al. "Algorithm Description for Versatile Video Coding and Terst Model 3 (VTM 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1002, 2018.

Chien et al. "CE4-Related: Modification on History-Based Mode Vector Prediction," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0401, 2018.

"History, based" Library USPTO Search Query, Mar. 3, 2022.

Examination Report from Patent Application GB2020091.1 dated Mar. 21, 2022.

Extended European Search Report from European Patent Application No. 20737921.5 dated Feb. 22, 2022 (9 pages).

Notice of Allowance from U.S. Appl. No. 17/019,675 dated Mar. 11, 2022.

Sullivan et al. "Meeting Report of the 11th Meeting of the Joint Video Experts Team (JVET), Ljubljana, SI, Jul. 10-18, 2018," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K1000, 2018.

Xin, Yakun, "Exploration and Optimization of Merge Mode Candidate Decision in HEVC," 2016 Microcomputers and Applications No. 15 Xin Yakun (School of Information Engineering, Shanghai Maritime University, Shanghai 201306) Sep. 1, 2016.

"VVC and Inter" Library USPTO Search Query, Mar. 7, 2022.

Examination Report from Patent Application GB2018263.0 dated Mar. 30, 2022.

Examination Report from Patent Application GB2019557.4 dated Apr. 1, 2022.

Final Office Action from U.S. Appl. No. 17/480,184 dated May 2, 2022.

Notice of Allowance from U.S. Appl. No. 17/019,675 dated Jun. 16, 2022.

Non-Final Office Action from U.S. Appl. No. 17/019,753 dated Jul. 22, 2021.

Non-Final Office Action from U.S. Appl. No. 16/796,708 dated Aug. 11, 2021.

Non-Final Office Action from U.S. Appl. No. 17/229,019 dated Jun. 25, 2021.

International Search Report and Written Opinion from International Patent Application No. PCT/CN2020/072391 dated Mar. 6, 2020 (11 pages).

International Search Report and Written Opinion from International Patent Application No. PCT/IB2019/055554 dated Aug. 20, 2019 (16 pages).

International Search Report and Written Opinion from International Patent Application No. PCT/IB2019/055556 dated Aug. 29, 2019 (15 pages).

International Search Report and Written Opinion from International Patent Application No. PCT/IB2019/055581 dated Aug. 29, 2019 (25 pages).

International Search Report and Written Opinion from International Patent Application No. PCT/IB2019/055586 dated Sep. 16, 2019 (16 pages).

International Search Report and Written Opinion from International Patent Application No. PCT/IB2019/055587 dated Sep. 16, 2019 (23 pages).

International Search Report and Written Opinion from International Patent Application No. PCT/IB2019/055588 dated Sep. 16, 2019 (21 pages).

International Search Report and Written Opinion from International Patent Application No. PCT/IB2019/055591 dated Jan. 10, 2019 (16 pages).

International Search Report and Written Opinion from International Patent Application No. PCT/IB2019/055593 dated Sep. 16, 2019 (23 pages).

International Search Report and Written Opinion from International Patent Application No. PCT/IB2019/055595 dated Sep. 16, 2019 (25 pages).

International Search Report and Written Opinion from International Patent Application No. PCT/IB2019/055619 dated Sep. 16, 2019 (26 pages).

International Search Report and Written Opinion from International Patent Application No. PCT/IB2019/055620 dated Sep. 25, 2019 (18 pages).

International Search Report and Written Opinion from International Patent Application No. PCT/IB2019/055621 dated Sep. 30, 2019 (18 pages).

International Search Report and Written Opinion from International Patent Application No. PCT/IB2019/055622 dated Sep. 16, 2019 (13 pages).

International Search Report and Written Opinion from International Patent Application No. PCT/IB2019/055623 dated Sep. 26, 2019 (17 pages).

International Search Report and Written Opinion from International Patent Application No. PCT/IB2019/055624 dated Sep. 26, 2019 (17 pages).

International Search Report and Written Opinion from International Patent Application No. PCT/IB2019/055625 dated Sep. 26, 2019 (19 pages).

International Search Report and Written Opinion from International Patent Application No. PCT/IB2019/055626 dated Sep. 16, 2019 (17 pages).

International Search Report and Written Opinion from International Patent Application No. PCT/IB2019/057690 dated Dec. 16, 2019 (17 pages).

International Search Report and Written Opinion from International Patent Application No. PCT/IB2019/057692 dated Jan. 7, 2020 (16 pages).

International Search Report and Written Opinion from International Patent Application No. PCT/IB2019/055571 dated Sep. 16, 2019 (20 pages).

International Search Report and Written Opinion from International Patent Application No. PCT/CN2020/080597 dated Jun. 30, 2020(11 pages).

Non-Final Office Action from U.S. Appl. No. 16/803,706 dated Apr. 17, 2020.

(56) References Cited

OTHER PUBLICATIONS

Non-Final Office Action from U.S. Appl. No. 16/796,693 dated Apr. 28, 2020.
Non-Final Office Action from U.S. Appl. No. 16/796,708 dated May 29, 2020.
Non-Final Office Action from U.S. Appl. No. 16/993,598 dated Oct. 14, 2020.
Final Office Action from U.S. Appl. No. 16/796,693 dated Oct. 27, 2020.
Non-Final Office Action from U.S. Appl. No. 17/019,675 dated Nov. 10, 2020.
Non-Final Office Action from U.S. Appl. No. 17/005,634 dated Nov. 13, 2020.
Non-Final Office Action from U.S. Appl. No. 17/019,753 dated Nov. 17, 2020.
Non-Final Office Action from U.S. Appl. No. 17/031,322 dated Nov. 17, 2020.
Non-Final Office Action from U.S. Appl. No. 17/011,068 dated Nov. 19, 2020.
Non-Final Office Action from U.S. Appl. No. 17/018,200 dated Nov. 20, 2020.
Non-Final Office Action from U.S. Appl. No. 16/998,296 dated Nov. 24, 2020.
Non-Final Office Action from U.S. Appl. No. 16/998,258 dated Nov. 25, 2020.
Non-Final Office Action from U.S. Appl. No. 17/005,702 dated Nov. 27, 2020.
Non-Final Office Action from U.S. Appl. No. 17/005,574 dated Dec. 1, 2020.
Non-Final Office Action from U.S. Appl. No. 17/011,058 dated Dec. 15, 2020.
Non-Final Office Action from U.S. Appl. No. 17/071,139 dated Dec. 15, 2020.
Non-Final Office Action from U.S. Appl. No. 16/993,561 dated Dec. 24, 2020.
Non-Final Office Action from U.S. Appl. No. 17/031,404 dated Dec. 24, 2020.
Notice of Allowance from U.S. Appl. No. 16/796,693 dated Feb. 10, 2021.
Notice of Allowance from U.S. Appl. No. 17/011,068 dated Mar. 1, 2021.
Notice of Allowance from U.S. Appl. No. 17/018,200 dated Mar. 1, 2021.
Final Office Action from U.S. Appl. No. 17/019,753 dated Mar. 8, 2021.
Final Office Action from U.S. Appl. No. 17/019,675 dated Mar. 19, 2021.
Notice of Allowance from U.S. Appl. No. 16/998,296 dated Mar. 23, 2021.
Notice of Allowance from U.S. Appl. No. 16/998,258 dated Mar. 24, 2021.
Non-Final Office Action from U.S. Appl. No. 17/011,058 dated Apr. 13, 2021.
Final Office Action from US Patent Application No. 17/071,139 dated Apr. 16, 2021.
Notice of Eligibility of Grant from Singapore Patent Application No. 11202011714R dated Jul. 25, 2022 (10 pages).
Zhang et al. "CE4-related: History-based Motion Vector Prediction", Joint Video Experts Team (JVET) of ITU-T SG 16 WP 3 and ISO/IEC JTC 1/SC 29/WG 11, Document JVET-K0104 v1, Meeting Report of the 11th meeting of the Joint Video Experts Team (JVET), Ljubljana, SI, 10-18 (Jul. 2018).
Notice of Allowance from U.S. Appl. No. 17/229,019 dated Oct. 12, 2022.
Non-Final Office Action from U.S. Appl. No. 16/796,708 dated Nov. 23, 2022.
Non-Final Office Action from U.S. Appl. No. 17/457,868 dated Nov. 25, 2022.
Non-Final Office Action from U.S. Appl. No. 17/135,054 dated Nov. 25, 2022.

Rosewarne et al. "High Efficiency Video Coding (HEVC) Test Model 16 (HM 16) Improved Encoder Description Update 9," Joint Collaborative Team on Video Coding (JCT-VC) of ITU SG 16 WP3 and ISO/IEC JTC1/SC 29/WG 11 28th Meeting, Torino, IT, Jul. 15-21, 2017, document JCTVC-AB1002, 2017.
Non-Final Office Action from U.S. Appl. No. 17/019,675 dated Nov. 18, 2021.
Notice of Allowance from U.S. Appl. No. 17/019,753 dated Dec. 1, 2021.
Non-Final Office Action from U.S. Appl. No. 17/480,184 dated Dec. 29, 2021.
Bandyopadhyay, Saurav, "Cross-Check of JVET-M0436:AHG2: Regarding HMVO Table Size," Joint Video Experts Team (JVET) of ITU-T SG 16 WP 3 and ISO/IEC JTC 1/SC 29/WG 11, 13th Meeting: Marrakech, MA Jan. 9-18, 2019, document JVET-M0562, Jan. 2019.
Bordes et al. "Description of SDR, HDR and 360° video coding technology proposal by Qualcomm and Technicolor—medium complexity version", JVET Meeting, JVET-J0022 (Apr. 2018).
Bross et al. "Versatile Video Coding (Draft 2)," Joint Video Experts Team (JVET) of ITU-T SG 16 WP 3 and ISO/IEC ITC 1/SC 29/WG 11, 11th Meeting, Ljubljana, SI, Jul. 10-18, 2018, document JVET-K1001, 2018.
"Chen et al. ""Description of SDR, HDR and 360° video coding technology proposal by Qualcomm and Technicolor—low and high complexity versions"", Joint Video Exploration Team (JVET) of ITU-T SG 16 WP 3 and ISO/IEC JTC 1/SC 29/WG 1110th Meeting: San Diego, US, JVET-J0021 (Apr. 2018)."
Chen et al. "CE4.3.1: Shared merging candidate list", JVET 13th Meeting, JVET-M0170-v1 (Jan. 2019).
Chen et al. "Symmetrical mode for bi-prediction" JVET Meeting, JVET-J0063 (Apr. 2018).
Chen et al. "Internet Video Coding Test Model" (ITM) v 2.0" "Information Technology—Coding of audio-visual objects—Internet Video Coding", Geneva; XP030019221 (May 2012).
Chen et al. "Algorithm description of Joint Exploration Test Model 7 (JEM7)," JVET-G1001, (Jul. 2017).
Chien et al. "Enhanced AMVP Mechanism Based Adaptive Motion Search Range Decision Algorithm for Fast HEVC Coding," IEEE, Institute of Computer and Communication Engineering, 2014, pp. 3696-3699.
Esenlik et al. "Description of Core Experiment 9 (CE9): Decoder Side Motion Vector Derivation" JVET-J1029-r4, (Apr. 2018).
Guionnet et al. "CE5.h: Reducing the Coding Cost of Merge Index by Dynamic Merge Index Reallocation," Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, document JCT3V-B0078, 2012.
Han et al. "A dynamic motion vector referencing scheme for video coding" IEEE International Conference on Image Processing (ICIP), (Sep. 2016).
Information Technology—High efficiency coding and media delivery in heterogeneous environments-Part 2: "High Efficiency Video Coding" ISO/IEC JTC 1/SC 29/WG 11 N 17661, ISO/IEC Dis 23008-2_201x(4th Ed.) (Apr. 2018).
"ITU-T H.265 ""High efficiency video coding"" Series H: Audiovisual and Multimedia SystemsInfrastructure of audiovisual services—Coding of movingvideo, Telecommunicationstandardization Sectorof ITU, Available at address: https://www.itu.int/rec/T-REC-H.265 (Nov. 2019)."
Kudo et al. "Motion Vector Prediction Methods Considering Prediction Continuity in HEVC," Picture Coding Symposium (PCS), 2016.
Lee et al. "EE2.6: Modification of Merge Candidate Derivation: ATMVP Simplification and Merge Pruning," Joint Video Exploration Team (JVET) of ITU-T SG 16 WP 3 and ISO/IEC JTC 1/SC 29/WG 11, 3rd Meeting: Geneva, CH, May 26-Jun. 2016, document JVET-C0035, 2016.
Lee et al. "Non-CE4:HMVP Unification between the Merge and MVP List," Joint Video Experts Team (JVET) of ITU-T SG 16 WP 3 and ISO/IEC JTC 1/SC 29/WG 11, 14th Meeting, Geneva, CH, Mar. 19-27, 2019, document JVET—No. 373, Mar. 2019.

(56) References Cited

OTHER PUBLICATIONS

"Li et al. JVET-D0117r1 ""Multi-Type-Tree"" Joint Video Exploration Team (JVET)of ITU-T SG 16 WP 3 and ISO/IEC JTC 1/SC 29/WG 11,4th Meeting: Chengdu, CN, (Oct. 15-21, 2016)."

Lin et al. "CE3: Summary report on motion prediction for texture coding" JCT-3V Meeting, JCT3V-G0023 (Jan. 2014).

Luthra et al., "Overview of the H.264/AVC video coding standard", Proceedings of SPIE vol. 5203 Applications of Digital Image Processing XXVI., 2003.

Ma et al. "Eleventh Five-Year Plan" teaching materials for ordinary colleges and universities, Principle and Application of S7-200 PLC and Digital Speed Control Systems, Jul. 31, 2009.

Park et al. "Hardware-friendly Advanced Motion Vector Predictor Generation for an HEVC Encoder," Journal of Semiconductor Technology and Science, Dec. 2018, 18(6):737-747.

Rapaka et al. "On intra block copy merge vector handling" JCT-VC Meeting, JCTVC-V0049 (Oct. 2015).

Robert et al. "High precision FRUC with additional candidates" JVET Meeting JVET-D0046 (Oct. 2016).

Sjoberg et al. "Description of SDR and HDR video coding technology proposal by Ericsson and Nokia" JVET Meeting, JVET-J0012-v1 (Apr. 2018).

Solovyev et al. "CE-4.6: Simplification for Merge List Derivation in Triangular Prediction Mode," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0454, Mar. 2019.

Sprljan et al. "TE3 subtest 3: Local intensity compensation (LIC) for inter prediction", JCT-VC of ITU-T SG16 WP3 and ISO/IEC JTC1/SC29/WG11, 3rd Meeting: Guangzhou, CN, JCTVC-C233 (Oct. 2010).

"Sullivan et al., "Overview of the High Efficiency Video Coding (HEVC) Standard", IEEE Transactions on Circuits and Systems for Video Technology, vol. 22, No. 12, Dec. 2012."

"Toma et al. ""Description of SDR video coding technology proposal by Panasonic"", Joint Video Experts Team (JVET) of ITU-T SG 16 WP 3 and ISO/IEC JTC 1/SC 29/WG 1110th Meeting: San Diego, US, JVET-J0020-v1and v2 (Apr. 2018)."

"Versatile Video Coding (VVC)", JVET, JEM-7.0, Available at address: https://jvet.hhi.fraunhofer.de/svn/svn_HMJEMSoftware/tags/ HM-16.6-JEM-7.0. Accessed on Feb. 11, 2020.

Wang et al. "Spec text for the agreed starting point on slicing and tiling", JVET 12th Meeting, JVET-L0686-v2 (Oct. 2018).

Xu et al. "Intra block copy improvement on top of Tencent's CfP response" JVET Meeting, JVET-J0050-r2 (Apr. 2018).

Yang et al. "Description of Core Experiment 4 (CE4): Inter prediction and motion vector coding" JVET-K1024 (Jul. 2018).

Yang et al. Description of Core Experiment 4 (CE4); Interprediction and Motion Vector Coding,JVET Meeting, The Joint Video Exploration Team of ISO/IEC JTC1/SC29/WG11 and ITU-TSG. 16 No Meeting San Diego, Apr. 20, 2018, Document JVET-J1024, Apr. 20, 2018.

Yu et al. "Parallel AMVP Candidate List Construction for HEVC," Conference: Visual Communications and Image Processing (VCIP), Nov. 2012, IEEE, retrieved May 12, 2016.

Zhang et al. "CE2-related: Early awareness of accessing temporal blocks in sub-block merge list construction", JVET-M0273 (Jan. 2019).

Zhang et al. ""CE4: History-based Motion Vector Prediction(Test 4.4.7)"", Joint Video Experts Team (JVET) of ITU-T SG 16 WP 3 and ISO/IEC JTC 1/SC 29/WG 11, 12th meeting: Macao, CN, Oct. 3-12, 2018, Document JVET-L0266-v1and v2, Oct. 12, 2018.

Zhang et al. "CE4-related: History-based Motion Vector Prediction", Joint Video Experts Team (JVET) of ITU-T SG 16 WP 3 and ISO/IEC JTC 1/SC 29/WG 11, Document JVET-K0104-v5, Meeting Report of the 11th meeting of the Joint Video Experts Team (JVET), Ljubljana, SI, 10-18 (Jul. 2018).

Zhang et al. "CE4-related: Restrictions on History-based Motion Vector Prediction", JVET-M0272 (Jan. 2019).

Zhang et al., "History-Based Motion Vector Prediction in Versatile Video Coding", 2019 Data Compression Conference (DCC), IEEE, pp. 43-52, XP033548557 (Mar. 2019).

Zhang et al. "CE4-4.4: Merge List Construction for Triangular Prediction Mode," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0269, Mar. 2019.

Zhang et al. "CE10-related: Merge List Construction Process for Triangular Protection Mode," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0271, Jan. 2019.

Zhu et al. "Simplified HMVP," Joint Video Experts Team (JVET) of ITU-T SG 16 WP 3 and ISO/IEC JTC 1/SC 29/WG 11, 13th Meeting: Marrakech, MA, Jan. 9-18, 2019, Document JVET-M0473, Jan. 2019.

International Search Report and Written Opinion from International Patent Application No. PCT/IB2019/055549 dated Aug. 20, 2019 (16 pages).

International Search Report and Written Opinion from International Patent Application No. PCT/IB2019/055575 dated Aug. 20, 2019 (12 pages).

International Search Report and Written Opinion from International Patent Application No. PCT/IB2019/055576 dated Sep. 16, 2019 (15 pages).

International Search Report and Written Opinion from International Patent Application No. PCT/IB2019/055582 dated Sep. 20, 2019 (18 pages).

International Search Report and Written Opinion from International Patent Application No. PCT/CN2020/071656 dated Apr. 3, 2020(12 pages).

International Search Report and Written Opinion from International Patent Application No. PCT/CN2020/071332 dated Apr. 9, 2020(9 pages).

International Search Report and Written Opinion from International Patent Application No. PCT/CN2020/072387 dated Apr. 20, 2020(10 pages).

Akula et al. "Description of SDR, HDR and 360° video coding technology proposal considering mobile application scenario by Samsung, Huawei, GoPro, and HiSilicon" Joint Video Exploration Team (JVET)of ITU-T SG 16 WP 3 and ISO/IEC JTC 1/SC 29/WG 1110th Meeting: San Diego, US, Apr. 10-20, 2018, document JVET-J0024, 2018.

Joshi et al. "Screen Content Coding Test Model 3 (SCM 3)," Joint Collaborative Team on Video Coding (JCT-VC) of ITU-T SG 16 WP 3 and ISO/IEC JTC 1/SC 29/WG 11 19th Meeting Stasbourg, FR, Oct. 17-24, 2014, document JCTVC-S1014, 2014, pp. 1-12.

Jiang et al. "A Fast Candidate Selection Method for Merge Mode Based on Adaptive Threshold," Journal of Optoelectronics: Laser, Sep. 2016, 27(9):980-986.

Zhao et al. "CE4: Methods of Reducing Number of Pruning Checks of History Based Motion Vector Prediction (Test 4.1.1)," Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0124, 2019.

Non-Final Office Action from U.S. Appl. No. 17/374,160 dated Jul. 3, 2023.

Non-Final Office Action from U.S. Appl. No. 17/374,311 dated Aug. 7, 2023.

Nevdyaev, Telecommunication Technologies, English-Russian Explanatory Dictionary and Reference Book, Communications and Business, Moscow, 2002, p. 44 & p. 431.

Non-Final Office Action from U.S. Appl. No. 17/369,132 dated Mar. 30, 2023.

Liao et al. "CE10.3.1.b: Triangular Prediction Unit Mode," Joint Video Exploration Team (JVET) of ITU-T SG 16 WP 3 and ISO/IEC JTC 1/SC 29/WG 11 12th Meeting: Macao, CN, Oct. 3-12, 2018, Document No. JVET-L0124, 2018. (cited in CN202080009387 OA1 mailed Dec. 6, 2023).

\* cited by examiner

MOTION CANDIDATES DERIVATION

CROSS-REFERENCE TO RELATED APPLICATION

This application is a continuation of International Application No. PCT/CN2020/072387, filed on Jan. 16, 2020, which claims the priority to and benefits of International Patent Application No. PCT/CN2019/072058, filed on Jan. 16, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to encoding and decoding digital video using a set of look-up tables (LUTs) containing coding candidates are described. The described methods may be applied to both the existing video coding standards (e.g., High Efficiency Video Coding (HEVC)) and future video coding standards or video codecs.

In one representative aspect, the disclosed technology may be used to provide a method of video processing. This method includes maintaining one or more tables, wherein at least one table of the one or more tables is associated with one or more entries; deriving, based on a first set of motion candidates in the at least one table, a second set of motion candidates; and performing, based on the second set of motion candidates, a conversion between a current block of a video and a bitstream representation of the video.

In another representative aspect, the disclosed technology may be used to provide a method of video processing. This method includes maintaining one or more tables, wherein each of the one or more tables is associated with one or more entries; adaptively changing an insertion order of motion candidates from at least one table of the one or more tables to a candidate list; and performing, based on the candidate list, a conversion between a current block of a video and a bitstream representation of the video.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Example Embodiments of Video Coding

Figure 1:
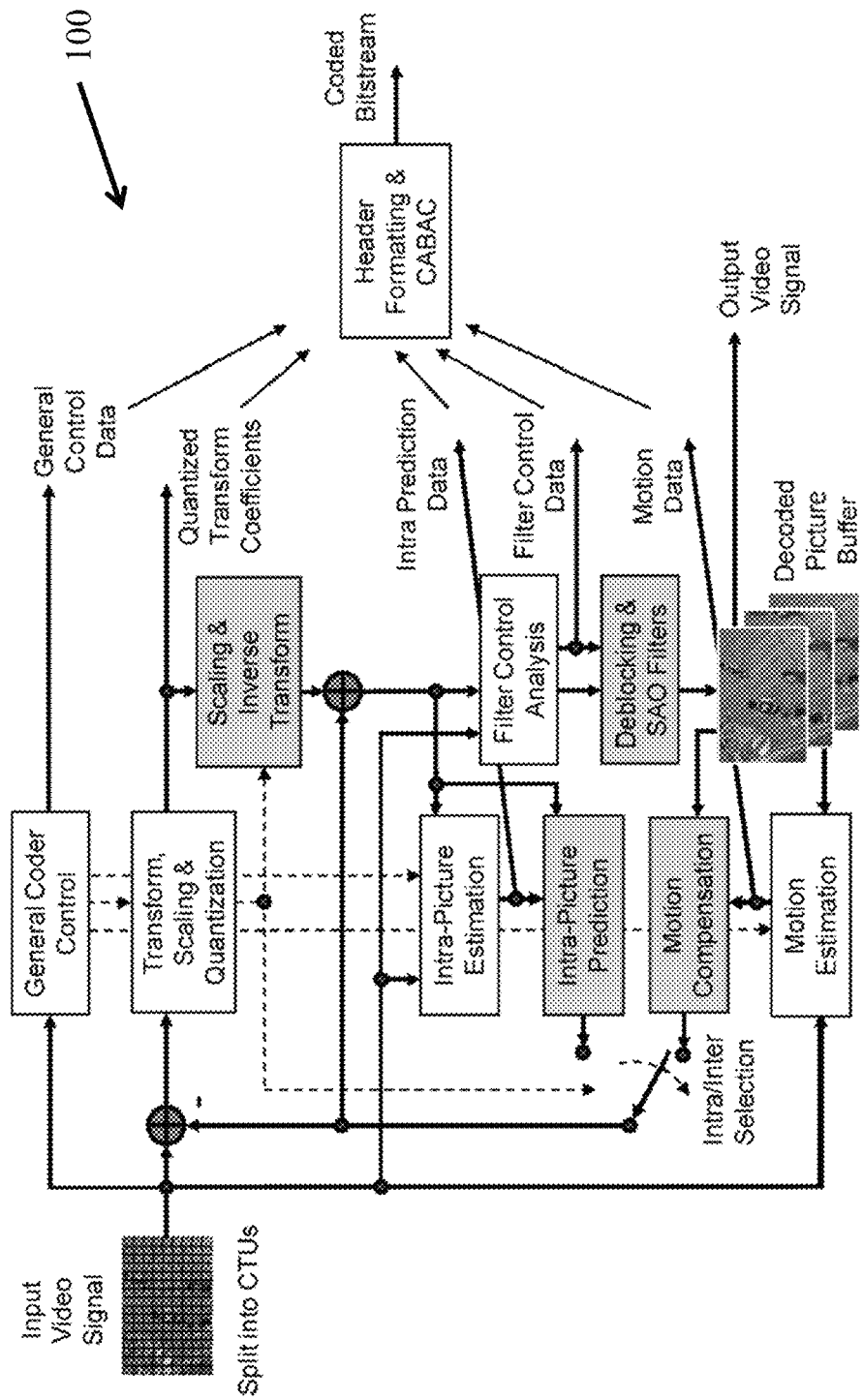
FIG. 1 shows an example block diagram of a typical High Efficiency Video Coding (HEVC) video encoder and decoder.

FIG. 1 shows an example block diagram of a typical HEVC video encoder and decoder. An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 1) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (i.e., bitstream order) and the output order (i.e., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

1.1. Examples of Partition Tree Structures in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
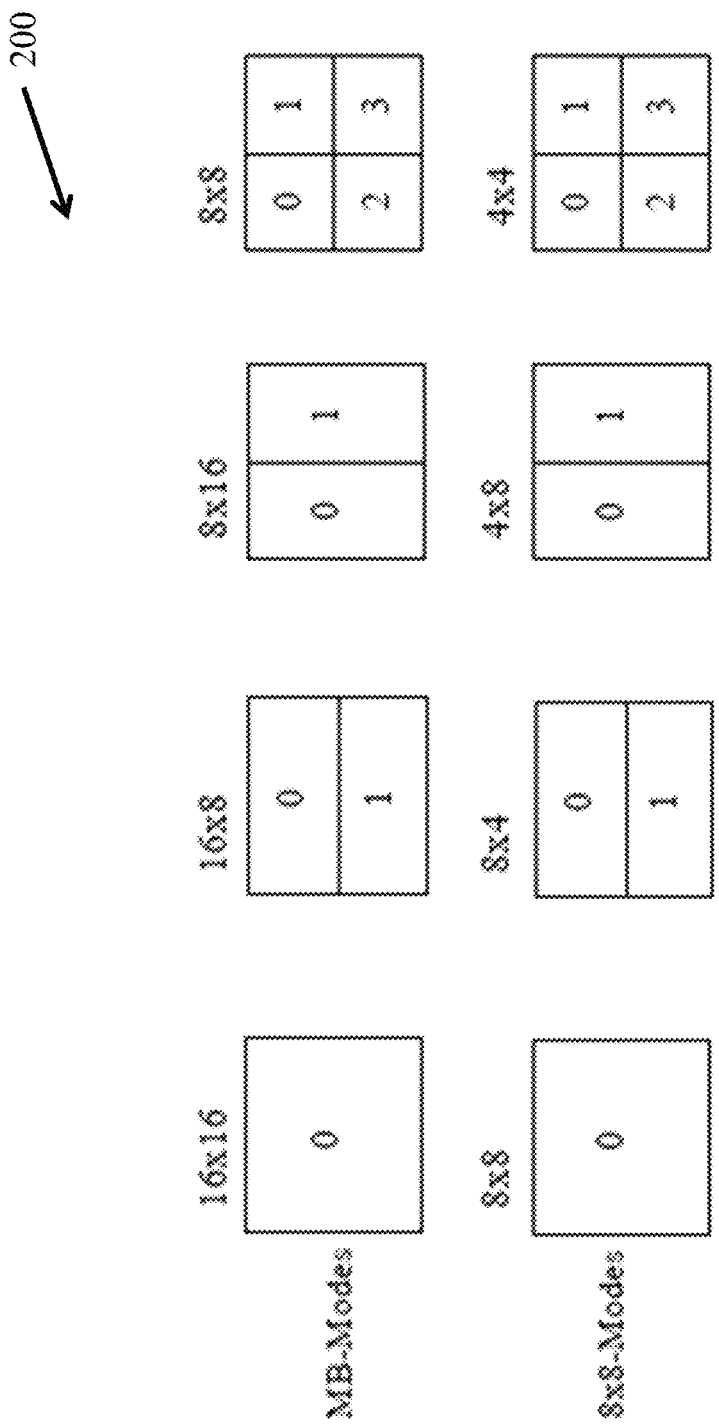
FIG. 2 shows examples of macroblock (MB) partitions in H.264/AVC.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4, as shown in FIG. 2. Only one motion vector (MV) per sub-macroblock partition is allowed.

1.2 Examples of Partition Tree Structures in HEVC

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

Certain features involved in hybrid video coding using HEVC include:

(1) Coding tree units (CTUs) and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size LxL of a luma CTB can be chosen as L=16, 32, or 64 samples, with the larger sizes typically enabling better compression. HEVC then supports a partitioning of the CTBs into smaller blocks using a tree structure and quadtree-like signaling.

(2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
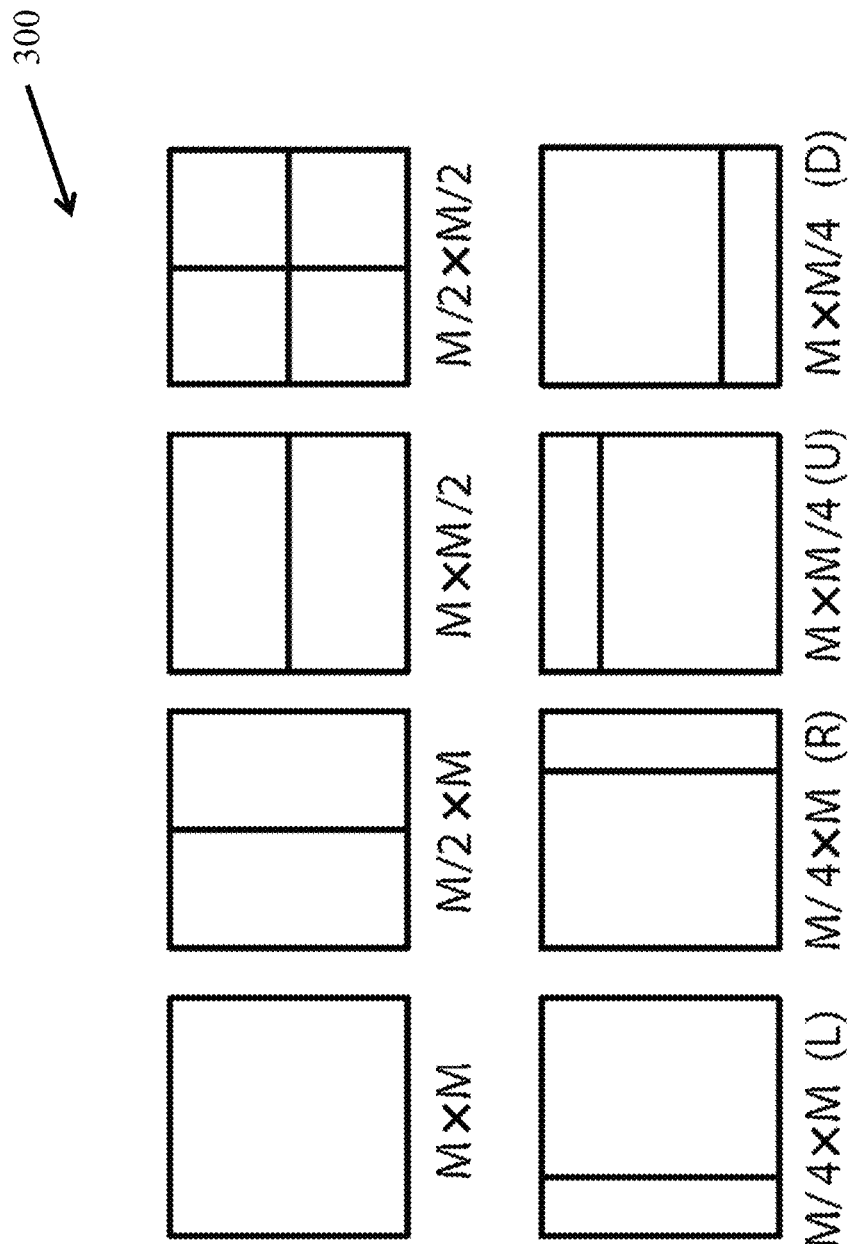
FIG. 3 shows examples of splitting coding blocks (CBs) into prediction blocks (PBs).

(3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for an M×M CU.

(4) Transform units (Tus) and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

1.2.1. Examples of Tree-Structured Partitioning into TBs and TUs

Figure 4A:
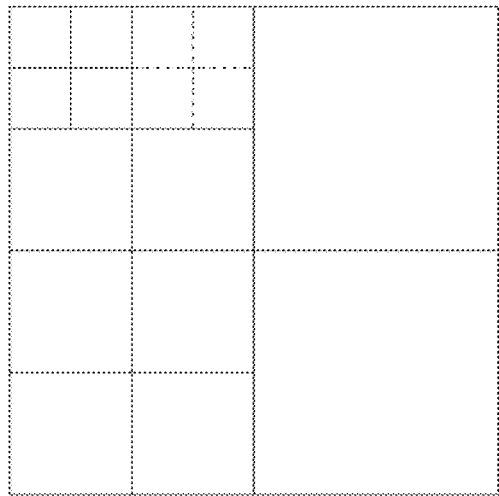
FIGS. 4A and 4B show an example of the subdivision of a coding tree block (CTB) into CBs and transform blocks (TBs), and the corresponding quadtree, respectively.
Figure 4B:
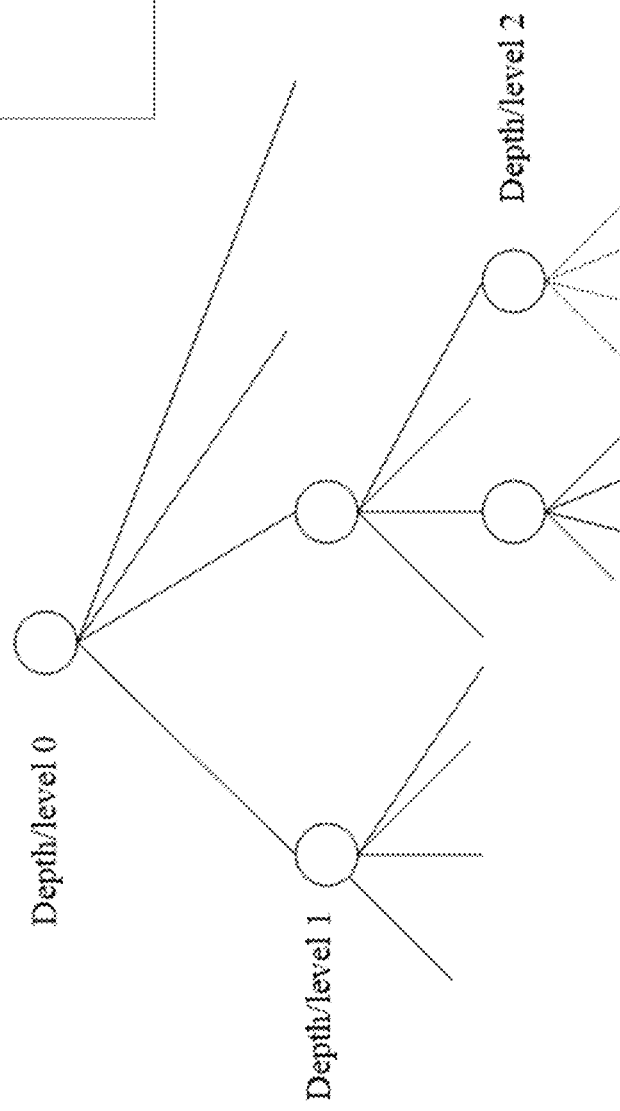

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the sequence parameter set (SPS), each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

1.2.2. Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

1.3. Examples of Quadtree Plus Binary Tree Block Structures with Larger CTUs in JEM In some embodiments, future video coding technologies are explored using a reference software known as the Joint Exploration Model (JEM). In addition to binary tree structures, JEM describes quadtree plus binary tree (QTBT) and ternary tree (TT) structures.

1.3.1. Examples of the QTBT Block Partitioning Structure

Figure 5A:
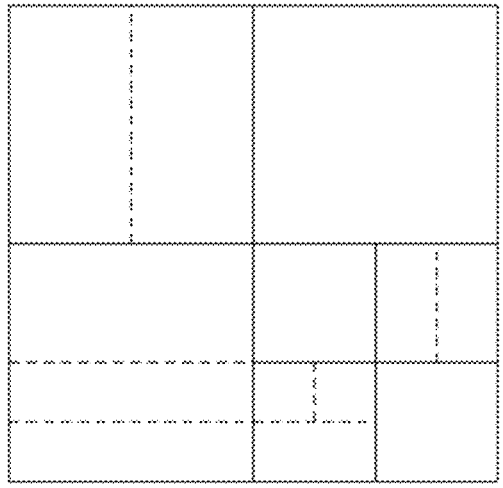
FIGS. 5A and 5B show an example of the subdivisions and a corresponding QTBT (quadtree plus binary tree) for a largest coding unit (LCU).

In contrast to HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 5A, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme:
  CTU size: the root node size of a quadtree, the same concept as in HEVC
  MinQTSize: the minimally allowed quadtree leaf node size
  MaxBTSize: the maximally allowed binary tree root node size
  MaxBTDepth: the maximally allowed binary tree depth
  MinBTSize: the minimally allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

Figure 5B:
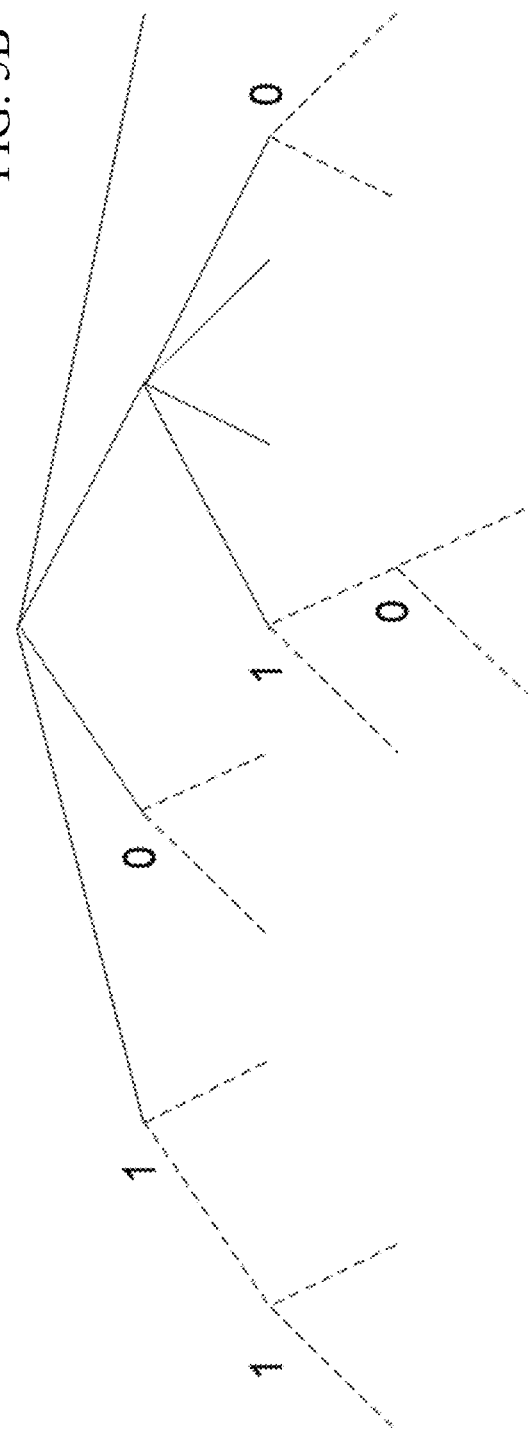

FIG. 5A shows an example of block partitioning by using QTBT, and FIG. 5B shows the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

1.4. Ternary-Tree (TT) for Versatile Video Coding (VVC)

Figure 6A:
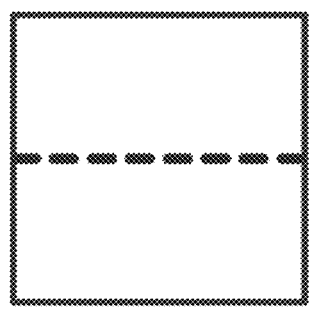
FIGS. 6A-6E show examples of partitioning a coding block.
Figure 6B:
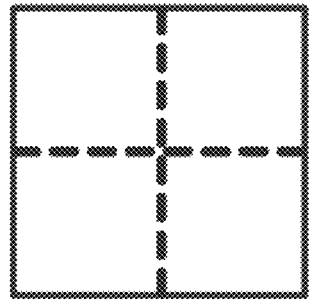
Figure 6E:
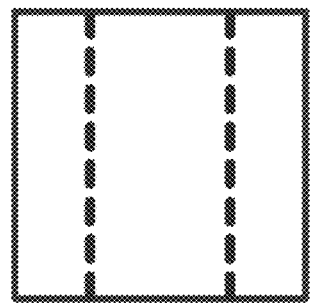
Figure 6D:
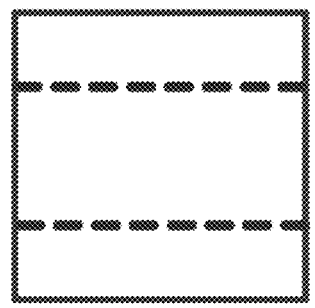
Figure 6C:
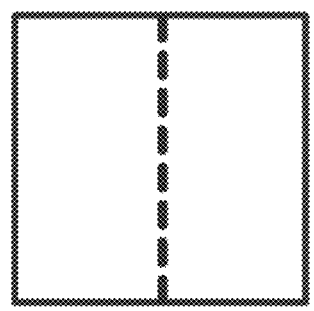

FIG. 6A shows an example of quad-tree (QT) partitioning, and FIGS. 6B and 6C show examples of the vertical and horizontal binary-tree (BT) partitioning, respectively. In some embodiments, and in addition to quad-trees and binary-trees, ternary tree (TT) partitions, e.g., horizontal and vertical center-side ternary-trees (as shown in FIGS. 6D and 6E) are supported.

In some implementations, two levels of trees are supported: region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

1.5. Examples of Partitioning Structures in Alternate Video Coding Technologies

Figure 7:
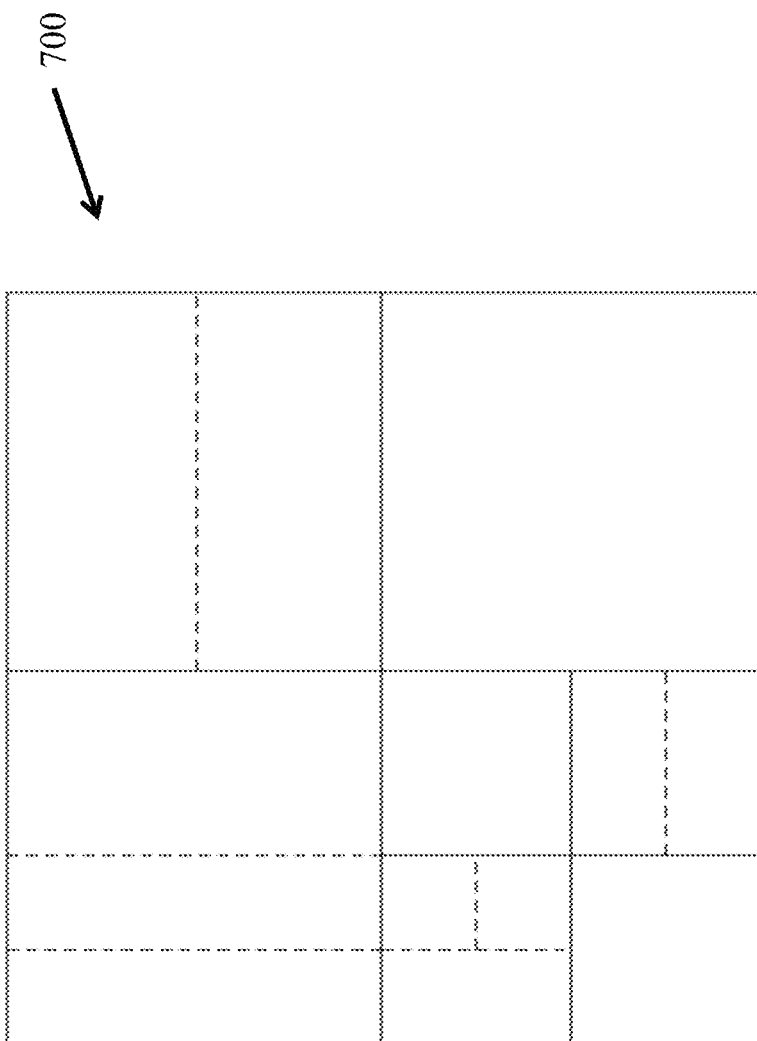
FIG. 7 shows an example subdivision of a CB based on a QTBT.
Figure 8E:
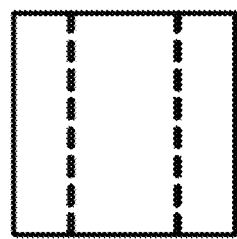
FIGS. 8A-8I show examples of the partitions of a CB supported the multi-tree type (MTT), which is a generalization of the QTBT.
Figure 8D:
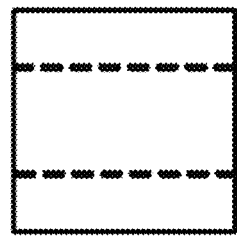
Figure 8I:
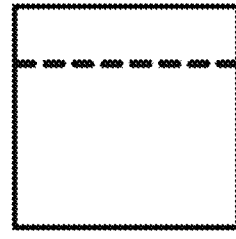
Figure 8C:
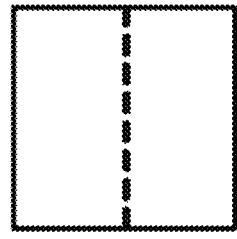
Figure 8H:
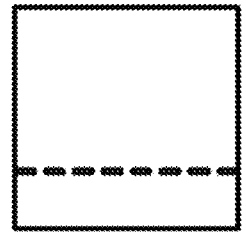
Figure 8B:
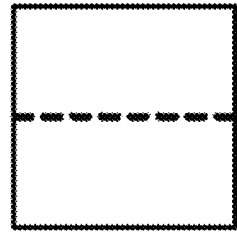
Figure 8G:
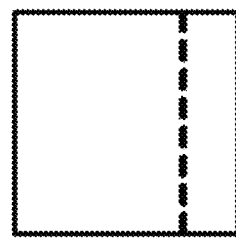
Figure 8A:
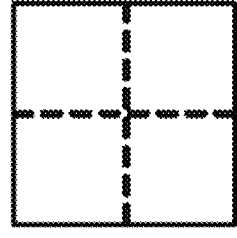
Figure 8F:
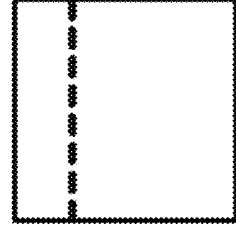

In some embodiments, a tree structure called a Multi-Tree Type (MTT), which is a generalization of the QTBT, is supported. In QTBT, as shown in FIG. 7, a Coding Tree Unit (CTU) is firstly partitioned by a quad-tree structure. The quad-tree leaf nodes are further partitioned by a binary-tree structure.

The structure of the MTT constitutes of two types of tree nodes: Region Tree (RT) and Prediction Tree (PT), supporting nine types of partitions, as shown in FIG. 8. A region tree can recursively split a CTU into square blocks down to a 4×4 size region tree leaf node. At each node in a region tree, a prediction tree can be formed from one of three tree types: Binary Tree, Ternary Tree, and Asymmetric Binary Tree. In a PT split, it is prohibited to have a quadtree partition in branches of the prediction tree. As in JEM, the luma tree and the chroma tree are separated in I slices.

2 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

2.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

2.1.1 Embodiments of Constructing Candidates for Merge Mode

Figure 9:
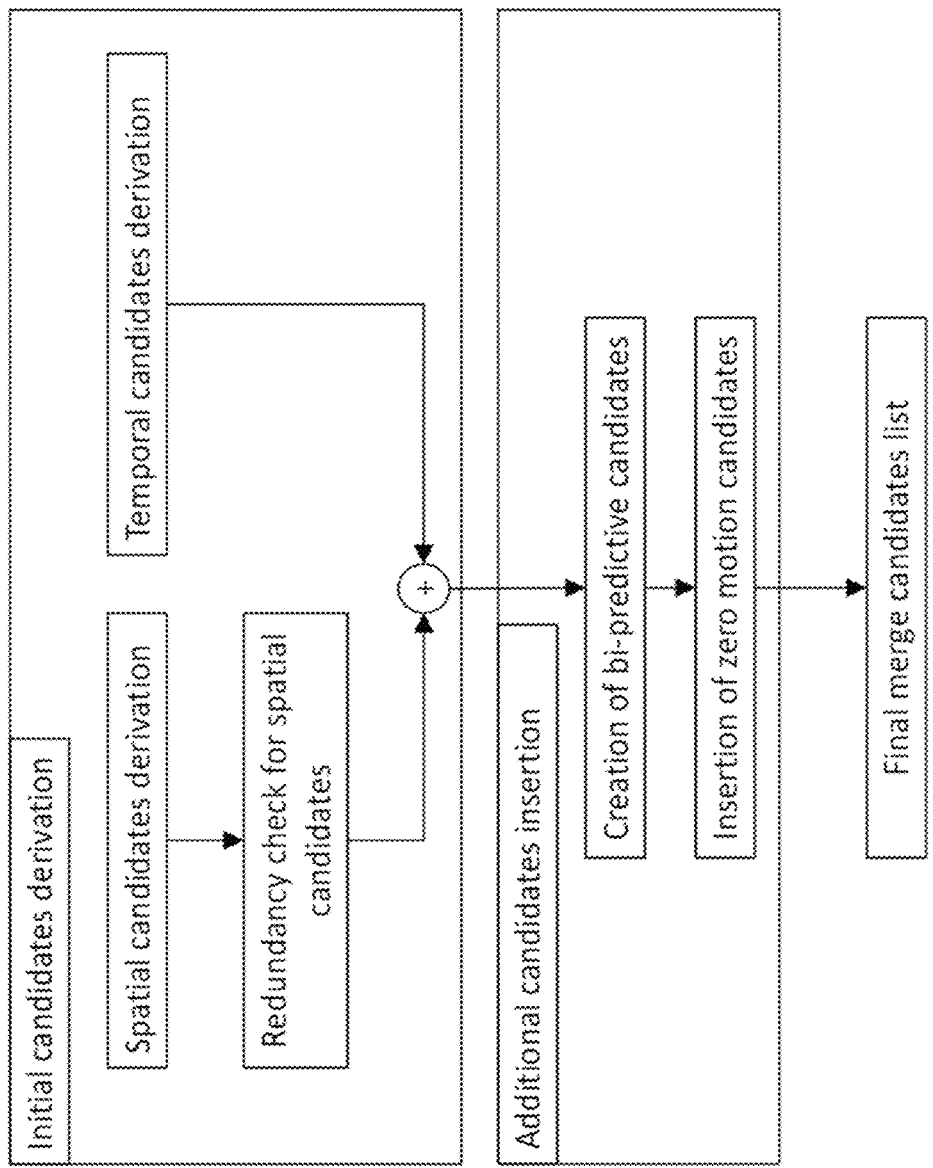
FIG. 9 shows an example of constructing a merge candidate list.

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
    Step 2: Additional candidates insertion
    Step 2.1: Creation of bi-predictive candidates
    Step 2.2: Insertion of zero motion candidates FIG. 9 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

2.1.2 Constructing Spatial Merge Candidates

Figure 10:
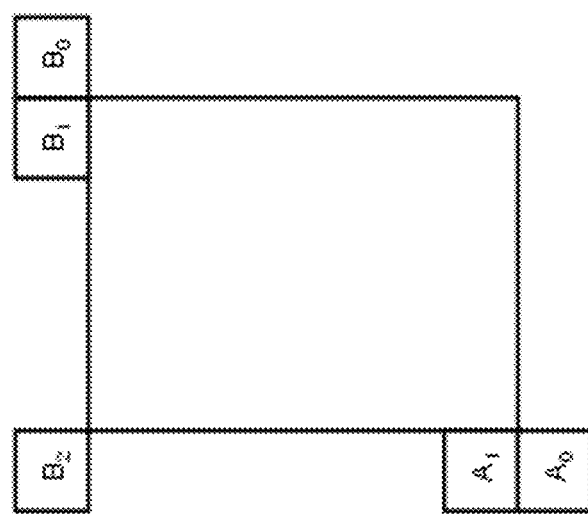
FIG. 10 shows an example of positions of spatial candidates.

In the derivation of spatial merge candidates, a maximum of four merge candidates are selected among candidates located in the positions depicted in FIG. 10. The order of derivation is $A_1, B_1, B_0, A_0$ and $B_2$. Position $B_2$ is considered only when any PU of position $A_1, B_1, B_0, A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 11:
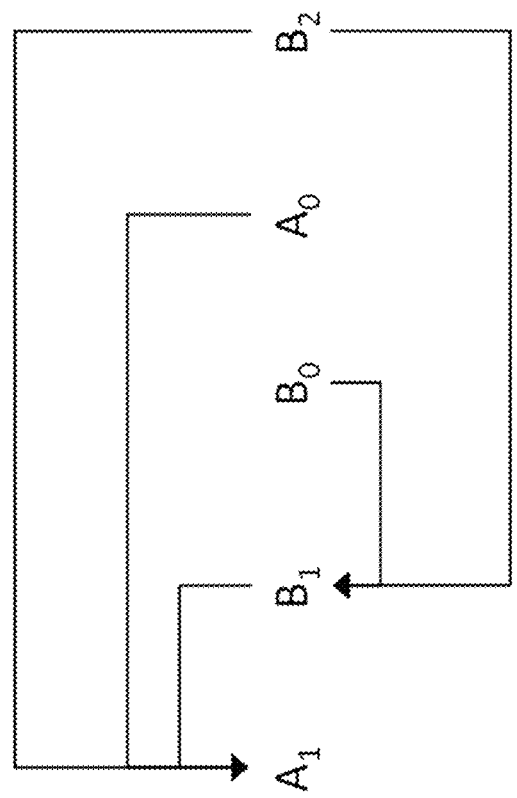
FIG. 11 shows an example of candidate pairs subject to a redundancy check of spatial merge candidates.
Figure 12B:
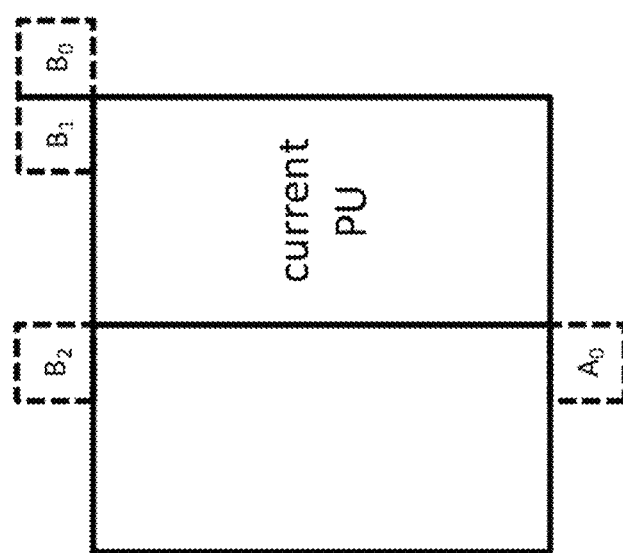
FIGS. 12A and 12B show examples of the position of a second prediction unit (PU) based on the size and shape of the current block.
Figure 12A:
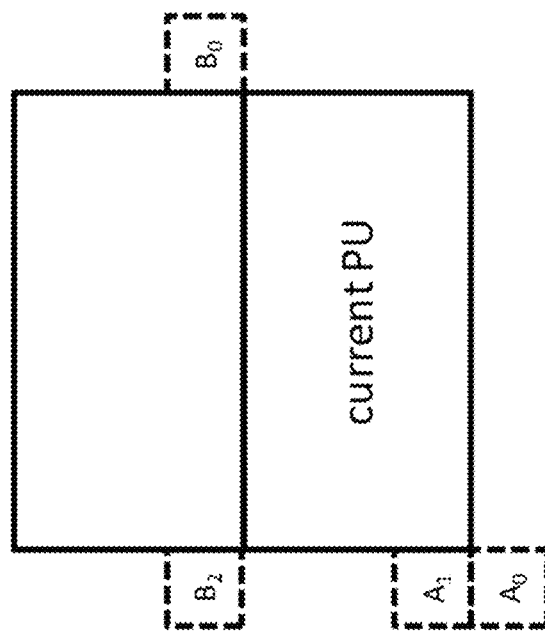

To reduce computational complexity, not all possible candidate pairs are considered in the mentioned redundancy check. Instead only the pairs linked with an arrow in FIG. 11 are considered and a candidate is only added to the list if the corresponding candidate used for redundancy check has not the same motion information. Another source of duplicate motion information is the "second PU" associated with partitions different from 2N×2N. As an example, FIGS. 12A and 12B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

2.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 13:
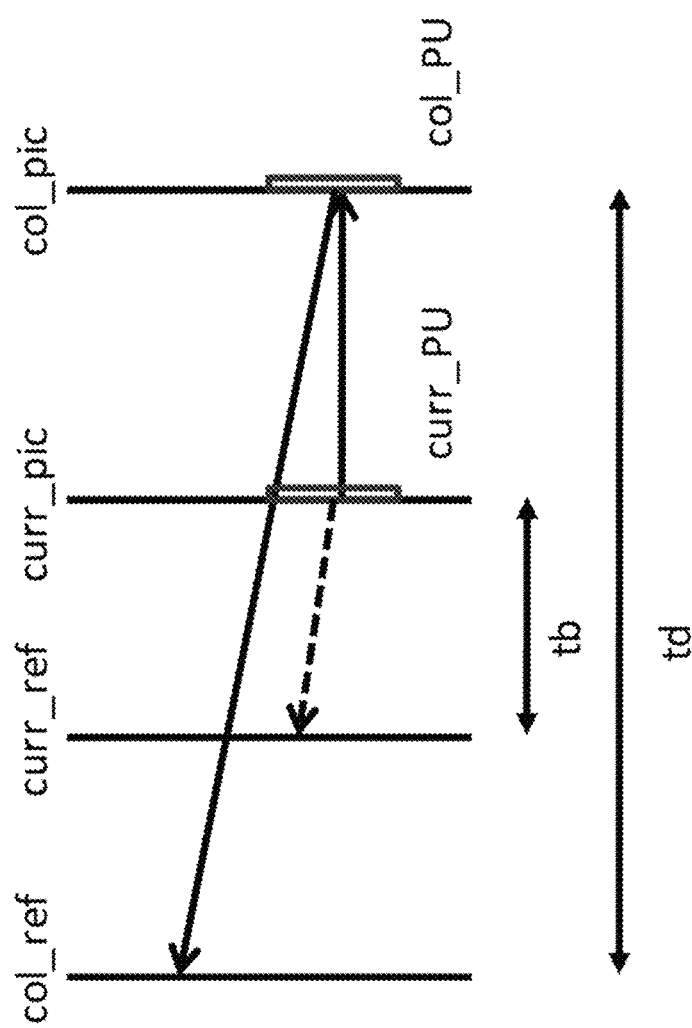
FIG. 13 shows an example of motion vector scaling for temporal merge candidates.

FIG. 13 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 14:
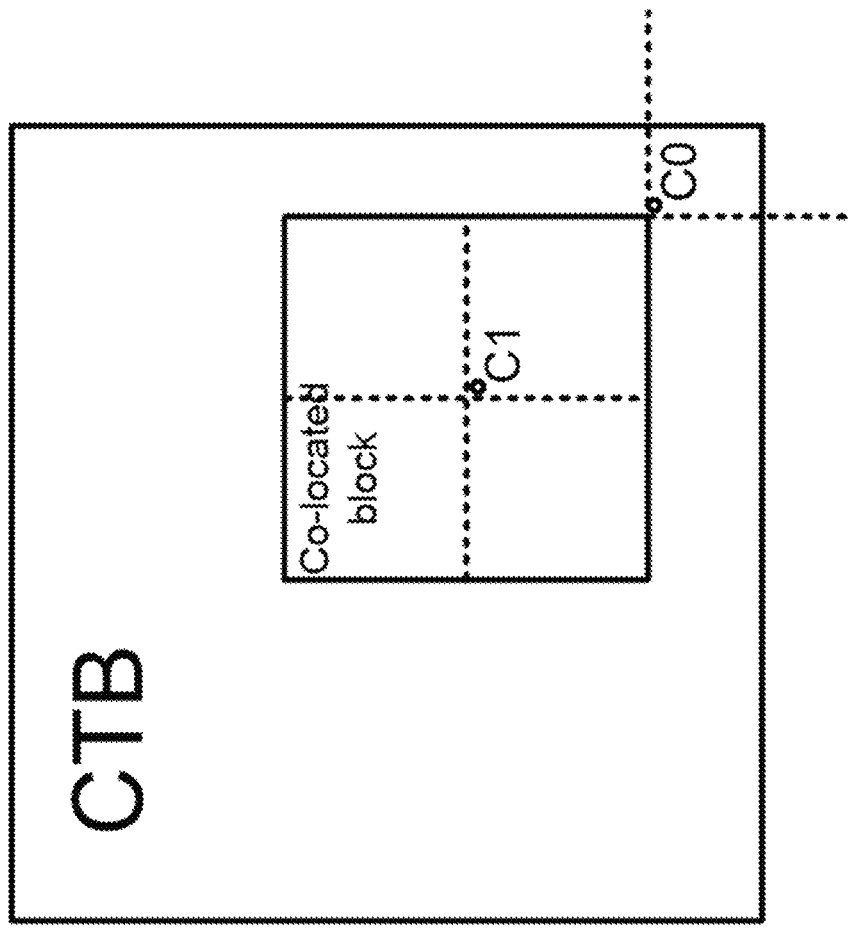
FIG. 14 shows an example of candidate positions for temporal merge candidates in a collocated picture.

In the co-located PU (Y) belonging to the reference frame, the position for the temporal candidate is selected between candidates $C_0$ and $C_1$, as depicted in FIG. 14. If PU at position $C_0$ is not available, is intra coded, or is outside of the current CTU, position $C_1$ is used. Otherwise, position $C_0$ is used in the derivation of the temporal merge candidate.

2.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 15:
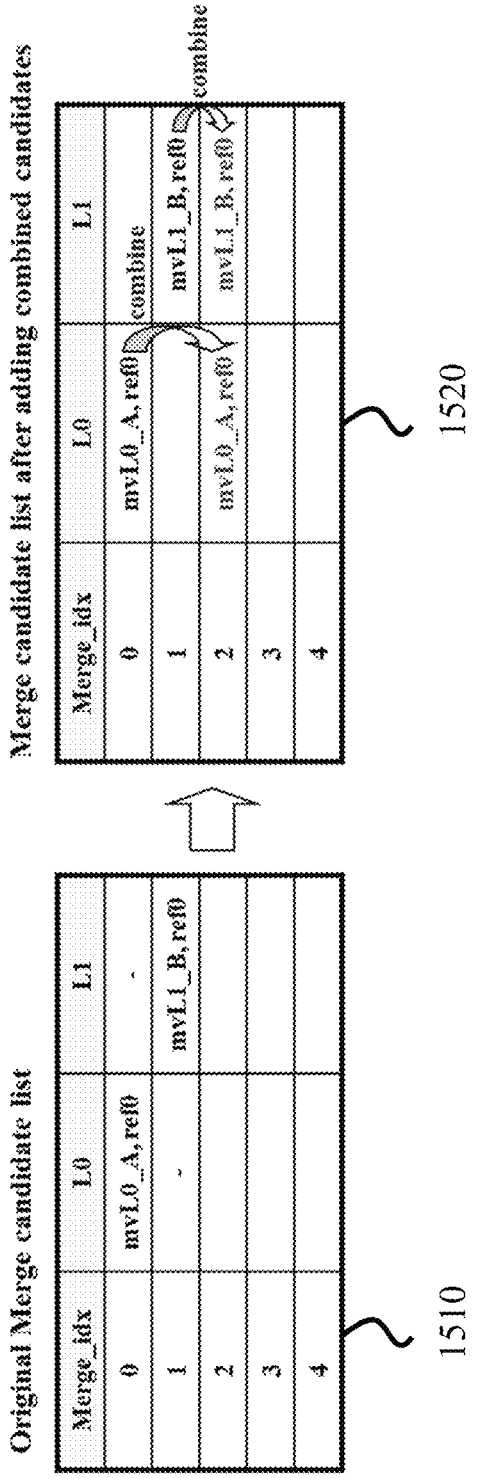
FIG. 15 shows an example of generating a combined bi-predictive merge candidate.

FIG. 15 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

2.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log2_parallel_merge_level_minus2" syntax element. When a MER is defined, merge candidates falling in the same region are marked as unavailable and therefore not considered in the list construction.

The picture parameter set (PPS) raw byte sequence payload (RBSP) syntax is shown in Table 1, where log2_parallel_merge_level_minus2 plus 2 specifies the value of the variable Log2ParMrgLevel, which is used in the derivation process for luma motion vectors for merge mode and the derivation process for spatial merging candidates as specified in an existing video coding standard. The value of log2_parallel_merge_level_minus2 shall be in the range of 0 to CtbLog2SizeY−2, inclusive.

The variable Log2ParMrgLevel is derived as follows:

Log2ParMrgLevel=log2_parallel_merge_level_minus2+2

Note that the value of Log2ParMrgLevel indicates the built-in capability of parallel derivation of the merging candidate lists. For example, when Log2ParMrgLevel is equal to 6, the merging candidate lists for all the prediction units (PUs) and coding units (CUs) contained in a 64×64 block can be derived in parallel.

TABLE 1

General picture parameter set RBSP syntax

| | Descriptor |
|---|---|
| pic_parameter_set_rbsp( ) { | |
|   pps_pic_parameter_set_id | ue(v) |
|   pps_seq_parameter_set_id | ue(v) |
|   dependent_slice_segments_enabled_flag | u(1) |
|   ... | |
|   pps_scaling_list_data_present_flag | u(1) |
|   if( pps_scaling_list_data_present_flag ) | |
|     scaling_list_data( ) | |
|   lists_modification_present_flag | u(1) |
|   log2_parallel_merge_level_minus2 | ue(v) |
|   slice_segment_header_extension_present_flag | u(1) |
|   pps_extension_present_flag | u(1) |
|   ... | |
|   rbsp_trailing_bits( ) | |
| } | |

2.2 Embodiments of Motion Vector Prediction in AMVP Mode

Motion vector prediction exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary.

2.2.1 Examples of Constructing Motion Vector Prediction Candidates

Figure 16:
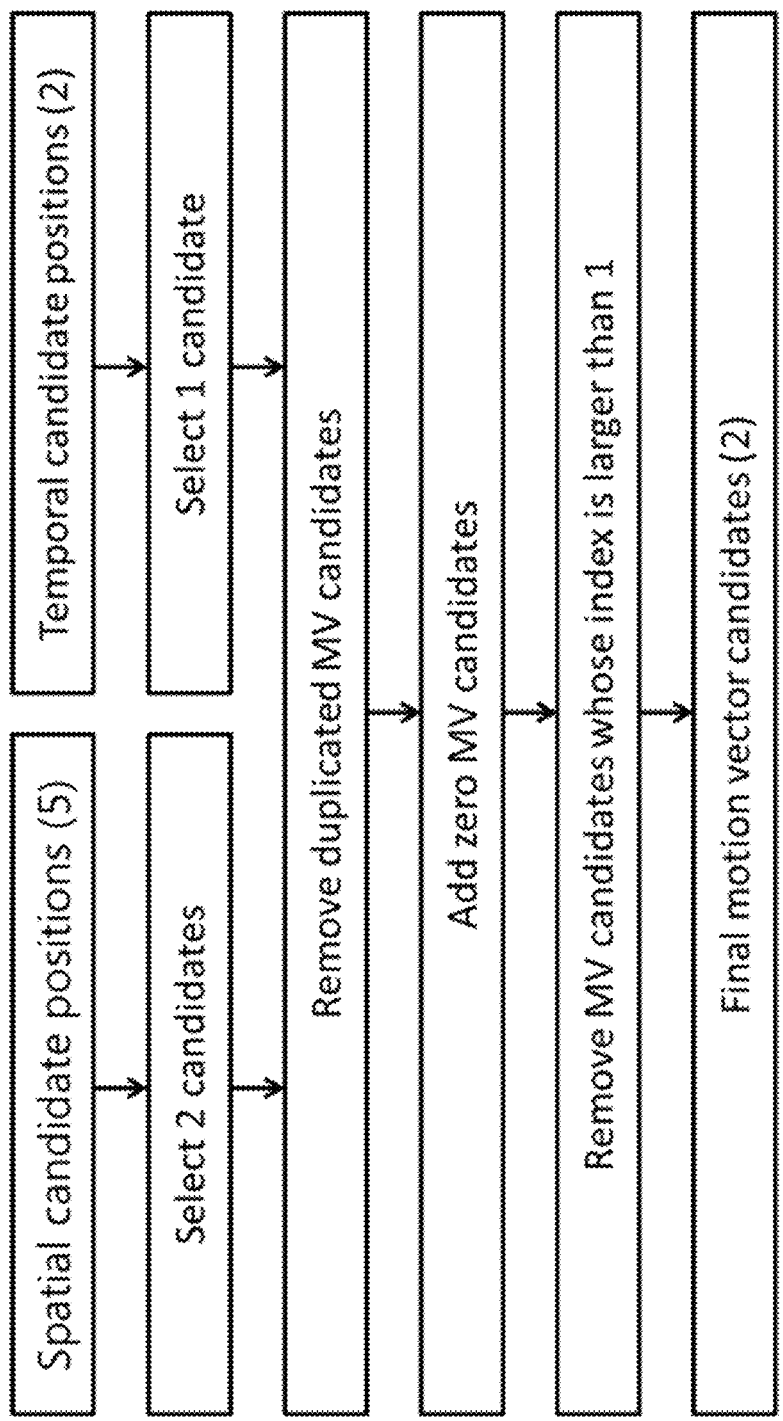
FIG. 16 shows an example of a derivation process for motion vector prediction candidates.

FIG. 16 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 10.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2 Constructing Spatial Motion Vector Candidates

In the derivation of spatial motion vector candidates, a maximum of two candidates are considered among five potential candidates, which are derived from PUs located in positions as previously shown in FIG. 10, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No Spatial Scaling
  (1) Same reference picture list, and same reference picture index (same POC)
  (2) Different reference picture list, but same reference picture (same POC)

Spatial Scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
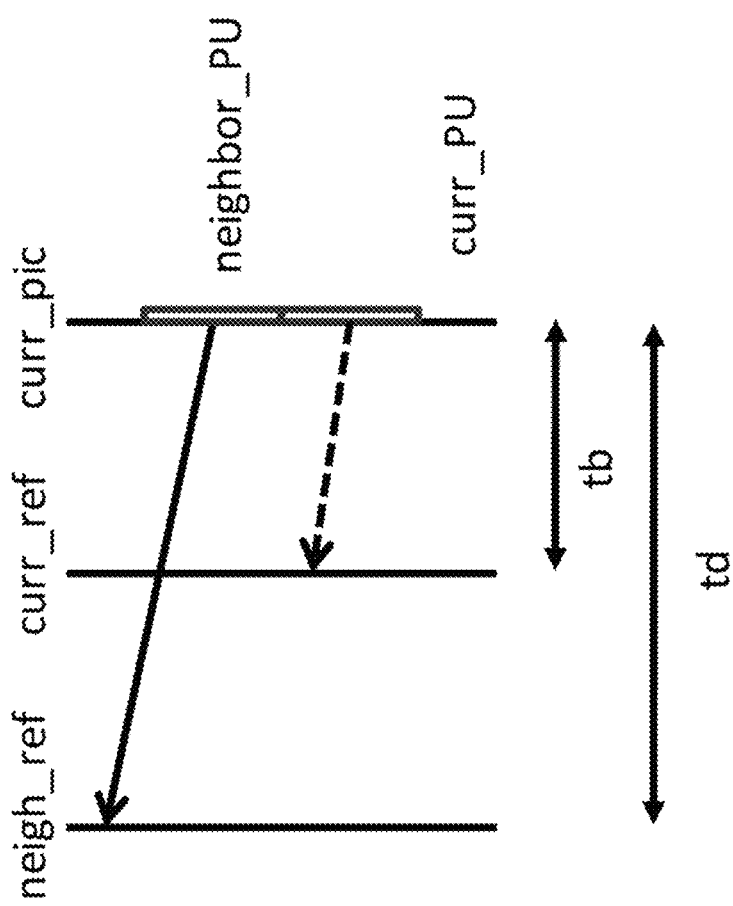
FIG. 17 shows an example of motion vector scaling for spatial motion vector candidates.

As shown in the example in FIG. 17, for the spatial scaling case, the motion vector of the neighbouring PU is scaled in a similar manner as for temporal scaling. One difference is that the reference picture list and index of current PU is given as input; the actual scaling process is the same as that of temporal scaling.

2.2.3 Constructing Temporal Motion Vector Candidates

Apart from the reference picture index derivation, all processes for the derivation of temporal merge candidates are the same as for the derivation of spatial motion vector candidates (as shown in the example in FIG. 14). In some embodiments, the reference picture index is signaled to the decoder.

2.2.4 Signaling of Merge/AMVP Information

For the AMVP mode, four parts may be signalled in the bitstream, e.g., prediction direction, reference index, MVD and my predictor candidate index, which are described in the context of the syntax shown in Table 2-4. While for the merge mode, only a merge index may need to be signalled.

TABLE 2

General slice segment header syntax

| | Descriptor |
|---|---|
| slice_segment_header( ) { | |
|   ... | |
|   if( slice_type = = P \|\| slice_type = = B) { | |
|     if( ( weighted_pred_flag && slice_type = = P) \|\| | |
|       ( weighted_bipred_flag && slice_type = = B ) ) | |
|       pred_weight_table( ) | |
|     five_minus_max_num_merge_cand | ue(v) |
|     if( motion_vector_resolution_control_idc = = 2) | |
|       use_integer_mv_flag | u(1) |
|   } | |
|   ... | |

TABLE 3

Prediction unit syntax

| | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |

TABLE 3-continued

Prediction unit syntax

| | Descriptor |
|---|---|
|     merge_idx[ x0 ][ y0 ] | ae(v) |
| } else {/* MODE_INTER */ | |
|   merge_flag[ x0 ][ y0 ] | ae(v) |
|   if( merge_flag[ x0 ][ y0 ] ) { | |
|     if( MaxNumMergeCand > 1 ) | |
|       merge_idx[ x0 ][ y0 ] | ae(v) |
|   } else { | |
|     if( slice_type = = B ) | |
|       inter_pred_idc[ x0 ][ y0 ] | ae(v) |
|     if( inter_pred_idc[ x0 ][ y0 ] != PRED_L1 ) { | |
|       if( num_ref_idx_l0_active_minus1 > 0 ) | |
|         ref_idx_l0[ x0 ][ y0 ] | ae(v) |
|       mvd_coding( x0, y0, 0) | |
|       mvp_l0_flag[ x0 ][ y0 ] | ae(v) |
|     } | |
|     if( inter_pred_idc[ x0 ][ y0 ] != PRED_L0 ) { | |
|       if( num_ref_idx_l1_active_minus1 > 0 ) | |
|         ref_idx_l1[ x0 ][ y0 ] | ae(v) |
|       if( mvd_l1_zero_flag && inter_pred_idc[ x0 ][ y0 ] = = PRED_BI ) { | |
|         MvdL1[ x0 ][ y0 ][ 0 ] = 0 | |
|         MvdL1[ x0 ][ y0 ][ 1 ] = 0 | |
|       } else | |
|         mvd_coding( x0, y0, 1) | |
|       mvp_l1_flag[ x0 ][ y0 ] | ae(v) |
|     } | |
|   } | |
| } | |
| } | |

TABLE 4

Motion vector difference syntax

| | Descriptor |
|---|---|
| mvd_coding( x0, y0, refList ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

The corresponding semantics include:

five_minus_max_num_merge_cand specifies the maximum number of merging MVP candidates supported in the slice subtracted from 5. The maximum number of merging MVP candidates, MaxNumMergeCand is derived as follows:

MaxNumMergeCand=5−five_minus_max_num_merge_cand

The value of MaxNumMergeCand shall be in the range of 1 to 5, inclusive.

merge_flag[x0][y0] specifies whether the inter prediction parameters for the current prediction unit are inferred from a neighboring inter-predicted partition. The array indices x0, y0 specify the location (x0, y0) of the top-left luma sample of the considered prediction block relative to the top-left luma sample of the picture.

When merge_flag[x0][y0] is not present, it is inferred as follows:

If CuPredMode[x0][y0] is equal to MODE_SKIP, merge_flag[x0][y0] is inferred to be equal to 1.

Otherwise, merge_flag[x0][y0] is inferred to be equal to 0.

merge_idx[x0][y0] specifies the merging candidate index of the merging candidate list where x0, y0 specify the location (x0, y0) of the top-left luma sample of the considered prediction block relative to the top-left luma sample of the picture.

3. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

3.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

3.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 18:
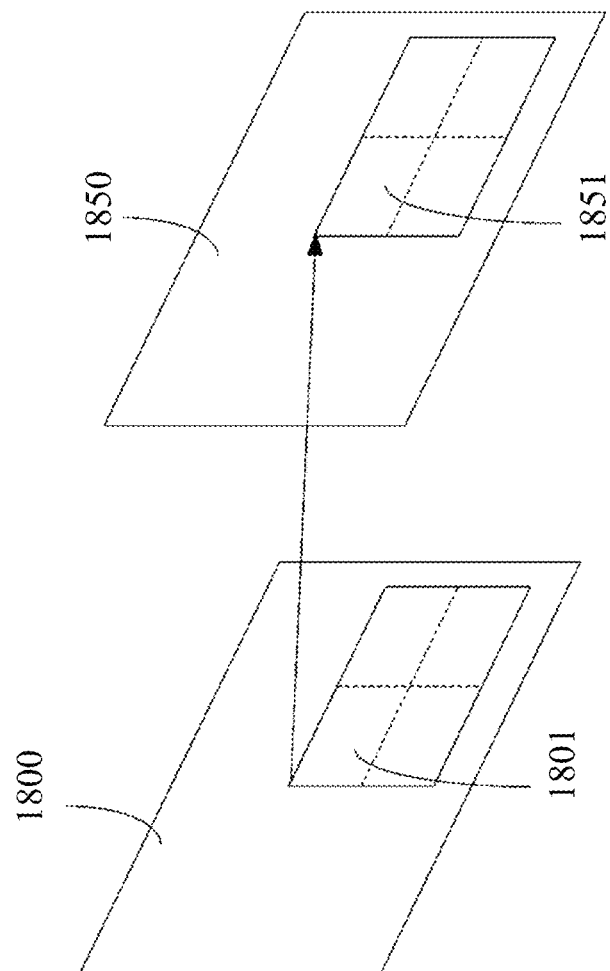
FIG. 18 shows an example of motion prediction using the alternative temporal motion vector prediction (ATMVP) algorithm for a coding unit (CU).
Figure 18:
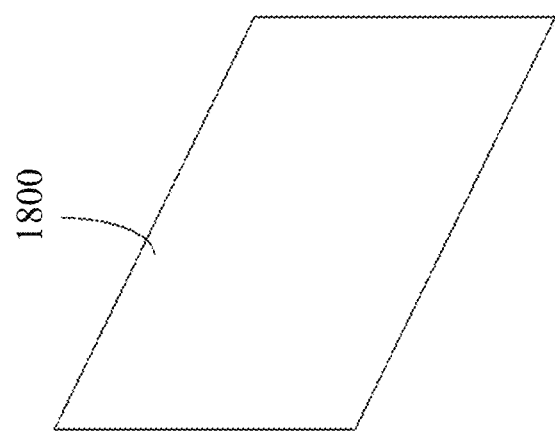

FIG. 18 shows an example of ATMVP motion prediction process for a CU 1800. The ATMVP method predicts the motion vectors of the sub-CUs 1801 within a CU 1800 in two steps. The first step is to identify the corresponding block 1851 in a reference picture 1850 with a temporal vector. The reference picture 1850 is also referred to as the motion source picture. The second step is to split the current CU 1800 into sub-CUs 1801 and obtain the motion vectors as well as the reference indices of each sub-CU from the block corresponding to each sub-CU.

In the first step, a reference picture 1850 and the corresponding block is determined by the motion information of the spatial neighboring blocks of the current CU 1800. To avoid the repetitive scanning process of neighboring blocks, the first merge candidate in the merge candidate list of the current CU 1800 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

Figure 19:
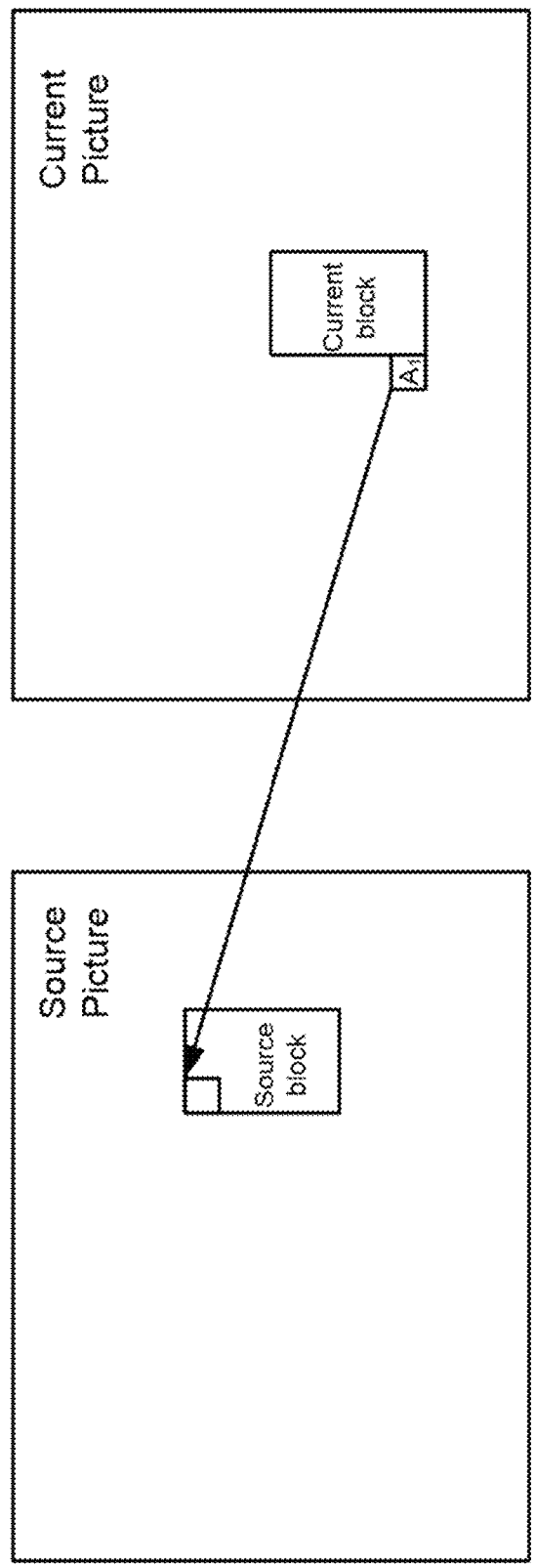
FIG. 19 shows an example of the identification of a source block and source picture.

In one example, if the first merge candidate is from the left neighboring block (i.e., $A_1$ in FIG. 19), the associated MV and reference picture are utilized to identify the source block and source picture.

In the second step, a corresponding block of the sub-CU 1851 is identified by the temporal vector in the motion source picture 1850, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

3.1.2 Examples of Spatial-Temporal Motion Vector Prediction (STMVP)

Figure 20:
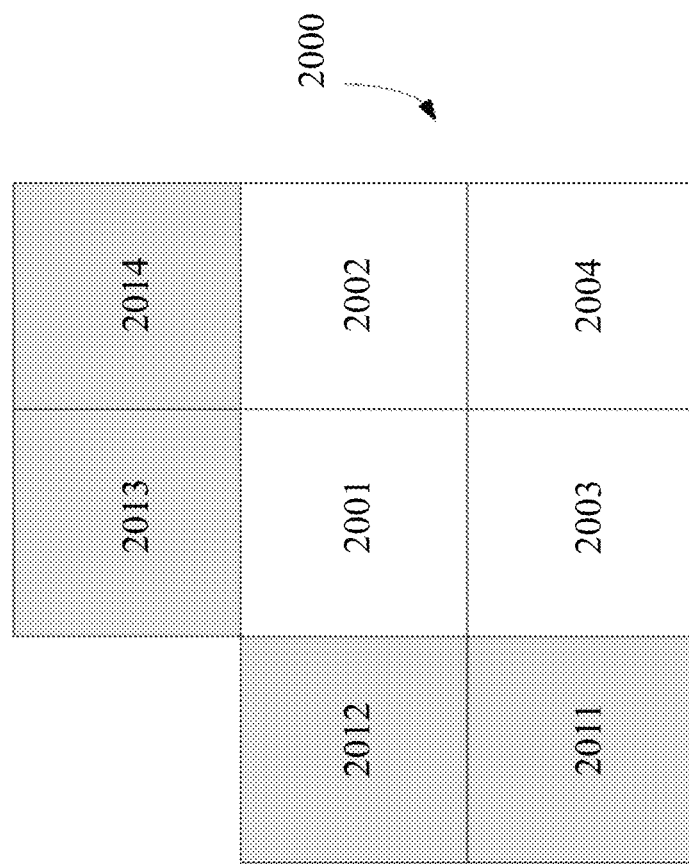
FIG. 20 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 20 shows an example of one CU with four sub-blocks and neighboring blocks. Consider an 8×8 CU 2000 that includes four 4×4 sub-CUs A (2001), B (2002), C (2003), and D (2004). The neighboring 4×4 blocks in the current frame are labelled as a (2011), b (2012), c (2013), and d (2014).

The motion derivation for sub-CU A starts by identifying its two spatial neighbors. The first neighbor is the N×N block above sub-CU A 1101 (block c 2013). If this block c (2013) is not available or is intra coded the other N×N blocks above sub-CU A (2001) are checked (from left to right, starting at block c 2013). The second neighbor is a block to the left of the sub-CU A 2001 (block b 2012). If block b (2012) is not available or is intra coded other blocks to the left of sub-CU A 2001 are checked (from top to bottom, staring at block b 2012). The motion information obtained from the neighboring blocks for each list is scaled to the first reference frame for a given list. Next, temporal motion vector predictor (TMVP) of sub-block A 2001 is derived by following the same procedure of TMVP derivation as specified in HEVC. The motion information of the collocated block at block D 2004 is fetched and scaled accordingly. Finally, after retrieving and scaling the motion information, all available motion vectors are averaged separately for each reference list. The averaged motion vector is assigned as the motion vector of the current sub-CU.

3.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

3.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

3.2.1 Examples of AMVP Candidate List Construction

In JEM, the procedure is similar to the HEVC design. However, when the current block chooses a lower precision of MVs (e.g., integer-precision), rounding operations may be applied. In the current implementation, after selecting the 2 candidates from spatial positions, if both are available, these two are rounded, followed by pruning.

3.3 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad \text{Eq. (3)}$$

Figure 21:
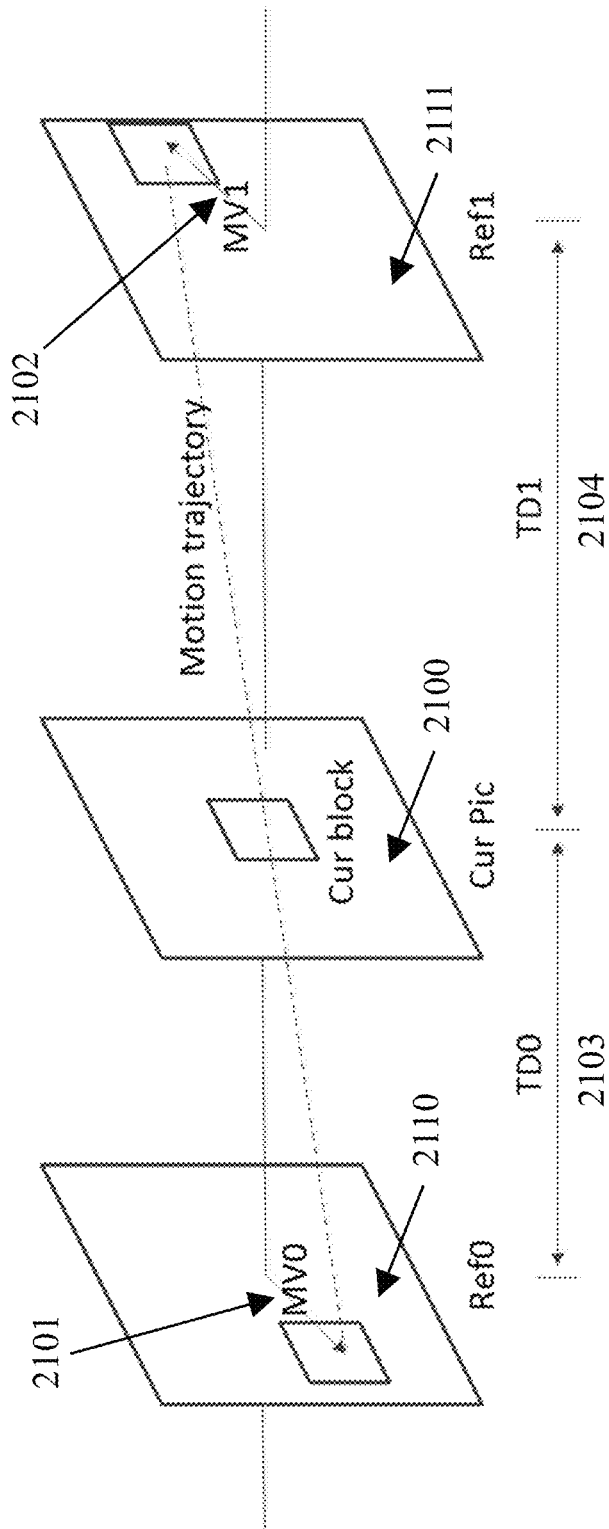
FIG. 21 shows an example of bilateral matching in pattern matched motion vector derivation (PMMVD) mode, which is a special merge mode based on the frame-rate up conversion (FRUC) algorithm.

FIG. 21 shows an example of bilateral matching used in the Frame-Rate Up Conversion (FRUC) method. The bilateral matching is used to derive motion information of the current CU by finding the closest match between two blocks along the motion trajectory of the current CU (2100) in two different reference pictures (2110, 2111). Under the assumption of continuous motion trajectory, the motion vectors MV0 (2101) and MV1 (2102) pointing to the two reference blocks are proportional to the temporal distances, e.g., TD0 (2103) and TD1 (2104), between the current picture and the two reference pictures. In some embodiments, when the current picture 2100 is temporally between the two reference pictures (2110, 2111) and the temporal distance from the current picture to the two reference pictures is the same, the bilateral matching becomes mirror based bi-directional MV.

Figure 22:
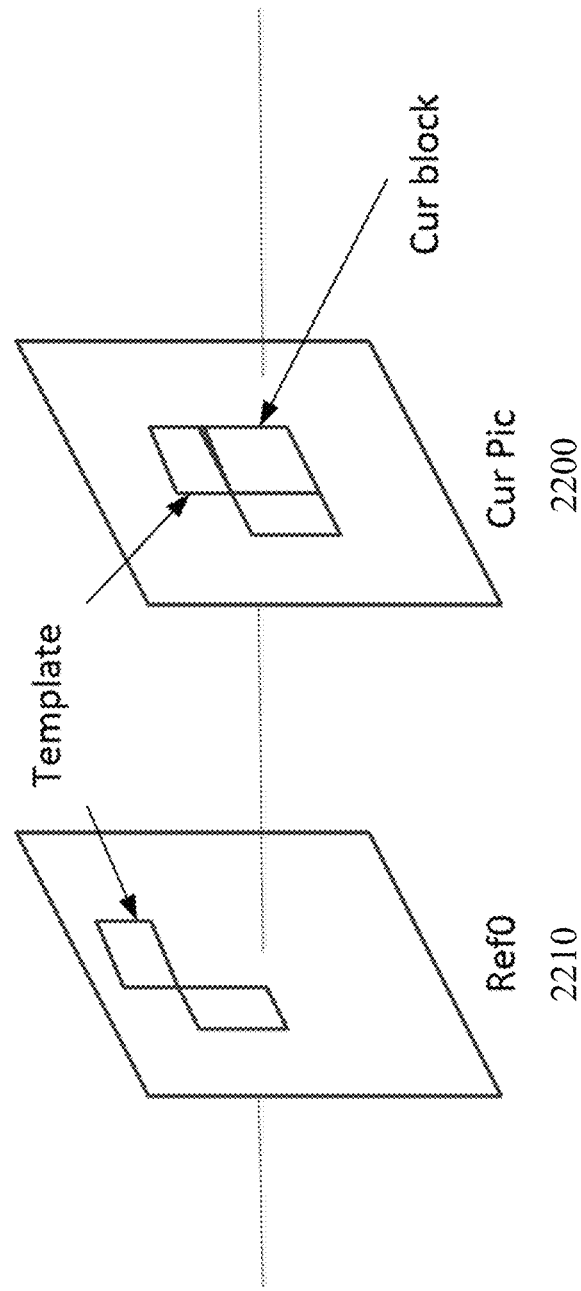
FIG. 22 shows an example of template matching in the FRUC algorithm.

FIG. 22 shows an example of template matching used in the Frame-Rate Up Conversion (FRUC) method. Template matching can be used to derive motion information of the current CU 2200 by finding the closest match between a template (e.g., top and/or left neighboring blocks of the current CU) in the current picture and a block (e.g., same size to the template) in a reference picture 2210. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture refb of its paired bilateral MV is found in the other reference list B so that $ref_a$ and $ref_b$ are temporally at different sides of the current picture. If such a refb is not available in reference list B, $ref_b$ is determined as a reference which is different from $ref_a$ and its temporal distance to the current picture is the minimal one in list B. After $ref_b$ is determined, MVb is derived by scaling MVa based on the temporal distance between the current picture and $ref_a$, $ref_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 23:
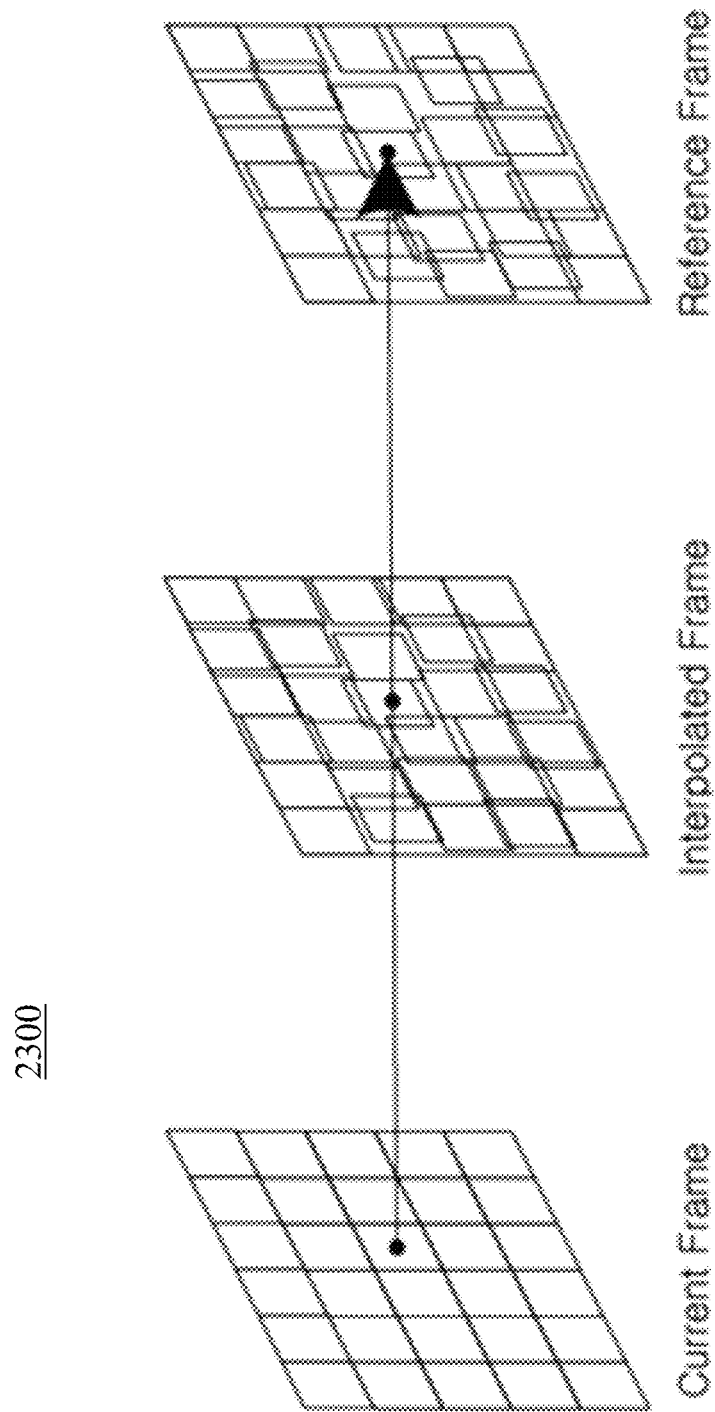
FIG. 23 shows an example of unilateral motion estimation in the FRUC algorithm.

In some embodiments, the motion field of each reference pictures in both reference lists is traversed at 4×4 block level. FIG. 23 shows an example of unilateral Motion Estimation (ME) 2300 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C=SAD+w\cdot(|MV_x-MV_x^s|+|MV_y-MV_y^s|) \quad \text{Eq. (4)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
bi-prediction is used;
Otherwise, if cost0<=cost1
uni-prediction from list0 is used;
Otherwise,
uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

3.4 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
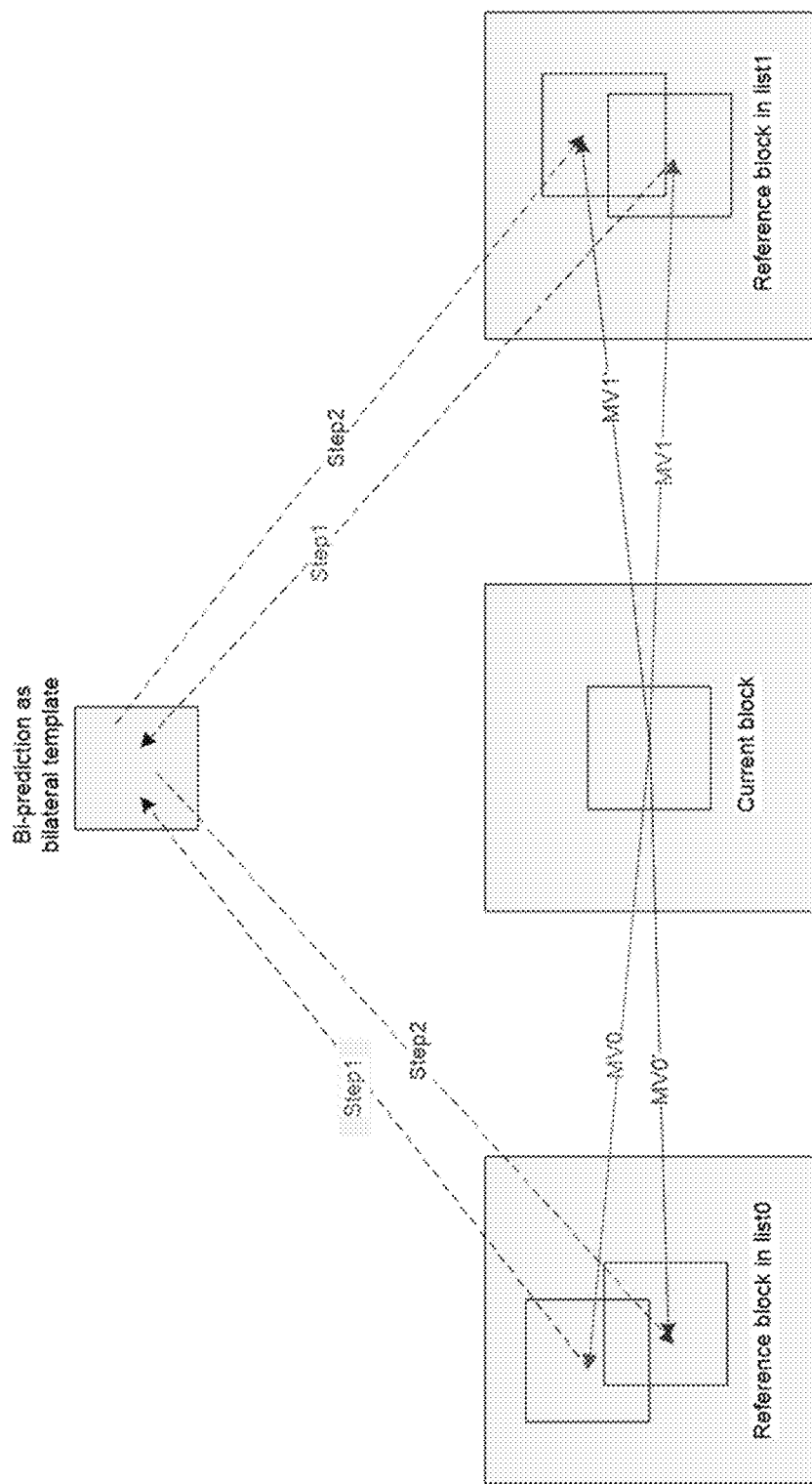
FIG. 24 shows an example of the decoder-side motion vector refinement (DMVR) algorithm based on bilateral template matching.

In DMVR, a bilateral template is generated as the weighted combination (i.e. average) of the two prediction blocks, from the initial MV0 of list0 and MV1 of list1, respectively, as shown in FIG. 24. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3.5 Examples of Merge/Skip Mode with Bilateral Matching Refinement

Figure 25:
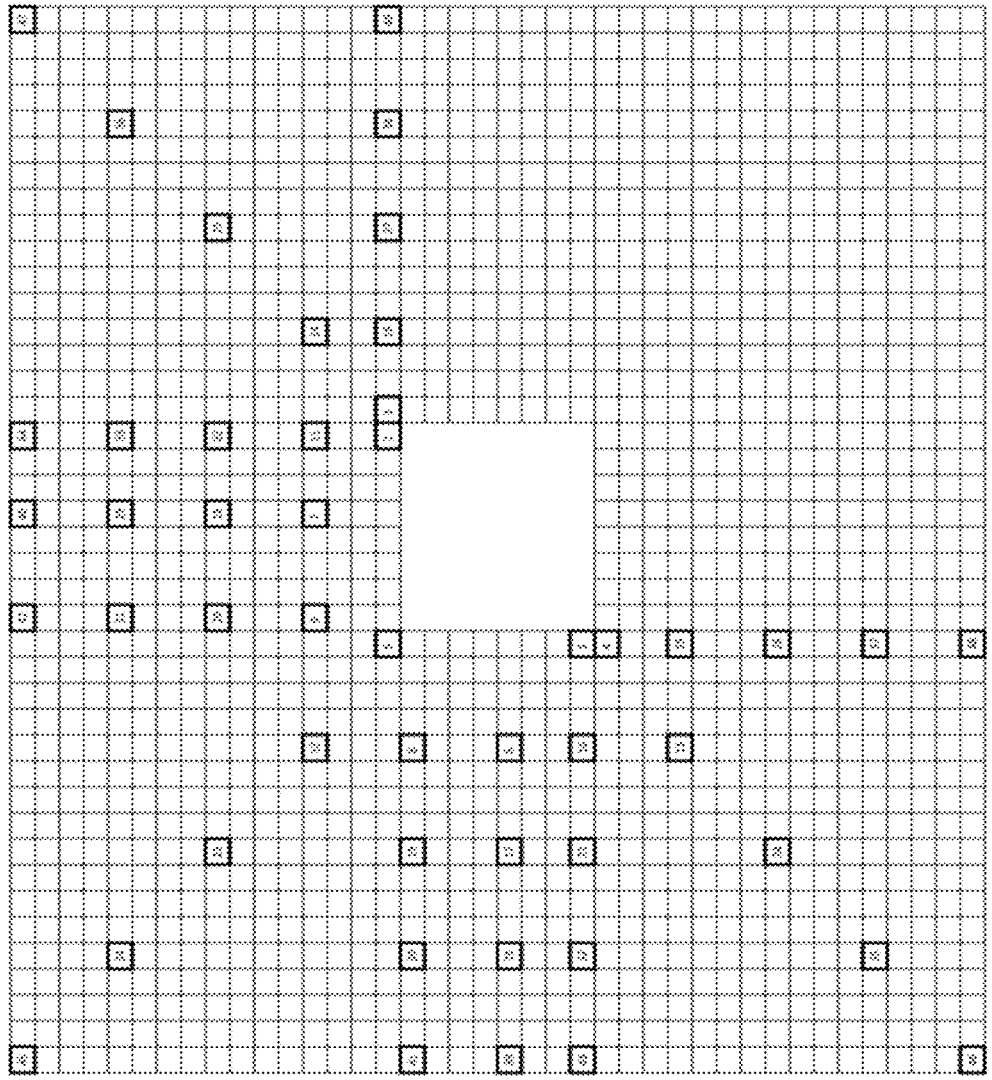
FIG. 25 shows an example of neighboring blocks used to derive the spatial merge candidates.

A merge candidate list is first constructed by inserting the motion vectors and reference indices of the spatial neighboring and temporal neighboring blocks into the candidate list with redundancy checking until the number of the available candidates reaches the maximum candidate size of 19. The merge candidate list for the merge/skip mode is constructed by inserting spatial candidates, temporal candidates, affine candidates, advanced temporal MVP (ATMVP) candidate, spatial temporal MVP (STMVP) candidate and the additional candidates as used in HEVC (Combined candidates and Zero candidates) according to a pre-defined insertion order, and in the context of the numbered blocks shown in FIG. 25:

(1) Spatial candidates for blocks 1-4
(2) Extrapolated affine candidates for blocks 1-4
(3) ATMVP
(4) STMVP
(5) Virtual affine candidate
(6) Spatial candidate (block 5) (used only when the number of the available candidates is smaller than 6)
(7) Extrapolated affine candidate (block 5)
(8) Temporal candidate (derived as in HEVC)
(9) Non-adjacent spatial candidate followed by extrapolated affine candidate (blocks 6 to 49)
(10) Combined candidates
(11) Zero candidates It may be noted that IC flags are also inherited from merge candidates except for STMVP and affine. Moreover, for the first four spatial candidates, the bi-prediction ones are inserted before the ones with uni-prediction.

3.6 Example Embodiments of a Shared Merge List

It proposes to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

For Type-2 definition, the merge sharing node will be decided for each CU inside a CTU during parsing stage of decoding; moreover, the merge sharing node is an ancestor node of leaf CU which must satisfy the following 2 criteria:

The merge sharing node size is equal to or larger than the size threshold

In the merge sharing node, one of the child CU size is smaller than the size threshold Moreover, no samples of the merge sharing node are outside the picture boundary has to be guaranteed. During parsing stage, if an ancestor node satisfies the criteria (1) and (2) but has some samples outside the picture boundary, this ancestor node will not be the merge sharing node and it proceeds to find the merge sharing node for its child CUs.

Figure 26:
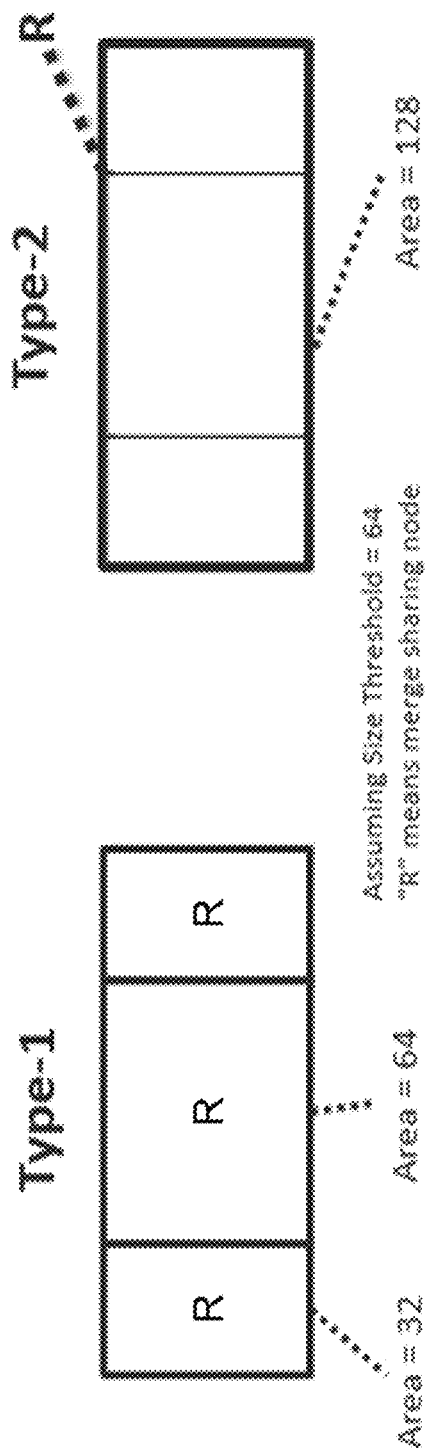
FIG. 26 shows an example of a difference between Type-1 and Type-2 definitions.

FIG. 26 shows an example for the difference of Type-1 and Type-2 definition. In this example, the parent node is ternary-split into 3 child CUs. The size of parent node is 128. For Type-1 definition, the 3 child-CUs will be merge sharing nodes separately. But for Type-2 definition, the parent node is the merge sharing node.

The proposed shared merging candidate list algorithm supports translational merge (including merge mode and triangle merge mode, history-based candidate is also supported) and subblock-based merge mode. For all kinds of merge mode, the behavior of shared merging candidate list algorithm looks basically the same, and it just generates candidates at the merge sharing node pretending the merge sharing node is a leaf CU. It has 2 major benefits. The first benefit is to enable parallel processing for merge mode, and the second benefit is to share all computations of all leaf CUs into the merge sharing node. Therefore, it significantly reduces the hardware cost of all merge modes for hardware codec. By the proposed shared merging candidate list algorithm, the encoder and decoder can easily support parallel encoding for merge mode and it relieves the cycle budget problem of merge mode.

3.7 Example of Tile Groups

Existing implementations have been adopted in which slices are removed in favor of tile groups and the HEVC syntax element slice_address is substituted with tile_group_address in the tile_group_header (if there is more than one tile in the picture) as address of the first tile in the tile group.

4. Drawbacks of Existing Implementations

The current HEVC design could take the correlation of current block its neighbouring blocks (next to the current block) to better code the motion information. However, it is possible that that the neighbouring blocks correspond to different objects with different motion trajectories. In this case, prediction from its neighbouring blocks is not efficient.

Prediction from motion information of non-adjacent blocks could bring additional coding gain with the cost of storing all the motion information (typically on 4×4 level) into cache which significantly increase the complexity for hardware implementation.

5. Example Embodiments of the Disclosed Technology

Embodiments of the presently disclosed technology overcome the drawbacks of existing implementations, thereby providing video coding with higher coding efficiencies. The LUT-based motion vector prediction based on the disclosed technology, which may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

Definition of Look Up Tables

1. One look up table may contain one or more motion candidates wherein each candidate is associated with its motion information.
   a. Motion information of a motion candidate here may include partial or all of the prediction direction, reference indices/pictures, motion vectors, LIC flag, affine flag, MVD precision, MVD values.
   b. Motion information may further include the block position information or/and block shape to indicate wherein the motion information is coming from.
   c. A counter may be further assigned for each look up table.
      i. The counter is initialized to be zero at the beginning of encoding/decoding a picture/slice/LCU(CTU) row/tile.
      ii. In one example, the counter is updated after encoding/decoding a CTU/CTB/CU/CB/PU/a certain region size (e.g., 8×8 or 16×16).
      iii. In one example, the counter is increased by one each time one candidate is added into the lookup table.
      iv. In one example, the counter should be no larger than the table size (number of allowed motion candidates).
      v. Alternatively, the counter may be used to indicate how many motion candidates have been tried to be added to the look up tables (some of them was in the look up table but later may be removed from the table). In this case, the counter could be larger than the table size.
   d. The table size (number of allowed motion candidates) and/or number of tables may be the fixed or adaptive. The table size may be same for all tables, or different for different tables.
      i. Alternatively, different sizes may be used for different look-up tables (e.g., 1 or 2).
      ii. In one example, the table sizes and/or number of tables may be pre-defined.
      iii. In one example, the table sizes and/or number of tables may be signalled in Video Parameter Set (VPS), Sequence Parameter Set (SPS), Picture Parameter Set (PPS), Slice header, tile header, Coding Tree Unit (CTU), Coding Tree Block (CTB), Coding Unit (CU) or Prediction Unit (PU), region covering multiple CTU/CTB/CU/PUs.
      iv. The table size and/or number of tables may further depend on the slice type, temporal layer index of a picture, picture order count (POC) distance between one slice and the closest intra slice.
   e. Suppose there are N tables used for a coding thread, N*P tables may be required for coding a slice, wherein P indicates the number of LCU rows or the number of tiles.
      i. Alternatively, only P tables may be required for coding a slice, wherein P indicates the number of LCU rows wherein each LCU row only use one look up table even N could be larger than 1 when tile is disabled.

Selection of Look Up Tables

2. For coding a block, partial or all of motion candidates from one look up table may be checked in order.
   a. Alternatively, motion candidates from multiple look up tables may be checked in order.
   b. The look up table indices may be signaled in CTU, CTB, CU or PU, or a region covering multiple CTU/CTB/CU/PUs.

3. The selection of look up tables may depend on the position of a block.
   a. It may depend on the CTU address covering the block. Here, we take two look up tables (Dual Look Up Tables, DLUT) for an example to illustrate the idea:
      i. If the block is located at one of the first M CTUs in a CTU row, the first look up table may be utilized for coding the block, while for blocks located in the remaining CTUs in the CTU row, the second look up table may be utilized.
      ii. If the block is located at one of the first M CTUs in a CTU row, motion candidates of the first look up table may firstly checked for coding the block, if there are not enough candidates in the first table, the second look up table may be further utilized, while for blocks located in the remaining CTUs in the CTU row, the second look up table may be utilized.
      iii. Alternatively, for blocks located in the remaining CTUs in the CTU row, motion candidates of the second look up table may firstly checked for coding the block, if there are not enough candidates in the second table, the first look up table may be further utilized.
   b. It may depend on the distance between the position of the block and the position associated with one motion candidate in one or multiple look up tables.
      i. In one example, if one motion candidate is associated with a smaller distance to the block to be coded, it may be checked earlier compared to another motion candidate.

Usage of Look Up Tables
4. The total number of motion candidates in a look up table to be checked may be pre-defined.
   a. It may further depend on the coded information, block size, block shape and etc. a1. For example, for the AMVP mode, only m motion candidates may be checked while for the merge mode, n motion candidates may be checked (e.g., m=2, n =44).
   b. In one example, the total number of motion candidates to be checked may be signalled in Video Parameter Set (VPS), Sequence Parameter Set (SPS), Picture Parameter Set (PPS), Slice header, tile header, Coding Tree Unit (CTU), Coding Tree Block (CTB), Coding Unit (CU) or Prediction Unit (PU), region covering multiple CTU/CTB/CU/PUs.
5. The motion candidate(s) included in a look up table may be directly inherited by a block.
   a. They may be used for the merge mode coding, i.e., motion candidates may be checked in the merge candidate list derivation process.
   b. They may be used for the affine merge mode coding.
      i. A motion candidate in a look up table can be added as an affine merge candidate if its affine flag is one.
   c. They may be used for other kinds of merge modes, such as sub-block merge mode, affine merge mode, triangular merge mode, inter-intra merge mode, merge with MVD (MMVD) mode.
   d. Checking of motion candidates in look up tables may be enabled when:
      i. the merge candidate list is not full after inserting the TMVP candidate;
      ii. the merge candidate list is not full after checking a certain spatial neighboring block for spatial merge candidate derivation;
      iii. the merge candidate list is not full after all spatial merge candidates;
      iv. the merge candidate list is not full after combined bi-predictive merge candidates;
      v. when the number of spatial or temporal (e.g., including adjacent spatial and non-adjacent spatial, TMVP, STMVP, ATMVP, etc. al) merge candidates that have been put into the merge candidate list from other coding methods (e.g., the merge derivation process of HEVC design, or JEM design) is less than the maximumly allowed merge candidates minus a given threshold.
         (a) in one example, the threshold is set to 1 or 0.
         (b) Alternatively, the threshold may be signaled or pre-defined in SPS/PPS/sequence, picture, slice header/tile.
         (c) Alternatively, the threshold may be adaptively changed from block to block. For example, it may be dependent on coded block information, like block size/block shape/slice type, and/or dependent on the number of available spatial or temporal merge candidates.
         (d) In another example, when the number of a certain kind of merge candidates than have been put into the merge candidate list is less than the maximumly allowed merge candidates minus a given threshold. The "certain kind of merge candidates" may be spatial candidates as in HEVC or non-adjacent merge candidates.
      vi. Pruning may be applied before adding a motion candidate to the merge candidate list.
         (a) In one example, a motion candidate may be pruned to all or partial of the available spatial or temporal (e.g., including adjacent spatial and non-adjacent spatial, TMVP, STMVP, ATMVP, etc. al) merge candidates from other coding methods in the merge candidate list.
         (b) a motion candidate may be NOT pruned to sub-block based motion candidates, e.g., ATMVP, STMVP.
         (c) In one example, a current motion candidate may be pruned to all or partial of the available motion candidates (inserted before the current motion candidate) in the merge candidate list.
         (d) Number of pruning operations related to motion candidates (that is, how many times that motion candidates need to be compared to other candidates in the merge list) may depend on the number of available spatial or temporal merge candidates. For example, when checking a new motion candidate, if there are M candidates available in the merge list, the new motion candidate may be only compared to the first K (K<=M) candidates. If the pruning function returns false (e.g., not identical to any of the first K candidates), the new motion candidate is considered to be different from all of the M candidates and it could be added to the merge candidate list. In one example, K is set to min (K, 2).
         (e) In one example, a newly appended motion candidate is only compared with the first N candidate in the merge candidate list. For example, N=3, 4 or 5. N may be signaled from the encoder to the decoder.
         (f) one example, a new motion candidate to be checked is only compared with the last N candidate in the merge candidate list. For example, N=3, 4 or 5. N may be signaled from the encoder to the decoder.

(g) In one example, how to select candidates previously added in the list to be compared with a new motion candidate from a table may depend on where the previously added candidates derived from.
  a. In one example, a motion candidate in a look-up table may be compared to candidates derived from a given temporal and/or spatial neighboring block.
  b. In one example, different entries of motion candidates in a look-up table may be compared to different previously added candidates (i.e., derived from different locations).
e. Checking of motion candidates in the lookup table may be enabled before checking other merge (or affine merge or other inter coding methods) candidates, such as derived from adjacent/non-adjacent spatial or temporal blocks.
f. Checking of motion candidates in the lookup table may be enabled when there is at least one motion candidate in a look up table.

6. The motion candidate(s) included in a look up table may be used as a predictor for coding motion information of a block.
  a. They may be used for the AMVP mode coding, i.e., motion candidates may be checked in the AMVP candidate list derivation process.
  b. They may be used for the symmetric motion vector difference (SMVD) coding wherein only partial of MVDs (such as only signaled MVD for one reference picture list and derived from another reference picture list).
  c. They may be used for the symmetric motion vector (SMV) coding wherein only partial of MVs (such as only signaled for one reference picture list and derived from another reference picture list).
  d. Checking of motion candidates in look up tables may be enabled when:
    i. the AMVP candidate list is not full after inserting the TMVP candidate;
    ii. the AMVP candidate list is not full after selecting from spatial neighbors and pruning, right before inserting the TMVP candidate;
    iii. when there is no AMVP candidate from above neighboring blocks without scaling and/or when there is no AMVP candidate from left neighboring blocks without scaling
    iv. the AMVP candidate list is not full after inserting a certain AMVP candidate;
    v. Pruning may be applied before adding a motion candidate to the AMVP candidate list.
    vi. Similar rules as mentioned in bullet 5.(c) (d) may be applied to AMVP mode.
  e. Checking of motion candidates may be enabled before checking other AMVP (or SMVD/SMV/affine inter or other inter coding methods) candidates, such as derived from adjacent/non-adjacent spatial or temporal blocks.
  f. Checking of motion candidates may be enabled when there is at least one motion candidate in a look up table.
  g. Motion candidates with identical reference picture to the current reference picture is checked.
    i. Alternatively, in addition, motion candidates with different reference pictures from the current reference picture are also checked (with MV scaled).
    ii. Alternatively, all motion candidates with identical reference picture to the current reference picture are first checked, then, motion candidates with different reference pictures from the current reference picture are checked.
    iii. Alternatively, motion candidates are checked following the same in merge.
    iv. When one motion candidate is a bi-prediction candidate, reference picture (such as, reference picture index or picture order counter of the reference picture) of the reference picture list X may be firstly checked, followed by the reference picture of the reference picture list Y (Y!=X, e.g., Y=1−X), if the current target reference picture list is X.
    v. Alternatively, when one motion candidate is a bi-prediction candidate, reference picture (such as, reference picture index or picture order counter of the reference picture) of the reference picture list Y (Y!=X, e.g., Y=1−X) may be firstly checked, followed by the reference picture of the reference picture list X, if the current target reference picture list is X.
    vi. Alternatively, reference pictures of reference picture list is X associated with all motion candidates to be checked may be checked before reference pictures of reference picture list is Y (Y!=X, e.g., Y=1−X) associated with all motion candidates to be checked.

7. Motion candidates in a look up table may be utilized to derive other candidates and the derived candidates may be utilized for coding a block.
  a. In one example, offsets are added to motion vectors for a motion candidate in a look up table to derive a new candidate.
  b. In one example, uni-prediction motion candidate in a look up table may be used to derive another uni-prediction motion candidate with same reference picture list index, such as via scaling the motion vector to another reference picture in the same reference picture list.
  c. In one example, uni-prediction motion candidate in a look up table may be used to derive another uni-prediction motion candidate with a different reference picture list index, such as via scaling the motion vector to one reference picture to the other reference picture list.
  d. In one example, uni-prediction motion candidate in a look up table may be used to derive one bi-prediction motion candidate via scaling the motion vector to one reference picture to the other reference picture list.
  e. In one example, different motion candidates from the lookup table may be used to calculate a new motion candidate. For example, the average of two or more motion candidates may be derived as a new motion candidate.

8. The checking order of motion candidates in a look up table is defined as follows (suppose K (K>=1) motion candidates are allowed to be checked):
  a. The last K motion candidates in the look up table.
  b. The first K%L candidates wherein L is the look up table size when K>=L
  c. All the candidates (L candidates) in the look up table when K >=L.
  d. Alternatively, furthermore, based on the descending order of motion candidate indices.
  e. Alternatively, furthermore, based on the ascending order of motion candidate indices.

f. Alternatively, selecting K motion candidates based on the candidate information, such as the distance of positions associated with the motion candidates and current block.
  i. In one example, K nearest motion candidates are selected.
  ii. in one example, the candidate information may further consider block shape when calculating the distance.
g. In one example, the checking order of K of motion candidates from the table which includes L candidates may be defined as: selecting those candidates with index equal to $a_0, a_0+T_0, a_0+T_0+T_1, a_0+T_0+T_1+T_2, \ldots a_0+T_0+T_1+T_2+\ldots+T_{K-1}$ in order wherein $a_0$ and $T_i$ (i being $0 \ldots K-1$) are integer values.
  i. In one example, $a_0$ is set to 0 (i.e., the first entry of motion candidate in the table). Alternatively, $a_0$ is set to (K−L/K). The arithmetic operation '/' is defined as integer division with truncation of the result toward zero. Alternatively, ao is set to any integer between 0 and L/K.
    1. Alternatively, the value of ao may depend on coding information of the current block and neighbouring blocks.
  ii. In one example, all the intervals $T_i$ (i being $0 \ldots K-1$) are the same, such as L/K. The arithmetic operation '/' is defined as integer division with truncation of the result toward zero.
  iii. In one example, (K, L, $a_0$, $T_i$) is set to (4, 16, 0, 4), or (4, 12, 0, 3) or (4, 8, 0, 1) or (4, 16, 3, 4) or (4, 12, 2, 3), or (4, 8, 1, 2). $T_i$ are the same for all i.
  iv. Such method may be only applied when K is smaller than L.
  v. Alternatively, furthermore, when K is larger than or equal to a threshold, bullet 7.c. may be applied. The threshold may be defined as L, or it may depend on K or adaptively changed from block to block. In one example, the threshold may depend on the number of available motion candidate in the list before adding a new one from the look-up table.
h. In one example, the checking order of K of motion candidates from the table which includes L candidates may be defined as: selecting those candidates with index equal to $a_0, a_0-T_0, a_0-T_0-T_1, a_0-T_0-T_1-T_2, \ldots a_0-T_0-T_1-T_2-\ldots-T_{K-1}$ in order wherein $a_0$ and $T_i$ (i being $0 \ldots K-1$) are integer values.
  i. In one example, $a_0$ is set to L−1 (i.e., the last entry of motion candidate in the table). Alternatively, $a_0$ is set to any integer between L−1−L/K and L−1.
  ii. In one example, all the intervals $T_i$ (i being $0 \ldots K-1$) are the same, such as L/K.
  iii. In one example, (K, L, $a_0$, $T_i$) is set to (4, 16, L−1, 4), or (4, 12, L−1, 3) or (4, 8, L−1, 1) or (4, 16, L−4, 4) or (4, 12, L−3, 3), or (4, 8, L−2, 2). $T_i$ are the same for all i.
  iv. Such method may be only applied when K is smaller than L.
  v. Alternatively, furthermore, when K is larger than or equal to a threshold, bullet 7.c. may be applied. The threshold may be defined as L, or it may depend on K or adaptively changed from block to block. In one example, the threshold may depend on the number of available motion candidate in the list before adding a new one from the look-up table.
i. How many and/or how to select motion candidates from a look table may depend on the coded information, such as block size/block shape.
  i. In one example, for a smaller block size, instead of choosing the last K motion candidates, the other K motion candidates (starting not from the last one) may be chosen.
  ii. In one example, the coded information may be the AMVP or merge mode.
  iii. In one example, the coded information may be the affine mode or non-affine AMVP mode or non-affine merge mode.
  iv. In one example, the coded information may be the affine AMVP (inter) mode affine merge mode or non-affine AMVP mode or non-affine merge mode.
  v. In one example, the coded information may be Current Picture Reference (CPR) mode or not CPR mode. In some examples, the CPR mode is also referred to as an intra block copy (IBC) mode.
  vi. Alternatively, how to select motion candidates from a look-up table may further depend on the number of motion candidates in the look-up table, and/or number of available motion candidates in the list before adding a new one from the look-up table.
j. In one example, maximum number of motion candidates in a look up table to be checked (i.e., which may be added to the merge/amvp candidate list) may depend on the number of available motion candidates (denoted by $N_{avaiMCinLUT}$) in a look up table, and/or maximally allowed motion candidates (denoted by $NUM_{maxMC}$) to be added (which may be pre-defined or signaled), and/or number of available candidates (denoted by $N_{avaiC}$) in a candidate list before checking the candidates from the look up table.
  i. In one example, maximum number of motion candidates in the look up table to be checked is set to minimum value of ($N_{avaiMCinLUT}$, $NUM_{maxMC}$, $N_{avaiC}$).
  ii. Alternatively, maximum number of motion candidates in the look up table to be checked is set to minimum value of ($N_{avaiMCinLUT}$, $NUM_{maxMC}-N_{avaiC}$).
  iii. In one example, $N_{avaiC}$ denotes the number of inserted candidates derived from spatial or temporal (adjacent and/or non-adjacent) neighboring blocks. Alternatively, furthermore, the number of sub-block candidates (like AMTVP, STMVP) is not counted in $N_{avaiC}$.
  iv. $NUM_{maxMC}$ may depend on the coded mode, e.g., for merge mode and AMVP mode, $NUM_{maxMC}$ may be set to different values. In one example, for merge mode, $NUM_{maxMC}$ may be set to 4, 6, 8, 10, etc. al. for AMVP mode, $NUM_{maxMC}$ may be set to 1, 2, 4, etc. al.
  v. Alternatively, $NUM_{maxMC}$ may depend on other coded information, like block size, block shape, slice type etc. al.
k. The checking order of different look up tables is defined in usage of look up tables in the next subsection.
l. The checking process will terminate once the merge/AMVP candidate list reaches the maximumly allowed candidate numbers.
m. The checking process will terminate once the merge/AMVP candidate list reaches the maximumly allowed candidate numbers minus a threshold (Th). In one example, Th may be pre-defined as a positive integer value, e.g., 1, or 2, or 3. Alternatively, Th may be adaptively changed from block to block. Alternatively, Th may be signaled in the SPS/PPS/slice header etc. al. Alternatively, Th may further depend on block shape/block size/coded modes etc. al. Alternatively, Th may depend on how many available candidates before adding the motion candidates from LUTs.
- n. Alternatively, it will terminate once the number of added motion candidates reaches the maximumly allowed motion candidate numbers. The maximumly allowed motion candidate numbers may be signaled or pre-defined. Alternatively, the maximumly allowed motion candidate numbers may further depend on block shape/block size/coded modes etc. al.
- o. One syntax element to indicate the table size as well as the number of motion candidates (i.e., K=L) allowed to be checked may be signaled in SPS, PPS, Slice header, tile header.

9. When motion candidates from look up tables are utilized for coding a block (e.g., merge/AMVP mode), the inserting order of motion candidates may be adaptively changed.
  - a. In one example, the inserting order of motion candidates may depend on the coded information of one block, e.g., different for different modes.
    - i. In one example, for the merge mode, they may be added after TMVP candidates.
    - ii. In one example, the inserting order of motion candidates may be added before spatial candidates.
    - iii. In one example, for the current picture referencing (CPR) mode, they may be added after spatial candidates.
  - b. In one example, the inserting order of motion candidates may be adaptively changed from block to block or from tile to tile, or from tile group to tile group, or one video data processing unit to another video data processing unit.
  - c. In one example, the inserting order of motion candidates may be different for different block dimensions.
  - d. In one example, the inserting order of motion candidates may be different for different partitioning depths.
  - e. In one example, the inserting order of motion candidates may depend on tile/tile group/slice/picture types.
  - f. In one example, the inserting order of motion candidates may depend on low delay check flag.
  - g. In one example, the inserting order of motion candidates may depend on low delay check flag.
  - h. How to apply pruning and/or how many motion candidates in a look up table to be checked in a candidate list construction process and/or how many look up tables and/or maximum number of motion candidates in a look up table may be utilized may be adaptively changed.

10. Enabling/disabling the usage look up tables for motion information coding of a block may be signalled in SPS, PPS, Slice header, tile header, CTU, CTB, CU or PU, region covering multiple CTU/CTB/CU/PUs.

11. Whether to apply prediction from look up tables may further depend on the coded information. When it is inferred not to apply for a block, additional signaling of indications of the prediction is skipped. Alternatively, when it is inferred not to apply for a block, there is no need to access motion candidates of look up tables, and the checking of related motion candidates is omitted.
  - a. Whether to apply prediction from look up tables may depend on block size/block shape. In one example, for smaller blocks, such as 4×4, 8×4 or 4×8 blocks, it is disallowed to perform prediction from look up tables.
  - b. Whether to apply prediction from look up tables may depend on whether the block is coded with AMVP or merge mode. In one example, for the AMVP mode, it is disallowed to perform prediction from look up tables.
  - c. Whether to apply prediction from look up tables may depend on the block is coded with affine motion or other kinds of motion (such as translational motion). In one example, for the affine mode, it is disallowed to perform prediction from look up tables.

12. Motion candidates of a look up table in previously coded frames/slices/tiles may be used to predict motion information of a block in a different frame/slice/tile.
  - a. In one example, only look up tables associated with reference pictures of current block may be utilized for coding current block.
  - b. In one example, only look up tables associated with pictures with the same slice type and/or same quantization parameters of current block may be utilized for coding current block.

Update of Look Up Tables

Figure 27:
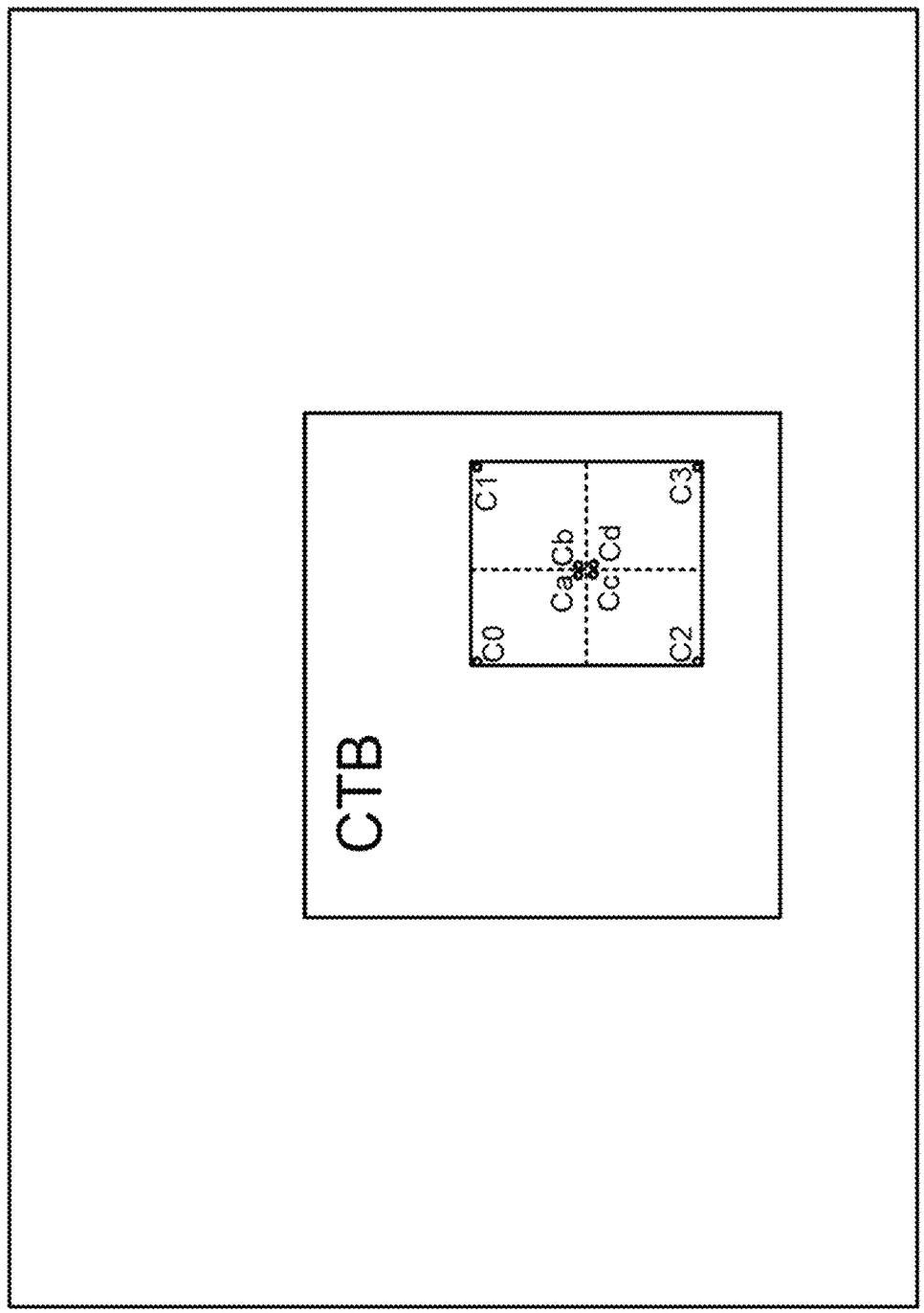
FIG. 27 shows an example of selection of a representative position for LUT updates.
Figure 28A:
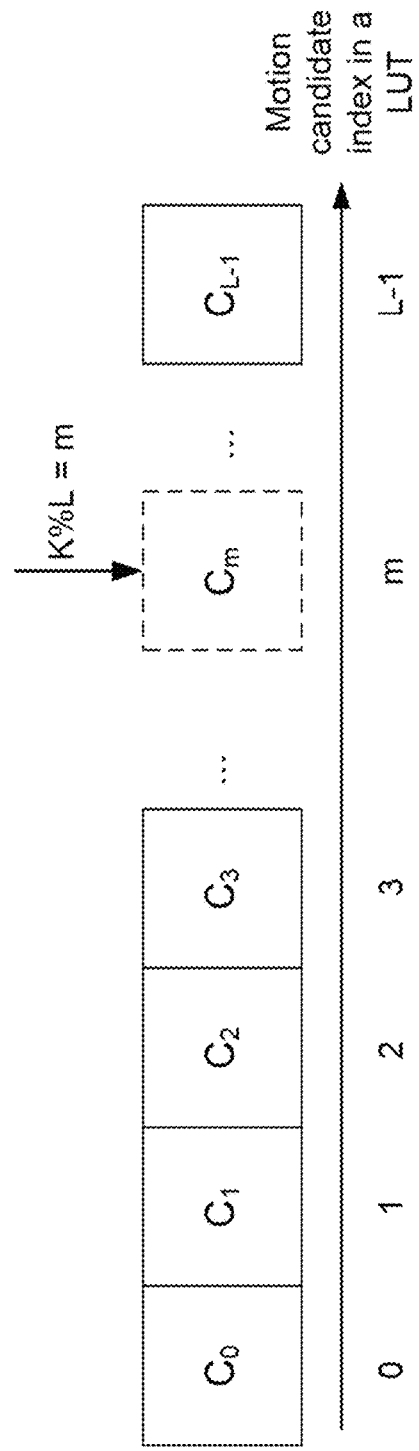
FIGS. 28A and 28B show examples of updating a LUT with a new set of motion information.
Figure 28B:
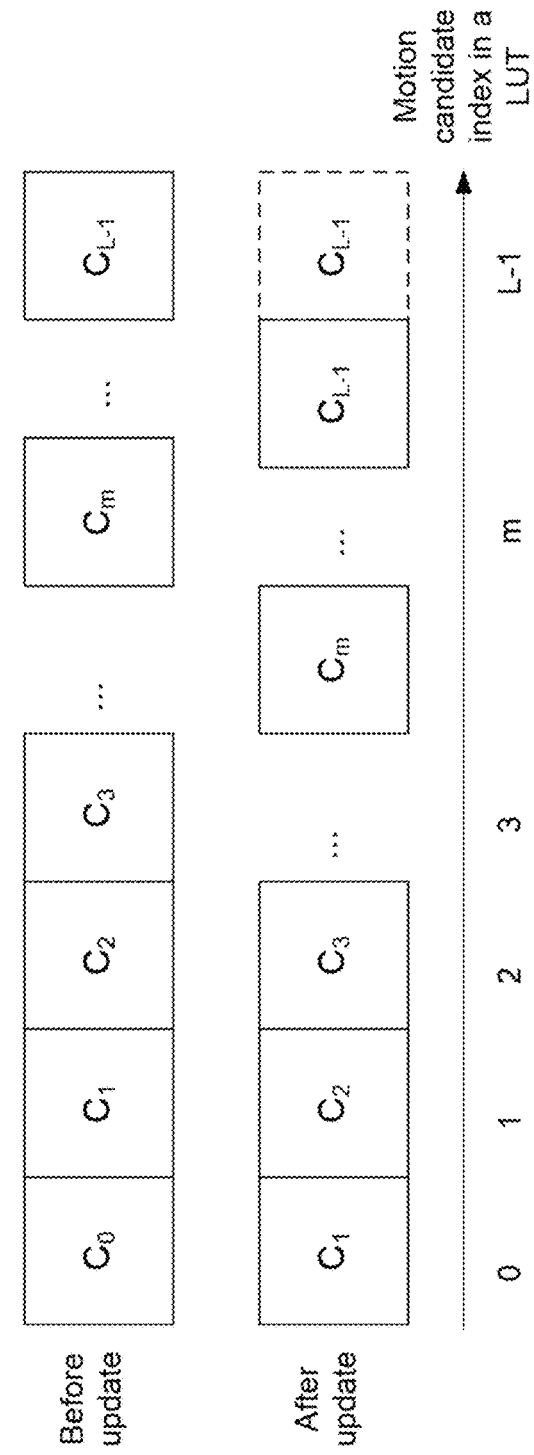

13. After coding a block with motion information (i.e., IntraBC mode, inter coded mode), one or multiple look up tables may be updated.
  - a. In one example, whether to update a look up table may reuse the rules for selecting look up tables, e.g., when a look up table could be selected for coding the current block, after coding/decoding the block, the selected look up table may further be updated.
  - b. Look up tables to be updated may be selected based on coded information, and/or positions of the block/LCU.
  - c. If the block is coded with motion information directly signaled (such as AMVP mode, MMVD mode for normal/affine inter mode, AMVR mode for normal/affine inter mode), the motion information for the block may be added to a look up table.
    - i. Alternatively, if the block is coded with motion information directly inherited from a spatial neighboring block without any refinement (e.g., spatial merge candidate without refinement), the motion information for the block shouldn't be added to a look up table.
    - ii. Alternatively, if the block is coded with motion information directly inherited from a spatial neighboring block with refinement (such as DMVR, FRUC), the motion information for the block shouldn't be added to any look up table.
    - iii. Alternatively, if the block is coded with motion information directly inherited from a motion candidate stored in a look up table, the motion information for the block shouldn't be added to any look up table.
    - iv. In one example, such motion information may be directly added to the look up table, such as to the last entry of the table or to the entry which is used for storing the next available motion candidate.
    - v. Alternatively, such motion information may be directly added to the look up table without pruning, e.g., without any pruning.
    - vi. Alternatively, such motion information may be used to reorder the look up table.
    - vii. Alternatively, such motion information may be used to update the look up table with limited pruning (e.g., compared to the latest one in the look up table).
  - d. M (M>=1) representative position within the block is chosen and the motion information associated with the representative is used to update look up tables.

i. In one example, the representative position is defined as one of the four corner positions (e.g., C0-C3 in FIG. 27) within the block.
ii. In one example, the representative position is defined as the center position (e.g., Ca-Cd in FIG. 27) within the block.
iii. When sub-block prediction is disallowed for block, M is set to 1.
iv. When sub-block prediction is allowed for block, M could be set to 1 or total number of sub-blocks or any other value between [1, number of sub-blocks] exclusively.
v. Alternatively, when sub-block prediction is allowed for block, M could be set to 1 and the selection of a representative sub-block is based on
   1. the frequency of utilized motion information,
   2. whether it is a bi-prediction block
   3. based on the reference picture index/reference picture
   4. motion vector differences compared to other motion vectors (e.g., selecting the maximum MV differences)
   5. other coded information.
e. When M (M>=1) sets of representative positions are selected to update look up tables, further conditions may be checked before adding them as additional motion candidates to look up tables.
   i. Pruning may be applied to the new sets of motion information to the existing motion candidates in the look up table.
   ii. In one example, a new set of motion information shouldn't be identical to any or partial of existing motion candidates in the look up table.
   iii. Alternatively, for same reference pictures from a new set of motion information and one existing motion candidate, the MV difference should be no smaller than one/multiple thresholds. For example, horizontal and/or vertical component of the MV difference should be larger than 1-pixel distance.
   iv. Alternatively, the new sets of motion information are only pruned with the last K candidates or the first K% L existing motion candidates when K>L to allow reactivating the old motion candidates.
   v. Alternatively, no pruning is applied.
f. If M sets of motion information are used to update a look up table, the corresponding counter should be increased by M.
g. Suppose a counter of a look up table to be updated is denoted by K before coding the current block, after coding the block, for one selected set of motion information (with methods mentioned above0, it is added as an additional motion candidate with index equal to K% L (wherein L is the look up table size). Examples are shown in FIGS. 28A and 28B.
   i. Alternatively, it is added as an additional motion candidate with index equal to min(K+1, L−1). Alternatively, furthermore, if K>=L, the first motion candidate (index equal to 0) is removed from the look-up table, and the following K candidates indices are reduced by 1.
   ii. For above both methods (either adding the new motion candidate to entry index equal to K%L or adding it with index equal to min(K+1, L−1)), they are trying to keep the latest few sets of motion information from previously coded blocks regardless whether there are identical/similar motion candidates.
   iii. Alternatively, when adding a new set of motion information as a motion candidate to a LUT, redundancy checking is firstly applied. In this case, the LUT will keep the latest several sets of motion information from previously coded blocks, however, redundant ones may be removed from LUTs. Such a method is called redundancy-removal based LUT updating method.
      1. If there are redundant motion candidates in the LUT, the counter associated with the LUT may be not increased or decreased.
      2. The redundant checking may be defined as the pruning process in merge candidate list construction process, e.g., checking whether the reference pictures/reference picture indices are the same, and motion vector differences are within a range or identical.
      3. If there is a redundant motion candidate found in a LUT, the redundant motion candidate is moved from its current position to the last one of the LUT.
         a. Similarly, if there is a redundant motion candidate found in a LUT, this redundant motion candidate is removed from the LUT. In addition, all the motion candidates inserted to LUT after the redundant motion candidate move forward to refill the removed entry of the redundant motion candidate. After the shifting, the new motion candidate is added to the LUT.
         b. In this case, the counter is kept unchanged.
         c. Once a redundant motion candidate is identified in a LUT, the redundant checking process is terminated.
      4. Multiple redundant motion candidates may be identified. In this case, all of them are removed from the LUT. In addition, all of the remaining motion candidates may move forward in order.
         a. In this case, the counter is decreased by (number of redundant motion candidates minus 1).
         b. The redundant checking process is terminated after identifying maxR redundant motion candidates (maxR is a positive integer variable).
      5. The redundancy checking process may start from the first to the last motion candidate (i.e., in the order of added to LUTs, in the order of decoding process of blocks where motion information is from).
      6. Alternatively, when there are redundant motion candidates in LUT, instead of removing one or multiple of redundant ones form LUTs, virtual motion candidates may be derived from redundant ones and the virtual motion candidates may be used to replace the redundant ones.
         a. Virtual motion candidates may be derived from a redundant motion candidate by adding offset(s) to horizontal and/or vertical component of one or multiple motion vectors; or average of two motion vectors if pointing to the same reference pictures. Alternatively, the virtual motion candidate may be derived from any function with motion vectors in the look up table as the input. Exemplary functions are: Adding two or motion vectors together; Averaging two or more motion vectors. The motion vectors may be scaled before being input into the function.

b. Virtual motion candidates may be added to the same position as the redundant motion candidates.
c. Virtual motion candidates may be added before all the other motion candidates (e.g., starting from smallest entry indices, like zero).
d. In one example, it is applied only under certain conditions, such as when the current LUT is not full.
7. The redundancy-removal based LUT updating method may be invoked under certain conditions, such as
a. the current block is coded with merge mode,
b. the current block is coded with AMVP mode but with at least one component of MV difference is non-zero;
c. the current block is or is not coded with sub-block based motion prediction/motion compensation methods (e.g., not coded with affine mode)
d. the current block is coded with merge mode and the motion information is associated with a certain type (e.g., from the spatial neighboring blocks, from the left neighboring block, from the temporal block).
h. After encoding/decoding one block, one or more look-up tables may be updated by just inserting the M sets of motion information to the end of the table, i.e., after all existing candidates.
i. Alternatively, furthermore, some existing motion candidates in the table may be removed.
1. In one example, if the table is full after inserting the M sets of motion information, the first several entries of motion candidates may be removed from the table.
2. In one example, if the table is full before inserting the M sets of motion information, the first several entries of motion candidates may be removed from the table.
ii. Alternatively, furthermore, if the block is coded with a motion candidate from a table, the motion candidates in the table may be reordered so that the selected motion candidate is put to the last entry of the table.
1. In one example, before encoding/decoding a block, a look-up table may include motion candidates denoted by $HMVP_0$, $HMVP_1$, $HMVP_2$, ..., $HMVPK_{K-1}$, $HMVP_K$, $HMVP_{K+1}$, ..., $HMVP_{L-1}$ wherein $HMVP_i$ denotes the i-th entry in the look-up table. If the block is predicted from $HMVP_K$ (K is within the range [0, L−1], inclusively), after encoding/decoding this block, the look-up table is re-ordered to: $HMVP_0$, $HMVP_1$, $HMVP_2$, ..., $HMVP_{K-1}$, $HMVP_{K+1}$, ..., $HMVP_{L-1}$, $HMVP_K$.
i. The look-up table may be emptied after coding one intra-constrained block.
j. If an entry of motion information is added into the lookup table, more entries of motion information may also be added into the table by derivation from the motion inforamtion. In this case, the counter associated with the look up table may be increased more than 1.
i. In one example, the MV of an entry of motion information is scaled and put into the table;
ii. In one example, the MV of an entry of motion information is added by (dx, dy) and put into the table;
iii. In one example, the average of MVs of two or more entries of motion information is calculated and put into the table.
14. If one block is located at a picture/slice/tile border, updating of look up tables may be always disallowed.
15. Motion information of above LCU rows may be disabled to code the current LCU row.
a. In this case, at the beginning of a new slice/tile/LCU row, the number of available motion candidates may be reset to 0.
16. At the beginning of coding a slice/tile with a new temporal layer index, the number of available motion candidates may be reset to 0.
17. The look up table may be continuously updated with one slice/tile/LCU row/slices with same temporal layer index.
a. Alternatively, the look up table may be updated only after coding/decoding each S (S>=1) CTUs/CTBs/CUs/CBs or after coding/decoding a certain region (e.g., size equal to 8×8 or 16×16).
b. Alternatively, the look up table may be updated only after coding/decoding each S (S>=1) blocks (e.g., CUs/CBs) with certain modes (e.g., S inter-coded blocks). Alternatively, the look up table may be updated only after coding/decoding each S (S>=1) inter-coded blocks (e.g., CUs/CBs) which are not coded with sub-block based motion prediction/motion compensation method (e.g., not coded with affine and/or ATMVP mode).
c. Alternatively, the look up table may be updated only when the left-top coordinate of the coded/decoded block satisfies some conditions. For example, the look up table is updated only when (x&M==0)&& (y&M==0), where (x, y) is left-top coordinate of the coded/decoded block. M is an integer such as 2, 4, 8, 16, 32, or 64.
d. Alternatively, one look up table may stop updating once it reaches a maximumly allowed counter.
e. In one example, the counter may be predefined. Alternatively, it be signalled in Video Parameter Set (VPS), Sequence Parameter Set (SPS), Picture Parameter Set (PPS), Slice header, tile header, Coding Tree Unit (CTU), Coding Tree Block (CTB), Coding Unit (CU) or Prediction Unit (PU), region covering multiple CTU/CTB/CU/PUs.
18. Look up table updating process may be invoked within different procedures.
a. In one example, for a block coded with merge mode, the look up table updating process may be invoked after decoding the merge candidate or after constructing the merge list or after decoding the motion information with and/or without refinement.
b. In one example, for a block coded with AMVP mode, the look up table updating process may be invoked after decoding the motion information with and/or without refinement.
c. When and/or how to update the look up table may depend on the coded mode, block dimension, video processing data unit, low delay check, etc. al.
i. In one example, when one block is coded with AMVP mode, look up table may be directly updated without pruning.
ii. Alternatively, when one block is coded with merge mode, look up table may be updated with pruning.
iii. Alternatively, when one block is coded with merge mode and its motion information is derived from spatial and/or temporal blocks, look up table may be updated with pruning.

iv. Alternatively, when one block is coded with merge mode and its motion information is derived from motion candidates in a look up table, look up table may be reordered without pruning.
v. Alternatively, when one block is coded with merge mode and its motion information is derived from virtual candidates (e.g., combined bi, pairwise, zero motion vector candidates) in a look up table, look up table may not be updated.
vi. Alternatively, when one block is coded with sub-block merge mode and/or triangular merge mode, look up table may not be updated.
vii. Alternatively, when one block is coded with the merge with motion vector differences (MMVD) mode and its motion information is derived from spatial and/or temporal blocks, look up table may be directly updated.
viii. In one example, when one block is coded with illumination compensation (IC) mode and/or Overlapped Block Motion Compensation (OBMC) mode and/or Decode-side Motion Vector Derivation (DMVD) mode, look up table may not be updated. Alternatively, when one block is coded with such a mode, look up table may be updated.
19. Whether to reset the look up tables may further depend on the indication of enabling (or disabling) prediction crossing tiles.
a. In one example, if such an indication indicates prediction crossing tiles is disallowed, look up tables have to be reset (e.g., emptied) before coding a new tile.
b. In one example, such an indication indicates prediction crossing tiles is allowed, there is no need to reset look up tables (e.g., emptied) before coding a new tile. That is, the look up tables for coding a second tile may depend on those tables used for coding a first tile.
20. Whether to enable adaptive loop filter (ALF) temporal prediction (or prediction/inheritance of ALF filters from a different tile) may further depend on the indication of enabling (or disabling) prediction crossing tiles.
a. In one example, if such an indication indicates prediction crossing tiles is disallowed, ALF temporal prediction is disallowed.
b. In one example, such an indication indicates prediction crossing tiles is allowed, ALF temporal prediction may be enabled.
21. When shared merge list (or other kinds of shared motion candidates list/or shared intra mode information or other shared information) is enabled for a merge sharing node, the updating of look up tables may be performed in the following ways:
a. One of representative coded block (e.g., leaf coding unit) may be selected to update the look up tables.
i. In one example, it is defined as the last coded block in decoding order.
ii. Alternatively, it is defined as the last coded block that satisfy the conditions for look up table updating (such as the last coded block with non-affine and non-ATMVP inter mode).
iii. In one example, it is defined as the first coded block in decoding order under the parent node.
iv. Alternatively, it is defined as the first coded block that satisfy the conditions for look up table updating (such as the last coded block with non-affine and non-ATMVP, non-triangular inter mode) under the parent node.
b. More than one representative coded blocks (e.g., leaf coding unit) may be selected to update the look up tables.
i. In one example, multiple sets of coded information associated with those representative coded blocks may be used to update the look up tables wherein multiple entries of a look up table may be updated accordingly.
ii. In one example, multiple sets of coded information associated with those representative coded blocks may be used to update the look up tables wherein multiple look up tables may be updated accordingly.
iii. In one example, those representative coded blocks may be checked in a certain order to determinate whether to be used to update one or multiple look up tables.
iv. In one example, those representative coded blocks may be defined as the first and the last coded block under the parent node.
c. Updating of look up tables may be always disabled.
22. For all above bullets, the look up tables indicate the coded information or information derived from coded information from previously coded blocks in a decoding order.
a. A look up table may include the translational motion information, or affine motion information, or affine model parameters, or intra mode information, or illumination compensation information, etc. al.
b. Alternatively, a look up table may include at least two kinds of information, such as translational motion information, or affine motion information, or affine model parameters, or intra mode information, or illumination compensation information, etc.

6. Additional Embodiments for LUT-Based Motion Vector Prediction

Figure 29:
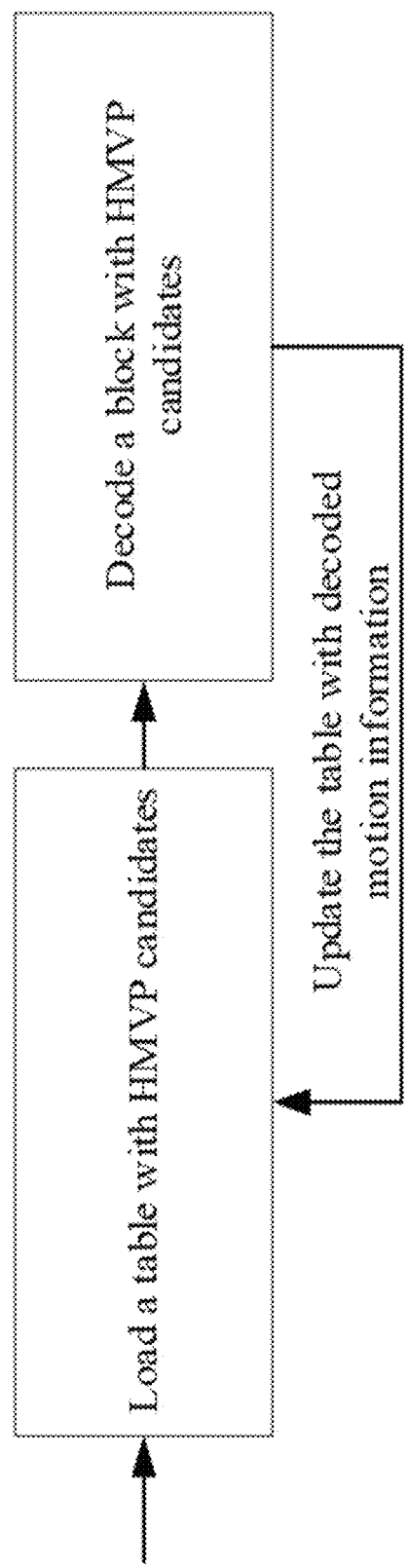
FIG. 29 shows an example of a decoding flowchart for the proposed history-based motion vector prediction (HMVP) method.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 29.

In one example, the table size is set to be L (e.g., L=16 or 6, or 44), which indicates up to L HMVP candidates may be added to the table.

Figure 30:
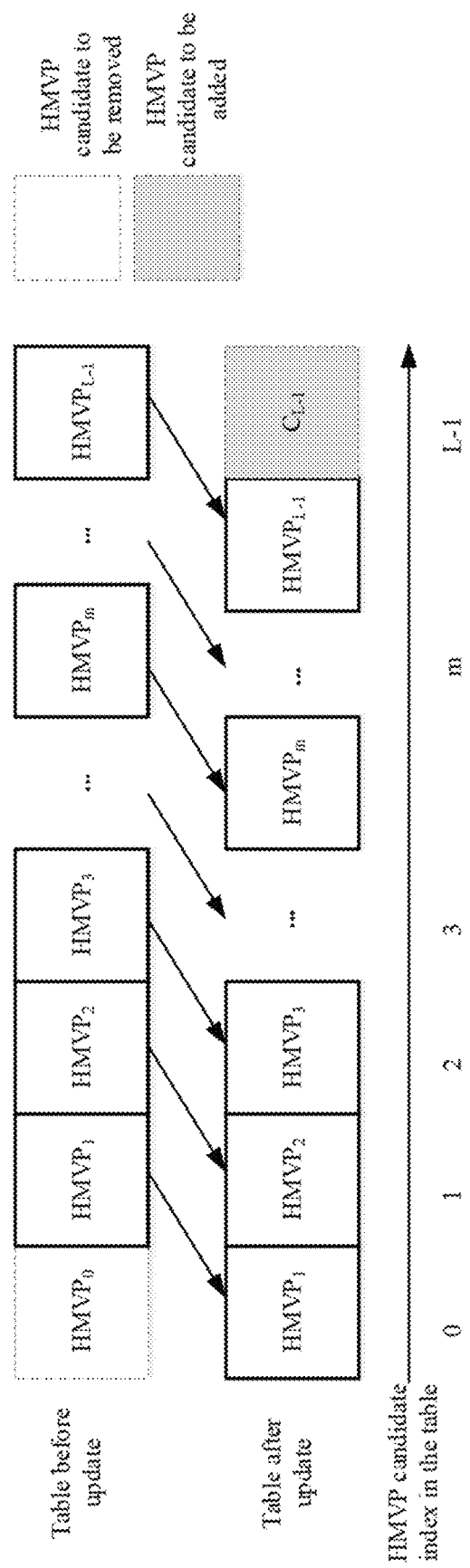
FIG. 30 shows an example of updating a table in the proposed HMVP method.

(1) In one embodiment (corresponding to invention 11.g.i), if there are more than L HMVP candidates from the previously coded blocks, a First-In-First-Out (FIFO) rule is applied so that the table always contains the latest previously coded L motion candidates. FIG. 30 depicts an example wherein the FIFO rule is applied to remove a HMVP candidate and add a new one to the table used in the proposed method.

(2) In another embodiment (corresponding to invention 11.g.iii), whenever adding a new motion candidate (such as the current block is inter-coded and non-affine mode), a redundancy checking process is applied firstly to identify whether there are identical or similar motion candidates in LUTs.

Figure 31A:
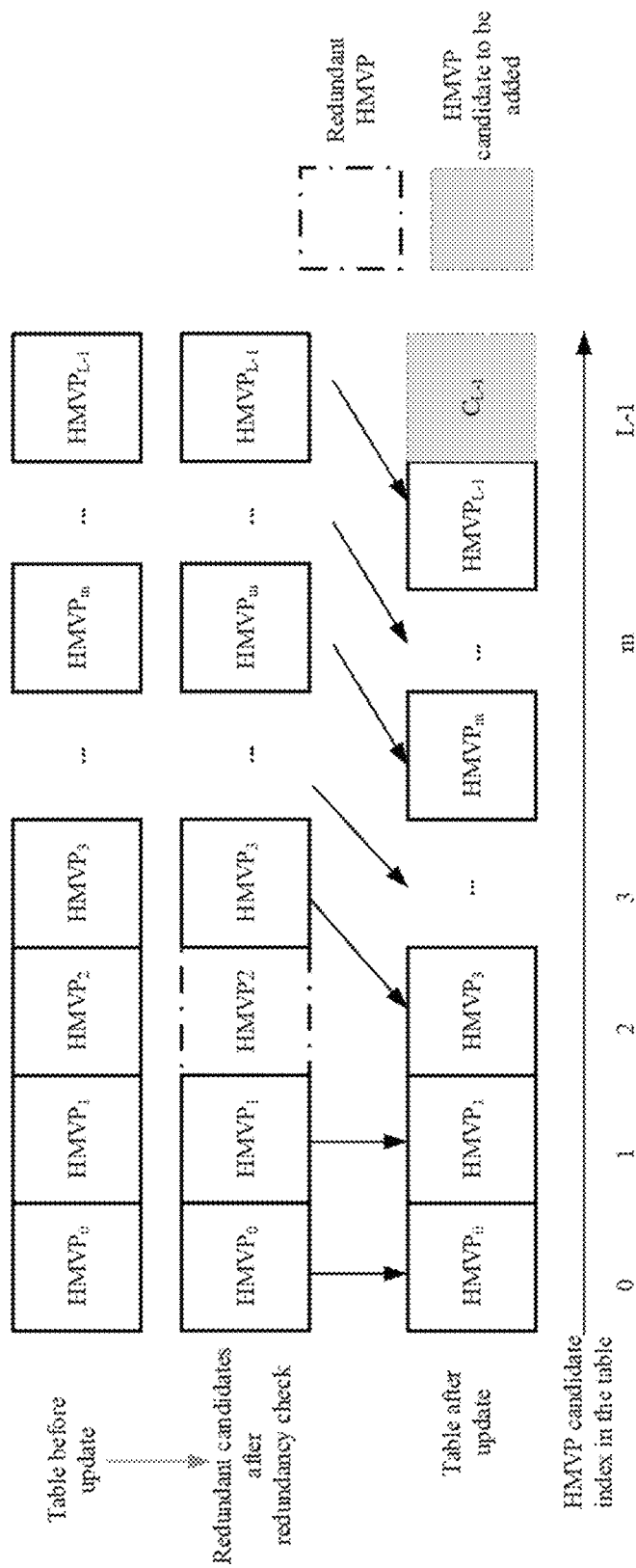
FIGS. 31A and 31B show examples of redundancy-removal based LUT updating methods.
Figure 31B:
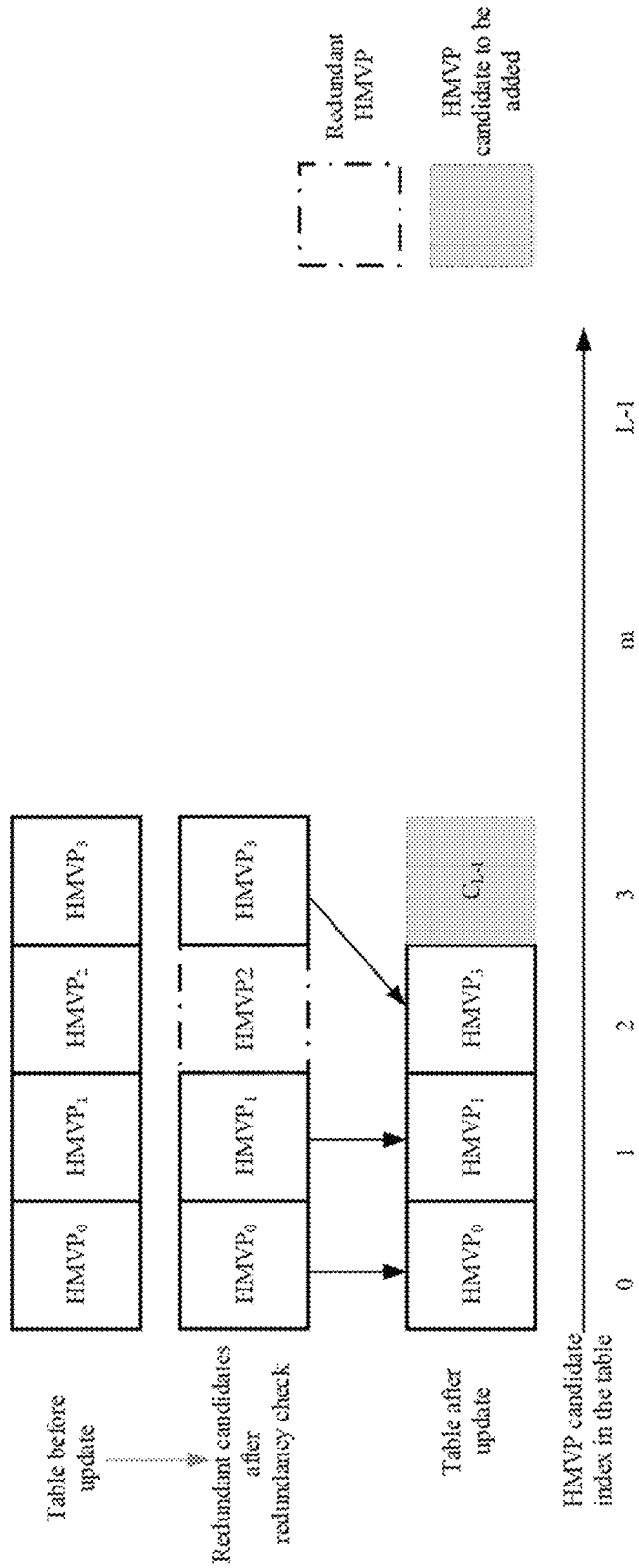

Some examples are depicted as follows:

FIGS. 31A and 31B show examples of redundancy-removal based LUT updating methods with one redundancy motion candidate removed. FIG. 31A illustrates the case when the LUT is full before adding a new motion candidate, and FIG. 31B illustrates the case when the LUT is not full before adding a new motion candidate.

Figure 32A:
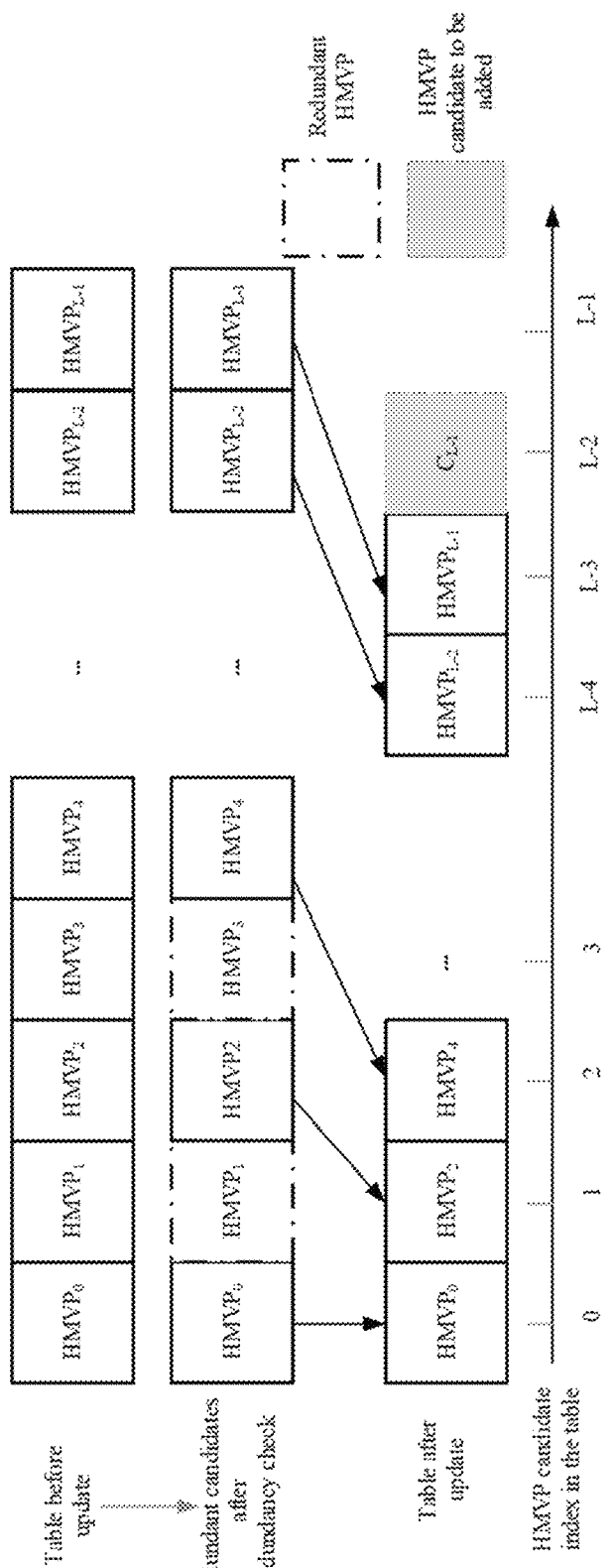
FIGS. 32A and 32B show additional examples of redundancy-removal based LUT updating methods.
Figure 32B:
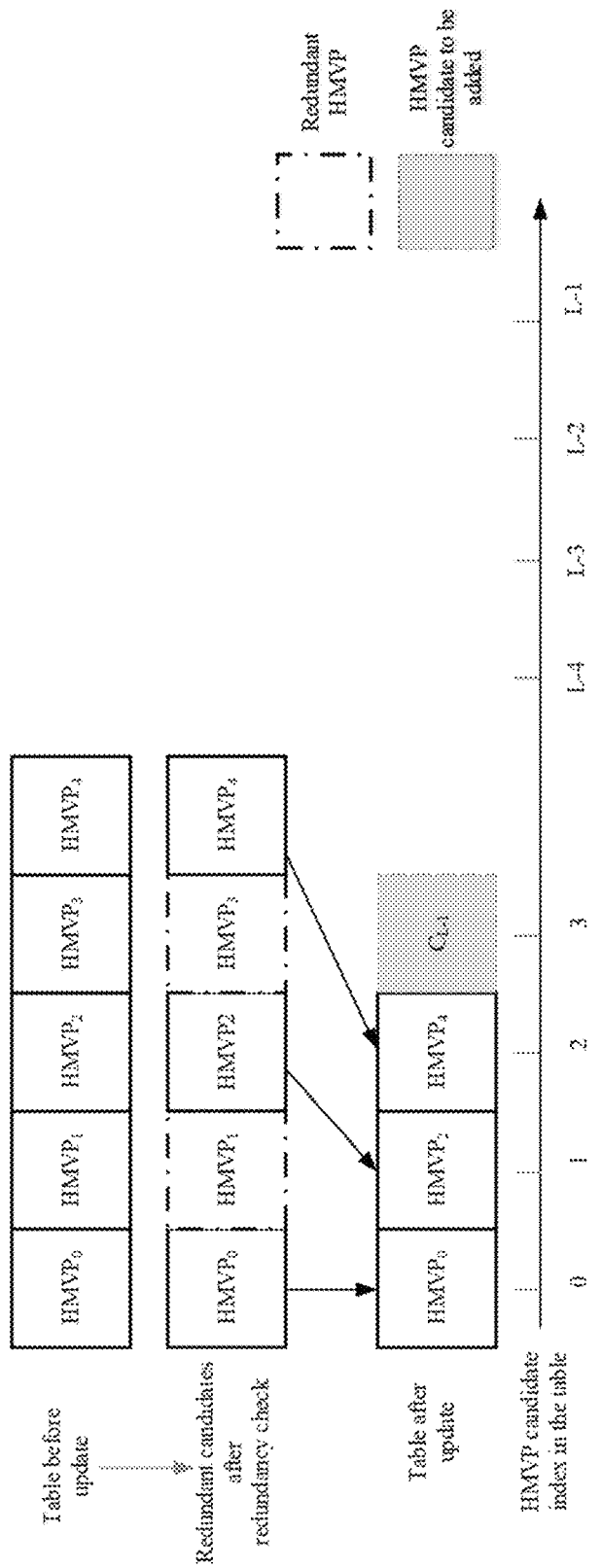

FIGS. 32A and 32B shows additional another examples of redundancy-removal based LUT updating methods with multiple redundancy motion candidates removed. FIG. 32A illustrates the case when the LUT is full before adding a new motion candidate, and FIG. 32B illustrates the case when the LUT is not full before adding a new motion candidate.

HMVP candidates could be used in the merge candidate list construction process. All HMVP candidates from the last entry to the first entry (or the last K0 HMVP, e.g., K0 equal to 16 or 6) in the table are inserted after the TMVP candidate. Pruning is applied on the HMVP candidates. Once the total number of available merge candidates reaches the signaled maximally allowed merge candidates, the merge candidate list construction process is terminated. Alternatively, once the total number of added motion candidates reaches a given value, the fetching of motion candidates from LUTs is terminated.

Similarly, HMVP candidates could also be used in the AMVP candidate list construction process. The motion vectors of the last K1 HMVP candidates in the table are inserted after the TMVP candidate. Only HMVP candidates with the same reference picture as the AMVP target reference picture are used to construct the AMVP candidate list. Pruning is applied on the HMVP candidates. In one example, K1 is set to 4.

The examples and embodiments described above may be incorporated in the context of the method described below, e.g., method 3300, which may be implemented at a video decoder or a video encoder.

Figure 33:
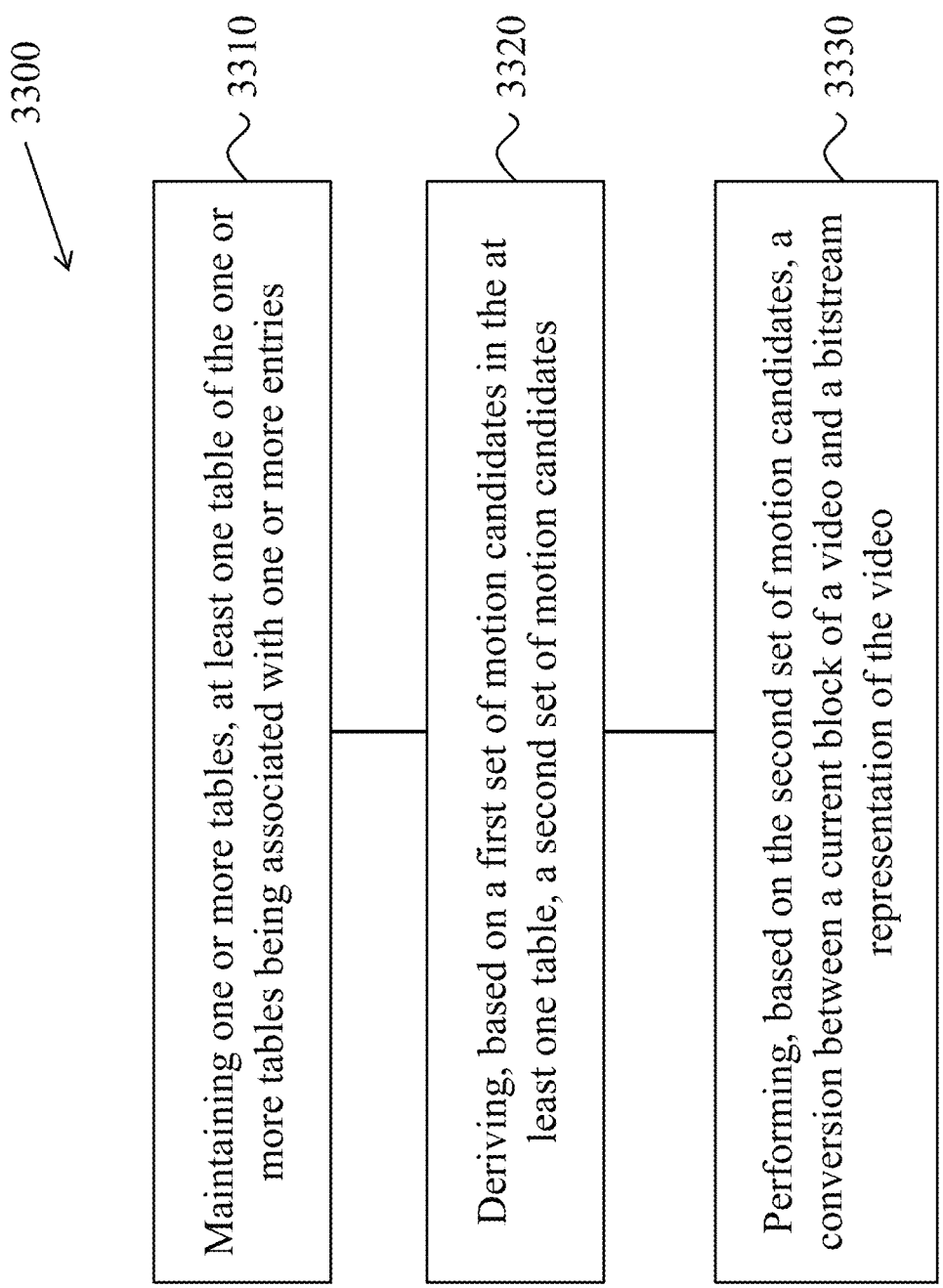
FIG. 33 shows a flowchart of an example method for video processing.

FIG. 33 is a flowchart for a method for video processing. The method 3300 includes, at operation 3310, maintaining one or more tables, at least one table of the one or more tables being associated with one or more entries.

The method 3300 includes, at operation 3320, deriving, based on a first set of motion candidates in the at least one table, a second set of motion candidates.

The method 3300 includes, at operation 3330, performing, based on the second set of motion candidates, a conversion between a current block of a video and a bitstream representation of the video.

Figure 34:
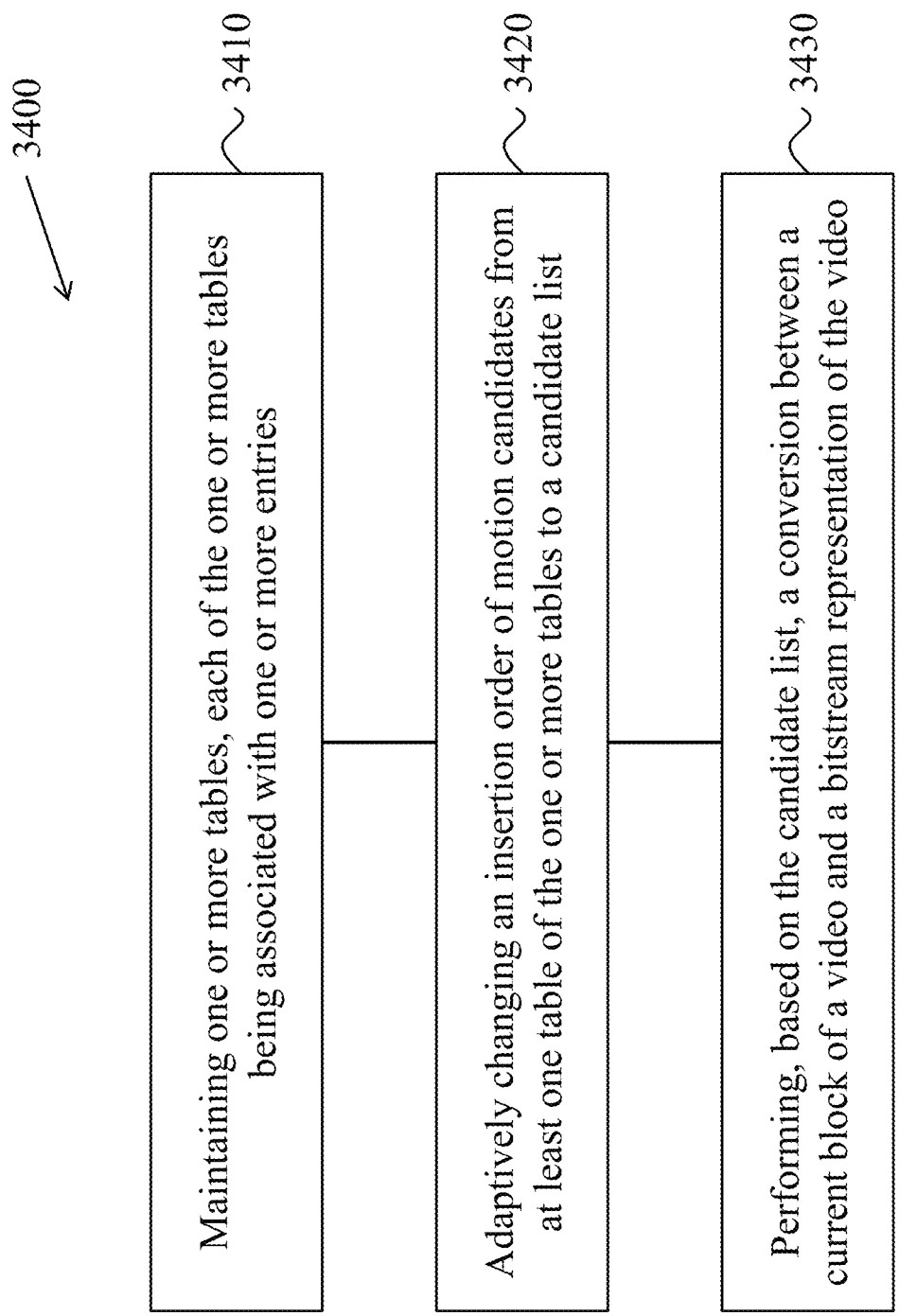
FIG. 34 shows a flowchart of another example method for video processing.

FIG. 34 is a flowchart for a method for video processing. The method 3400 includes, at operation 3410, maintaining one or more tables, wherein each of the one or more tables being associated with one or more entries.

The method 3400 includes, at operation 3420, adaptively changing an insertion order of motion candidates from at least one table of the one or more tables to a candidate list.

The method 3400 includes, at operation 3430, performing, based on the candidate list, a conversion between a current block of a video and a bitstream representation of the video.

7. Example Simulation Results for the Disclosed Technology

The efficacy of the disclosed technology is summarized in the following complexity analysis and simulation results.

7.1 Complexity Analysis

In terms of complexity analysis, two aspects are considered, including memory requirement and computational complexity increasement. For the additional memory required by HMVP, up to 6 motion candidates are required to be stored. That is, 6*(32 bits for one MV+4 bits for one reference index)*2=54 bytes per slice.

For the computational complexity, it is mainly from the additional pruning operations. Two procedures of pruning operations are required by HVMP.

One is invoked in the table updating process when inserting a new HMVP candidate, wherein up to 6 times of pruning operations are required.

The other one is invoked in the merge list construction process. Thanks to the pruning process in the table updating process, all HMVP candidates in the table are always different from each other. Therefore, in the merge list construction process, there is no need for a second HMVP candidate to compare with a spatial or temporal candidate if it has been marked as identical to a first HMVP candidate. The number of additional pruning operations could be defined as $C(N_{ST}, N_{mrgToBeAdded}, N_{HMVP})$ wherein $N_{ST}$ indicates the number of spatial or temporal merge candidates already in the merge candidate list, $N_{mrgToBeAdded}$ indicates the largest number of candidates from HMVP may be added to the merge list, and $N_{HMVP}$ indicates the number of HMVP candidates to be checked, respectively. In this contribution, $N_{mrgToBeAdded}$ is set to $N_{mrg}-1$.

When $N_{HMVP}$ is not smaller than $N_{mrgToBeAdded}$, the worst case happens when the first $N_{mrgToBeAdded}-1$, candidates are all different from the first $N_{ST}$ candidates and the remaining HMVP candidates are identical to one of the first $N_{ST}$ candidates. In total, it requires $$N_{ST} * (N_{mrgToBeAdded} - 1) + \sum_{i=1}^{N_{HMVP}-(N_{mrgToBeAdded}-1)} N_{ST} - (i-1)$$

times of pruning operations.

When $N_{HMVP}$ is smaller than $N_{mrgToBeAdded}$, the worst case happens when all $N_{HMVP}$, candidates are different from the first $N_{ST}$ candidates which requires $N_{ST}*N_{HMVP}$ times of pruning operations.

Details of pruning operations for each value of number of existing spatial or temporal merge candidates denoted by $N_{ST}$ and $N_{mrg}$ in the worst case is shown Table 5.

TABLE 5

Additional pruning operations introduced by HMVP for the worst case

Number of additional pruning operations in merge list construction process

| | $N_{ST} = 0$ | $N_{ST} = 1$ | $N_{ST} = 2$ | $N_{ST} = 3$ | $N_{ST} = 4$ | $N_{ST} = 5$ | $N_{ST} = 6$ |
|---|---|---|---|---|---|---|---|
| $N_{mrg} = 6$ | C(0, 5, 6) = 0 | C(1, 4, 6) = 4 | C(2, 3, 6) = 7 | C(3, 2, 6) = 9 | C(4, 1, 6) = 10 | C(5, 0, 3) = 0 | C(6, 0, 2) = 0 |
| $N_{mrg} = 8$ | C(0, 7, 6) = 0 | C(1, 6, 6) = 6 | C(2, 5, 6) = 11 | C(3, 4, 6) = 15 | C(4, 3, 6) = 18 | C(5, 2, 3) = 14 | C(6, 1, 2) = 11 |
| $N_{mrg} = 10$ | C(0, 9, 6) = 0 | C(1, 8, 6) = 6 | C(2, 7, 6) = 12 | C(3, 6, 6) = 15 | C(4, 5, 6) = 23 | C(5, 4, 3) = 15 | C(6, 3, 2) = 12 |

It should be noted that the above table just lists the worst case of number of pruning operations. In hardware implementation process, the throughput could be higher since the HMVP candidates are ready before decoding one block. Therefore, each HMVP could be compared with any of available merge candidates in parallel.

In addition, due to the reduced number of pairs for combined bi-predictive merge candidates generation process, i.e., from 12 to 6, it could be considered as the number of pruning operations reduced by 3, since there are 2 checks per pair for combined bi-predictive merge candidate generation process and 5 checks per pruning process. Therefore, the number of additional pruning operations for the whole proposal under the worst case is listed as follows:

TABLE 6

Additional pruning operations of the whole proposal (for the worst case)

| | Number of pruning in table update | Number of additional pruning operations in merge list construction process | | | | | | |
|---|---|---|---|---|---|---|---|---|
| | | $N_{ST} = 0$ | $N_{ST} = 1$ | $N_{ST} = 2$ | $N_{ST} = 3$ | $N_{ST} = 4$ | $N_{ST} = 5$ | $N_{ST} = 6$ |
| $N_{mrg} = 6$ | 6 | −3 | 1 | 4 | 3 | 7 | −3 | |
| $N_{mrg} = 8$ | 6 | −3 | 3 | 8 | 12 | 15 | 11 | 8 |
| $N_{mrg} = 10$ | 6 | −3 | 3 | 9 | 12 | 20 | 12 | 9 |

7.2 Simulation Results

The tables below show the BD-rate gain and processing time impact of the proposed approach. Two sets of simulations are conducted, following the common test conditions on top of reference software VTM-2.0.1.

Only enable HMVP for merge mode (Test 4.4.7.a)
  Anchor: VTM (by disabling all BMS tools in BMS-1.0)
  Test: Anchor with HMVP only applied to merge mode
Enable HMVP for both AMVP and merge mode (Test 4.4.7.b)
  Anchor: BMS
  Test: Anchor with Proposal For each test set, three sub-sets according to merge list size $N_{mrg}$ set to 6, 8, and 10, are performed according to the CE4 descriptions.

7.2.1 Simulation Results of Test 4.4.7.a

This sub-section reports the coding performance of HMVP applied to merge mode only with $N_{mrg}$ equal to 6, 8 and 10, respectively.

TABLE 7

Performance of Test 4.4.7.a under Random Access Main 10

| | $N_{mrg} = 6$ | | | | | $N_{mrg} = 8$ | | | | |
|---|---|---|---|---|---|---|---|---|---|---|
| | Y | U | V | EncT | DecT | Y | U | V | EncT | DecT |
| Class A1 | −0.34% | −0.36% | −0.60% | 101% | 102% | −0.40% | −0.42% | −0.76% | 101% | 101% |
| Class A2 | −0.37% | −0.68% | −0.66% | 100% | 101% | −0.56% | −0.98% | −0.92% | 100% | 102% |
| Class B | −0.60% | −0.70% | −0.74% | 101% | 102% | −0.84% | −1.03% | −1.05% | 101% | 103% |
| Class C | −0.34% | −0.24% | −0.49% | 105% | 104% | −0.45% | −0.57% | −0.74% | 104% | 103% |
| Class E | | | | | | | | | | |
| Overall | −0.43% | −0.51% | −0.63% | 102% | 102% | −0.59% | −0.78% | −0.88% | 102% | 102% |

| | $N_{mrg} = 10$ | | | | |
|---|---|---|---|---|---|
| | Y | U | V | EncT | DecT |
| Class A1 | −0.41% | −0.48% | −0.78% | 102% | 102% |
| Class A2 | −0.65% | −1.07% | −1.11% | 101% | 102% |
| Class B | −0.92% | −1.00% | −1.06% | 102% | 103% |
| Class C | −0.48% | −0.49% | −0.66% | 103% | 102% |
| Class E | | | | | |
| Overall | −0.65% | −0.77% | −0.91% | 102% | 102% |

TABLE 8

Performance of Test 4.4.7.a under Low Delay B Main 10

| | $N_{mrg} = 6$ | | | | | $N_{mrg} = 8$ | | | | |
|---|---|---|---|---|---|---|---|---|---|---|
| | Y | U | V | EncT | DecT | Y | U | V | EncT | DecT |
| Class A1 | | | | | | | | | | |
| Class A2 | | | | | | | | | | |
| Class B | −0.39% | −0.46% | −0.37% | 100% | 101% | −0.60% | −0.64% | −0.83% | 100% | 101% |
| Class C | −0.10% | −0.12% | −0.40% | 100% | 103% | −0.16% | −0.24% | −0.51% | 101% | 102% |
| Class E | 0.07% | −0.16% | −0.24% | 101% | 103% | −0.06% | 0.12% | −0.34% | 101% | 104% |
| Overall | −0.18% | −0.27% | −0.35% | 100% | 102% | −0.32% | −0.32% | −0.60% | 101% | 102% |

| | $N_{mrg} = 10$ | | | | |
|---|---|---|---|---|---|
| | Y | U | V | EncT | DecT |
| Class A1 | | | | | |
| Class A2 | | | | | |
| Class B | −0.64% | −0.81% | −1.19% | 101% | 101% |
| Class C | −0.23% | −0.37% | −0.62% | 102% | 103% |
| Class E | −0.03% | −0.25% | −0.02% | 102% | 104% |
| Overall | −0.35% | −0.52% | −0.71% | 102% | 102% |

7.2.2 Simulation Results with Same Merge List Size

This sub-section reports the coding performance of HMVP applied to both AMVP and merge mode with $N_{mrg}$ equal to 6, 8 and 10, respectively.

TABLE 9

Performance of Test 4.4.7.c under Random Access Main 10

| | $N_{mrg} = 6$ | | | | | $N_{mrg} = 8$ | | | | |
|---|---|---|---|---|---|---|---|---|---|---|
| | Y | U | V | EncT | DecT | Y | U | V | EncT | DecT |
| Class A1 | −0.40% | −0.44% | −0.69% | 100% | 102% | −0.45% | −0.55% | −0.72% | 100% | 103% |
| Class A2 | −0.55% | −0.89% | −0.84% | 99% | 102% | −0.73% | −1.10% | −1.19% | 100% | 102% |
| Class B | −0.78% | −0.91% | −0.96% | 99% | 103% | −0.99% | −1.18% | −1.17% | 100% | 103% |
| Class C | −0.48% | −0.56% | −0.73% | 100% | 105% | −0.59% | −0.63% | −0.94% | 102% | 104% |
| Class E | | | | | | | | | | |
| Overall | −0.58% | −0.72% | −0.82% | 100% | 103% | −0.72% | −0.89% | −1.02% | 100% | 103% |

| | $N_{mrg} = 10$ | | | | |
|---|---|---|---|---|---|
| | Y | U | V | EncT | DecT |
| Class A1 | −0.50% | −0.62% | −0.85% | 101% | 102% |
| Class A2 | −0.79% | −1.31% | −1.35% | 101% | 102% |
| Class B | −1.08% | −1.24% | −1.31% | 101% | 102% |
| Class C | −0.62% | −0.68% | −0.92% | 103% | 106% |
| Class E | | | | | |
| Overall | −0.78% | −0.98% | −1.12% | 101% | 103% |

TABLE 10

Performance of Test 4.4.7.c under Low Delay B Main 10

| | $N_{mrg} = 6$ | | | | | $N_{mrg} = 8$ | | | | |
|---|---|---|---|---|---|---|---|---|---|---|
| | Y | U | V | EncT | DecT | Y | U | V | EncT | DecT |
| Class A1 | | | | | | | | | | |
| Class A2 | | | | | | | | | | |
| Class B | −0.41% | −0.66% | −0.59% | 99% | 96% | −0.66% | −0.83% | −0.89% | 100% | 101% |
| Class C | −0.18% | −0.32% | −0.31% | 100% | 102% | −0.22% | −0.38% | −0.48% | 102% | 103% |
| Class E | −0.01% | 0.45% | 0.55% | 101% | 97% | −0.12% | 0.20% | −0.18% | 102% | 105% |
| Overall | −0.23% | −0.27% | −0.21% | 100% | 98% | −0.38% | −0.42% | −0.57% | 101% | 103% |

TABLE 10-continued

Performance of Test 4.4.7.c under Low Delay B Main 10

| | $N_{mrg} = 10$ | | | | |
|---|---|---|---|---|---|
| | Y | U | V | EncT | DecT |
| Class A1 | | | | | |
| Class A2 | | | | | |
| Class B | −0.72% | −0.90% | −1.09% | 101% | 102% |
| Class C | −0.29% | −0.51% | −0.53% | 102% | 104% |
| Class E | 0.01% | 0.07% | −0.04% | 102% | 102% |
| Overall | −0.39% | −0.53% | −0.64% | 101% | 102% |

8. Example Implementations of the Disclosed Technology

Figure 35:
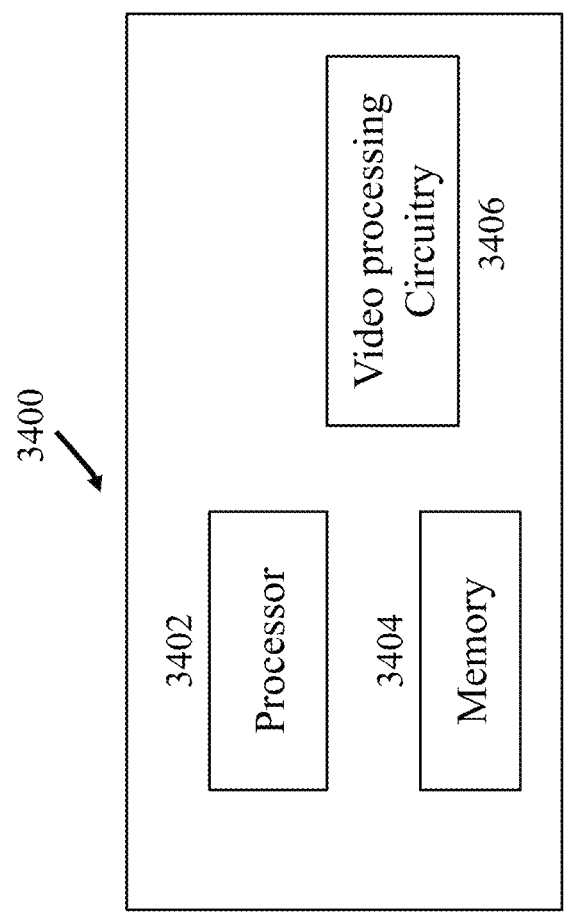
FIG. 35 is a block diagram of an example of a hardware platform for implementing a visual media decoding or a visual media encoding technique described in the present document.

FIG. 35 is a block diagram of a video processing apparatus 3500. The apparatus 3500 may be used to implement one or more of the methods described herein. The apparatus 3500 may be embodied in a smartphone, tablet, computer, Internet of Things (IoT) receiver, and so on. The apparatus 3500 may include one or more processors 3502, one or more memories 3504 and video processing hardware 3506. The processor(s) 3502 may be configured to implement one or more methods described in the present document. The memory (memories) 3504 may be used for storing data and code used for implementing the methods and techniques described herein. The video processing hardware 3506 may be used to implement, in hardware circuitry, some techniques described in the present document.

In some embodiments, the video coding methods may be implemented using an apparatus that is implemented on a hardware platform as described with respect to FIG. 35.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 36:
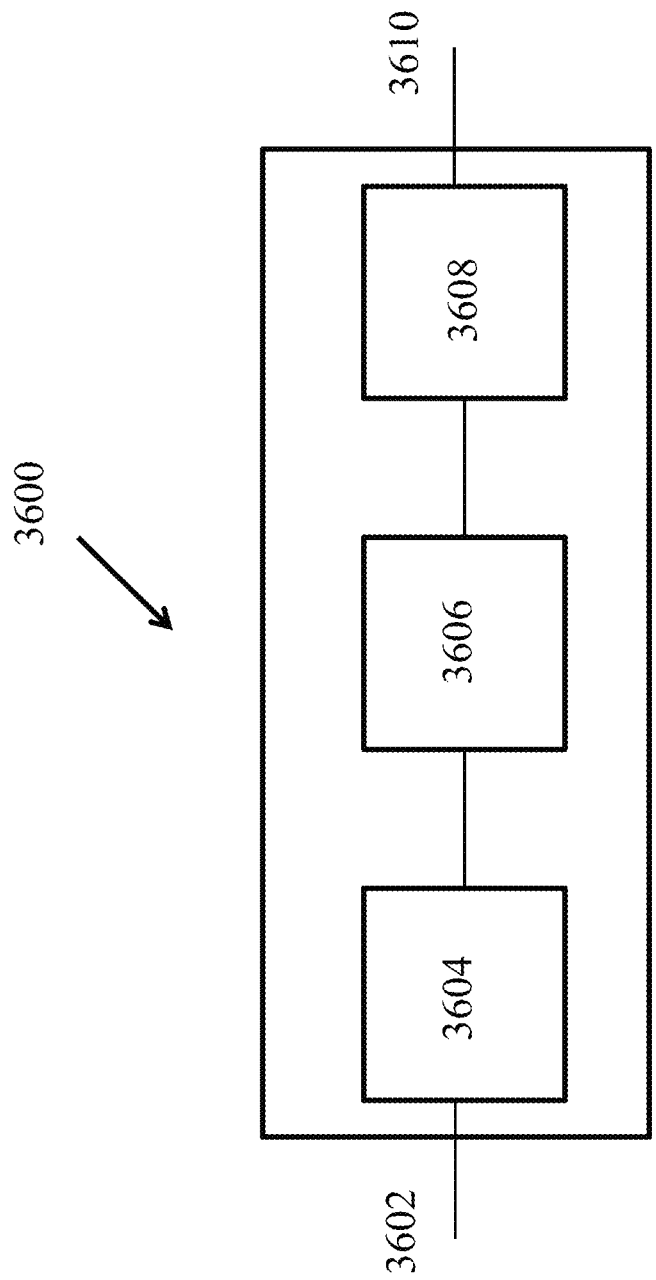
FIG. 36 is a block diagram of an example video processing system in which disclosed techniques may be implemented.

FIG. 36 is a block diagram showing an example video processing system 3600 in which various techniques disclosed herein may be implemented. Various implementations may include some or all of the components of the system 3600. The system 3600 may include input 3602 for receiving video content. The video content may be received in a raw or uncompressed format, e.g., 8 or 10 bit multi-component pixel values, or may be in a compressed or encoded format. The input 3602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3600 may include a coding component 3604 that may implement the various coding or encoding methods described in the present document. The coding component 3604 may reduce the average bitrate of video from the input 3602 to the output of the coding component 3604 to produce a coded representation of the video. The coding techniques are therefore sometimes called video compression or video transcoding techniques. The output of the coding component 3604 may be either stored, or transmitted via a communication connected, as represented by the component 3606. The stored or communicated bitstream (or coded) representation of the video received at the input 3602 may be used by the component 3608 for generating pixel values or displayable video that is sent to a display interface 3610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

It will be appreciated that several techniques have been disclosed that will benefit video encoder and decoder embodiments incorporated within video processing devices such as smartphones, laptops, desktops, and similar devices by allowing the use of intra coding tool in encoding or decoding of video or images.

In some embodiments, the following technical solutions be may implemented:

A1. A method of video processing, comprising: maintaining one or more tables, wherein at least one table of the one or more tables is associated with one or more entries; deriving, based on a first set of motion candidates in the at least one table, a second set of motion candidates; and performing, based on the second set of motion candidates, a conversion between a current block of a video and a bitstream representation of the video.

A2. The method of solution A1, wherein at least one of the second set of motion candidates is derived based on adding an offset to a motion vector for at least one of the first set of motion candidates.

A3. The method of solution A2, wherein the offset is added to either a horizontal component or a vertical component of the motion vector.

A4. The method of solution A2, wherein the offset is added to both a horizontal component and a vertical component of the motion vector.

A5. The method of solution A1, wherein scaling a first uni-prediction candidate of the first set of motion candidates to a reference picture in a reference picture list is used to derive a second uni-prediction candidate of the second set of motion candidates, and wherein the first uni-prediction candidate and the second uni-prediction candidate have a same reference picture list index and share the reference picture list.

A6. The method of solution A1, wherein scaling a first uni-prediction candidate of the first set of motion candidates to a reference picture in a reference picture list is used to derive a second uni-prediction candidate of the second set of motion candidates, wherein the first uni-prediction candidate and the second uni-prediction candidate have different reference picture list indexes, and wherein the reference picture list is associated with the second uni-prediction candidate.

A7. The method of solution A1, wherein scaling a uni-prediction candidate of the first set of motion candidates to a reference picture in a reference picture list is used to derive a bi-prediction candidate of the second set of motion candidates, wherein the reference picture list is associated with the bi-prediction candidate.

A8. The method of solution A1, at least one of the second set of motion candidates is derived based on averaging two or more different motion candidates from the first set of motion candidates.

A9. The method of any of solutions A1 to A8, wherein at least one of the second set of motion candidates is added to a motion candidate list, and wherein performing the conversion is based on the motion candidate list.

A10. The method of solution A9, wherein the motion candidate list comprises at least one of a motion candidate list for a merge mode or a motion candidate list for an advanced motion vector prediction (AMVP) mode.

A11. The method of any of solutions A1 to A10, further comprising: updating, subsequent to performing the conversion, the at least one tables based on motion information of the current block.

A12. The method of any of solutions A1 to A11, wherein an entry in the at least one table comprises one of the first set of motion candidates and its associated motion information comprising a prediction direction, one or more reference pictures and/or indices, one or more motion vectors, a local illumination compensation (LIC) flag, an affine flag, a motion vector difference (MVD) value or an MVD precision.

A13. The method of solution A12, wherein the associated motion information further comprises position information associated with the current block.

A14. The method of any of solutions A1 to A13, the conversion generates the current block from the bitstream representation.

A15. The method of any of solutions A1 to A13, wherein the conversion generates the bitstream representation from the current block.

A16. An apparatus in a video system comprising a processor and a non-transitory memory with instructions thereon, wherein the instructions upon execution by the processor, cause the processor to implement the method in any one of solutions A1 to A15.

A17. A computer program product stored on a non-transitory computer readable media, the computer program product including program code for carrying out the method in any one of solutions A1 to A15.

B1. A method of video processing, comprising: maintaining one or more tables, wherein each of the one or more tables is associated with one or more entries; adaptively changing an insertion order of motion candidates from at least one table of the one or more tables to a candidate list; and performing, based on the candidate list, a conversion between a current block of a video and a bitstream representation of the video.

B2. The method of solution B1, the updating is based on a coding mode of the current block.

B3. The method of solution B2, wherein the insertion order comprises inserting new motion candidates after temporal motion vector prediction (TMVP) candidates upon a determination that the coding mode is a merge mode.

B4. The method of solution B2, wherein the insertion order comprises inserting new motion candidates before spatial candidates.

B5. The method of solution B2, wherein the insertion order comprises inserting new motion candidates after spatial candidates upon a determination that the coding mode is an intra block copy (IBC) mode.

B6. The method of solution B1, wherein the insertion order is adaptively changed from block to block, from tile to tile, from tile group to tile group, or from one video processing unit to another video processing unit.

B7. The method of solution B1, wherein the updating or the insertion order is based on a height or a width of the current block.

B8. The method of solution B1, wherein the updating or the insertion order is based on a partitioning depth of the current block.

B9. The method of solution B1, wherein the updating or the insertion order is based on a tile type, a tile group type, a slice type or a picture type associated with the current block.

B10. The method of solution B1, wherein the updating or the insertion order is based on a low delay check flag in the bitstream representation.

B11. The method of any of solutions B1 to B10, further comprising: adaptively changing, during a construction of the candidate list, at least one of a pruning process when adding a motion candidate to the candidate list, or a number of motion candidates to be checked in a table of the one or more tables, or a maximum number of motion candidates in the LUT to be checked, or number of tables of the one or more tables to be checked.

B12. The method of any of solutions B1 to B11, wherein the table comprises a History-based Motion Vector Prediction (HMVP) table.

B13. The method of solution B12, wherein an entry in the HMVP table comprises a motion candidate and its associated motion information comprising a prediction direction, one or more reference pictures and/or indices, one or more motion vectors, a local illumination compensation (LIC) flag, an affine flag, a motion vector difference (MVD) value or an MVD precision.

B14. The method of any of solutions B1 to B11, further comprising: updating, subsequent to performing the conversion, the one or more tables based on motion information of the current block.

B15. The method of any of solutions B1 to B14, the conversion generates the current block from the bitstream representation.

B16. The method of any of solutions B1 to B14, wherein the conversion generates the bitstream representation from the current block.

B17. An apparatus in a video system comprising a processor and a non-transitory memory with instructions thereon, wherein the instructions upon execution by the processor, cause the processor to implement the method in any one of solutions B1 to B16.

B18. A computer program product stored on a non-transitory computer readable media, the computer program product including program code for carrying out the method in any one of solutions B1 to B16.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:
1. A method of processing video data, comprising:
maintaining one or more tables, wherein at least one table of the one or more tables is associated with one or more entries;

deriving, based on a first set of motion candidates in the at least one table, a second set of motion candidates; and performing, based on the second set of motion candidates, a conversion between a current block of a video and a bitstream of the video, wherein at least one motion candidate of the second set of motion candidates is derived by modifying at least one motion candidate of the first set of motion candidates and is added to a motion candidate list, and wherein the conversion is based on the motion candidate list.

2. The method of claim 1, wherein at least one of the second set of motion candidates is derived based on adding an offset to a motion vector for at least one of the first set of motion candidates.

3. The method of claim 2, wherein the offset is added to either a horizontal component or a vertical component of the motion vector.

4. The method of claim 2, wherein the offset is added to both a horizontal component and a vertical component of the motion vector.

5. The method of claim 1, wherein scaling a first uni-prediction candidate of the first set of motion candidates to a reference picture in a reference picture list is used to derive a second uni-prediction candidate of the second set of motion candidates, and wherein the first uni-prediction candidate and the second uni-prediction candidate have a same reference picture list index and share the reference picture list.

6. The method of claim 1, wherein scaling a first uni-prediction candidate of the first set of motion candidates to a reference picture in a reference picture list is used to derive a second uni-prediction candidate of the second set of motion candidates, wherein the first uni-prediction candidate and the second uni-prediction candidate have different reference picture list indexes, and wherein the reference picture list is associated with the second uni-prediction candidate.

7. The method of claim 1, wherein scaling a uni-prediction candidate of the first set of motion candidates to a reference picture in a reference picture list is used to derive a bi-prediction candidate of the second set of motion candidates, wherein the reference picture list is associated with the bi-prediction candidate.

8. The method of claim 1, at least one of the second set of motion candidates is derived based on averaging two or more different motion candidates from the first set of motion candidates.

9. The method of claim 1, wherein the motion candidate list comprises at least one of a motion candidate list for a merge mode or a motion candidate list for an advanced motion vector prediction (AMVP) mode.

10. The method of claim 1, further comprising:
updating, subsequent to performing the conversion, the at least one table based on motion information of the current block.

11. The method of claim 1, wherein an entry in the at least one table comprises one of the first set of motion candidates and its associated motion information comprising a prediction direction, one or more reference pictures and/or indices, one or more motion vectors, a local illumination compensation (LIC) flag, an affine flag, a motion vector difference (MVD) value or an MVD precision.

12. The method of claim 11, wherein the associated motion information further comprises position information associated with the current block.

13. The method of claim 1, wherein the conversion includes encoding the current block from the bitstream.

14. The method of claim 1, wherein the conversion includes decoding the bitstream from the current block.

15. An apparatus for processing video data comprising a processor and a non-transitory memory with instructions thereon, wherein the instructions upon execution by the processor, cause the processor to:
maintain one or more tables, wherein at least one table of the one or more tables is associated with one or more entries;
derive, based on a first set of motion candidates in the at least one table, a second set of motion candidates; and
perform, based on the second set of motion candidates, a conversion between a current block of a video and a bitstream of the video, wherein at least one motion candidate of the second set of motion candidates is derived by modifying at last one motion candidate of the first set of motion candidates and is added to a motion candidate list, and wherein the conversion is based on the motion candidate list.

16. The apparatus of claim 15, wherein at least one of the second set of motion candidates is derived based on adding an offset to a motion vector for at least one of the first set of motion candidates.

17. The apparatus of claim 15, wherein scaling a first uni-prediction candidate of the first set of motion candidates to a reference picture in a reference picture list is used to derive a second uni-prediction candidate of the second set of motion candidates, and wherein the first uni-prediction candidate and the second uni-prediction candidate have a same reference picture list index and share the reference picture list.

18. The apparatus of claim 15, wherein scaling a first uni-prediction candidate of the first set of motion candidates to a reference picture in a reference picture list is used to derive a second uni-prediction candidate of the second set of motion candidates, wherein the first uni-prediction candidate and the second uni-prediction candidate have different reference picture list indexes, and wherein the reference picture list is associated with the second uni-prediction candidate.

19. The apparatus of claim 15, wherein scaling a uni-prediction candidate of the first set of motion candidates to a reference picture in a reference picture list is used to derive a bi-prediction candidate of the second set of motion candidates, wherein the reference picture list is associated with the bi-prediction candidate.

20. A non-transitory computer-readable recording medium storing a bitstream of a video which is generated by a method performed by a video processing apparatus, wherein the method comprises:
maintaining one or more tables, wherein at least one table of the one or more tables is associated with one or more entries;
deriving, based on a first set of motion candidates in the at least one table, a second set of motion candidates; and
generating the bitstream based on the the second set of motion candidates, wherein at least one motion candidate of the second set of motion candidates is derived by modifying at least one motion candidate of the first set of motion candidates and is added to a motion candidate list, and wherein the generating the bitstream is based on the motion candidate list; and
storing the bitstream in a non-transitory computer-readable recording medium.

* * * * *